United States Patent [19]
Hoarty et al.

[11] Patent Number: 5,526,034
[45] Date of Patent: Jun. 11, 1996

[54] INTERACTIVE HOME INFORMATION SYSTEM WITH SIGNAL ASSIGNMENT

[75] Inventors: W. Leo Hoarty, Santa Clara; Joshua W. Soske, Sunnyvale, both of Calif.; Gary M. Lauder, New York, N.Y.; Stephen C. Snell, Aptos, Calif.; Delmer D. Fisher, Milpitas, Calif.; John North, Mountain View, Calif.

[73] Assignee: ICTV, Inc., Santa Clara, Calif.

[21] Appl. No.: 56,958

[22] Filed: May 3, 1993

Related U.S. Application Data

[63] Continuation-in-part of Ser. No. 877,325, May 1, 1992, Pat. No. 5,412,720, which is a continuation-in-part of Ser. No. 754,932, Sep. 10, 1991, Pat. No. 5,220,420, which is a continuation-in-part of Ser. No. 589,205, Sep. 27, 1990, Pat. No. 5,093,718.

[51] Int. Cl.⁶ ..................................................... H04N 7/173
[52] U.S. Cl. ................................... 348/7; 348/12; 348/13
[58] Field of Search .................................. 358/7, 6, 8, 9, 358/10, 11, 12, 13, 86; 455/3.1, 3.2, 4.1, 4.2, 5.1, 6.1, 6.2; 359/109, 113, 114, 124, 125, 115, 126, 137; 370/69.1, 73; H04N 7/00, 7/10, 7/16, 7/173, 7/20, 7/22

[56] References Cited

U.S. PATENT DOCUMENTS

| 3,889,050 | 6/1975 | Thompson | 178/5 |
| 4,032,972 | 6/1977 | Saylor | 358/142 |

(List continued on next page.)

FOREIGN PATENT DOCUMENTS

| 63-33988 | 2/1988 | Japan . |
| 263985 | 10/1988 | Japan . |
| 241993 | 9/1989 | Japan . |
| 17776 | 1/1990 | Japan . |
| WO82/02303 | 7/1982 | WIPO . |
| WO89/08967 | 9/1989 | WIPO . |

OTHER PUBLICATIONS

Dukes, Stephen D., "Photonics for cable television system design", *Communications Engineering and Design*, 1992.
Langenberg, Earl, "Integrating Entertainment and Voice on the Cable Network", pp. 187–194.
Large, David, "Tapped Fiber vs Fiber–Reinforced Coaxial CATV Systems: A Comparison of Evolutionary Paths", pp. 1–21 1989.
*InSight*—brochure.
European Patent Application 0 477 786 A2.
European Patent Application 0 449 633 A1.
World Patent Application WO 90/13972.
UK Patent Application GB 2 248 955 A.
Le Gall, Didier, "MPEG: A Video Compression Standard for Multimedia Applications", Communication of the ACM, vol. 34, No. 4, Apr., 1991, New York, NY.
Tamitani et al., "An Encoder/Decoder Chip Set for the MPEG Video Standard", 1992 IEEE International Conference on Acoustics, vol. 5, Mar., 1992, San Francisco, CA.

(List continued on next page.)

*Primary Examiner*—David E. Harvey
*Attorney, Agent, or Firm*—Bromberg & Sunstein

[57] ABSTRACT

An interactive home information system having a node in television communication and data communication with a group of home interface controllers. At each home interface controller, there is a signal input for receiving television signals from the node over a cable television distribution network and a data transceiver for conducting data communications with the node. The node determines whether a home interface controller is requesting interactive service. For each interface controller requesting interactive service, the node assigns a television information signal to the requesting home interface controller. Thus, signal assignment is accomplished on a demand basis for those interface controllers determined to be placed in an interactive mode. Signal assignment may involve selection of a given carrier frequency. Alternatively, signal assignment may involve selection of a time slice.

40 Claims, 41 Drawing Sheets

OTHER PUBLICATIONS

| | | | |
|---|---|---|---|
| 4,077,006 | 2/1978 | Nicholson | 325/308 |
| 4,081,831 | 3/1978 | Tang et al. | 358/114 |
| 4,245,245 | 1/1981 | Matsumoto et al. | 358/122 |
| 4,247,106 | 1/1981 | Jeffers et al. | 273/85 G |
| 4,253,114 | 2/1981 | Tang et al. | 358/114 |
| 4,264,924 | 4/1981 | Freeman | 358/86 |
| 4,290,142 | 9/1981 | Schnee et al. | 455/3 |
| 4,302,771 | 11/1981 | Gargini | 358/86 |
| 4,367,557 | 1/1983 | Stern et al. | 455/4 |
| 4,450,477 | 5/1984 | Lovett | 358/86 |
| 4,454,538 | 6/1984 | Toriumi | 358/86 |
| 4,466,017 | 8/1984 | Banker | 358/120 |
| 4,471,380 | 9/1984 | Mobley | 358/120 |
| 4,491,983 | 1/1985 | Pinnow et al. | 455/612 |
| 4,506,387 | 3/1985 | Walter | 455/612 |
| 4,507,680 | 3/1985 | Freeman | 358/86 |
| 4,509,073 | 4/1985 | Baran et al. | 358/86 |
| 4,523,228 | 6/1985 | Banker | 358/120 |
| 4,533,948 | 8/1985 | McNamara et al. | 358/122 |
| 4,536,791 | 8/1985 | Campbell et al. | 358/147 |
| 4,538,174 | 8/1985 | Gargini et al. | 358/86 |
| 4,538,176 | 8/1985 | Nakajima et al. | 358/86 |
| 4,567,517 | 1/1986 | Mobley | 358/120 |
| 4,573,072 | 2/1986 | Freeman | 358/86 |
| 4,591,906 | 5/1986 | Morales-Garza et al. | 358/84 |
| 4,602,279 | 7/1986 | Freeman | 358/86 |
| 4,616,263 | 10/1986 | Eichelberger | 358/185 |
| 4,627,105 | 12/1986 | Ohashi et al. | 455/612 |
| 4,633,462 | 12/1986 | Stifle et al. | 370/85 |
| 4,695,880 | 9/1987 | Johnson et al. | 358/86 |
| 4,706,121 | 11/1987 | Young | 358/142 |
| 4,709,418 | 11/1987 | Fox et al. | 455/612 |
| 4,710,971 | 12/1987 | Nozaki et al. | 455/179 |
| 4,748,689 | 5/1988 | Mohr | 455/612 |
| 4,760,442 | 7/1988 | O'Connell et al. | 358/86 |
| 4,769,833 | 9/1988 | Farleigh et al. | 379/105 |
| 4,769,838 | 9/1988 | Hasegawa | 380/7 |
| 4,801,190 | 1/1989 | Imoto | 350/96.16 |
| 4,821,102 | 4/1989 | Ichikawa et al. | 358/183 |
| 4,823,386 | 4/1989 | Dumbauld et al. | 380/13 |
| 4,827,253 | 5/1989 | Maltz | 340/734 |
| 4,829,372 | 5/1989 | McCalley et al. | 358/86 |
| 4,847,700 | 7/1989 | Freeman | 358/343 |
| 4,860,379 | 8/1989 | Schoeneberger et al. | 455/5 |
| 4,891,694 | 1/1990 | Way | 358/86 |
| 4,901,367 | 2/1990 | Nicholson | 455/5 |
| 4,903,126 | 2/1990 | Kassatly | 358/146 |
| 4,912,760 | 3/1990 | West, Jr. et al. | 380/7 |
| 4,918,516 | 4/1990 | Freeman | 358/86 |
| 4,922,532 | 5/1990 | Farmer et al. | 380/15 |
| 4,941,040 | 7/1990 | Pocock | 358/86 |
| 4,947,244 | 8/1990 | Fenwick et al. | 358/86 |
| 4,963,995 | 10/1990 | Lang | 358/335 |
| 4,975,771 | 12/1990 | Kassatly | 358/146 |
| 4,994,909 | 2/1991 | Graves et al. | 358/86 |
| 4,995,078 | 2/1991 | Monslow et al. | 380/10 |
| 5,008,934 | 4/1991 | Endoh | 380/15 |
| 5,014,125 | 5/1991 | Pocock et al. | 358/86 |
| 5,027,400 | 6/1991 | Baji et al. | 380/20 |
| 5,057,917 | 10/1991 | Shalkauser et al. | 358/135 |
| 5,060,262 | 10/1991 | Bevins, Jr. et al. | 380/19 |
| 5,093,718 | 3/1992 | Hoarty et al. | 358/84 |
| 5,109,414 | 4/1992 | Harvey et al. | 380/9 |
| 5,119,188 | 6/1992 | McCalley et al. | 358/86 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,172,413 | 12/1992 | Bradley et al. | 348/7 |
| 5,191,410 | 3/1993 | McCalley et al. | 348/13 |
| 5,220,420 | 6/1993 | Hoarty et al. | 358/86 |
| 5,231,494 | 7/1993 | Wachob | 358/146 |
| 5,236,199 | 8/1993 | Thompson, Jr. | 273/439 |
| 5,253,341 | 10/1993 | Rozmanith et al. | 348/12 |
| 5,319,455 | 6/1994 | Hoarty et al. | 348/7 |
| 5,418,559 | 5/1995 | Blahut | 348/10 |

OTHER PUBLICATIONS

"Distributed Switching for Data Transmission over Two-Way CATV", Tarek N. Saaadawi et al., *IEEE Journal on Selected Areas in Communications*, vol. SAC-3, No. 2, Mar., 1985.

"The Architecture of Videotex Systems", Jan Gecsei, Chapter 6, pp. 77-79, 1983.

"Two-Way Applications for Cable Television Systems in the 70's", *IEEE Spectrum*, Nov. 1971, pp. 39-52.

Terry, Jack "Alternative Technologies and Delivery Systems for Broadband ISDN Access" IEEE Communications Magazine, Aug. 1992, pp. 58-64.

INTERACTIVE HOME INFORMATION SYSTEM WITH SIGNAL ASSIGNMENT

This application is a continuation in part of U.S. application Ser. No. 07/877,325, filed May 1, 1992, now U.S. Pat. No. 5,412,720, which in turn is a continuation in part of U.S. application Ser. No. 07/754,932, filed Sep. 10, 1991, now U.S. Pat. No. 5,220,420, which is a continuation in part of U.S. application Ser. No. 07/589,205, filed Sep. 27, 1990, issued as U.S. Pat. No. 5,093,718. These related applications are hereby incorporated herein by reference.

TECHNICAL FIELD

The present invention relates to cable television systems, particularly those having two-way communications capability with the user.

BACKGROUND ART

Bandwidth problems have long restricted the ability of cable television systems to provide information services to subscribers. Although a coaxial cable system may permit a cable system operator to provide, for example, 50 television channels, each 6 MHz wide, with a total bandwidth of 300 MHz, this total bandwidth is insufficient to permit an arrangement wherein each subscriber may have, in addition to these 50 channels, an interactive information service that functions independently of interactive information services to all other subscribers and provides full color video, motion typical of movies or television, and sound.

The reason for the insufficiency in bandwidth is apparent on a consideration of the demands on the system. Typically a subscriber on a cable system obtains information services over a communication path that starts at the headend, proceeds over one of typically a number of trunks, and then over one of a number of feeders, and then over one of a number of taps. Each feeder may have, for example, fifty or more subscribers, and each trunk might serve a hundred or more feeders. The result is that 5000 subscribers per trunk is not atypical. Thus merely to provide a private one-way information service, and nothing else, to each of these 5000 subscribers would require the trunk to carry 5000 different signals, each using about 6 MHz of bandwidth, and would alone require a trunk bandwidth of 30 GHz, which is nearly two orders of magnitude greater than provided by a typical coaxial cable system.

The use of fiber optic trunks can assist in providing additional bandwidth, but to the extent that coaxial cable secondary trunks and feeders are used in a hybrid fiber-cable system, bandwidth limitations may continue to pose problems. While video compression schemes may assist in bringing the bandwidth requirements within more practical limits, each subscriber would then need to be provided with his own decompression unit.

Another problem lies in how to handle the switching and computing demands on the headend to provide separate and private information service to potentially hundreds of thousands of subscribers simultaneously.

In one paper, it has been suggested that a portion of cable system bandwidth be used to provide the most popular channels universally to all subscribers and remaining services be delivered to individual busses on a demand basis only. Large, D., "Tapped Fiber Vs Fiber-Reinforced Coaxial CATV Systems: A comparison of Evolutionary Paths," Draft Paper, Aug. 4, 1989, at pages 16 et seq. A three level distributed switching system was proposed, with one switch at the headend to switch among hubs, one at each hub to switch among distribution lines, and a third level "interdiction circuit" to select the service for each dwelling. No architecture for such a scheme was proposed, and the author noted that "a significant development effort will be required". Id., at page 19. Moreover, the author notes that his scheme poses a problem for the subscriber in using the system, because most channels will be accessed in the normal way using the television tuner while switched services must be accessed by first tuning to an available switch channel, then using an auxiliary communications device to control that channel. "Given that customers have historically resisted any complications created by cable companies in accessing services, this may be a potential problem." Id., at 20.

SUMMARY OF THE INVENTION

The present invention provides in a preferred embodiment a system that achieves distribution of conventional cable services in traditional manners while providing interactive television information services on a demand basis using a switching arrangement, and it does so while surprisingly permitting both types of service to be accessed, as in the past, by the single action of channel selection.

In a preferred embodiment the invention provides an interactive television information system, for providing interactive cable television service when coupled to a cable television system having (i) an information source available at a headend for supplying a plurality of information services and (ii) an information service distribution network for delivering the information services to subscriber televisions. In this embodiment, the interactive television system has a plurality of home interface controllers. One such home interface controller is associated with each subscriber television and provides an output in communication with the subscriber television and has (i) a signal input for television information signals and an input selection arrangement for selecting a given one of the television information signals at the signal input, (ii) a channel selection arrangement for permitting a user to select an apparent channel, and (iii) a data transceiver operative over a data communications link. The embodiment also has a node, in television communication with the information source over a first path of the network and with a group of the home interface controllers means over a second path of the network, and in data communications with the home interface controllers over the data communications link. The node selects and provides information services obtained from the information source to each home interface controller in the group based on data obtained over the data communications link from each such home interface controller.

In one embodiment, the node and each home interface controller are so arranged that when any of a first group of apparent channels is selected on a given one of the home interface controllers, the node provides to it different information services on different apparent channels in the group all via the same television information signal selected by the input selection arrangement of such given home interface controller at a single carrier frequency for such given home interface controller. In this way different information services may be selected by the user simply by changing the apparent channel. Furthermore, the channel selection arrangement in each home interface controller includes an arrangement for causing each selected channel in a second group of apparent channels to correspond to a different selected carrier frequency of a television information signal at the signal input. In this manner, selecting different apparent channels can also be used to cause the selection of different conventional cable channels. Thus channel selection permits the user to select any information service, regardless whether it is conventional or interactive.

In a further embodiment, the node includes an activity detection arrangement for determining whether a given home interface controller is to be placed in an interactive mode. The node also includes a signal assignment arrangement for causing, on an affirmative determination by the activity detection arrangement, the input section arrangement of the given home interface controller to select a given television information signal present at the signal input. In this embodiment, signal assignment is accomplished on a demand basis for those home interface controllers determined to be placed in an interactive mode. When the demand exceeds the supply, the assignment is achieved with rules for resolving the contention, for example, by permitting the first home interface controller to keep its assigned frequency until the activity detection arrangement detects that the interactive mode is no longer in effect.

In related embodiments, the distribution network may include a plurality of express trunks. Each trunk has a first bandwidth portion carrying non-interactive television information services that are substantially identical in nature and in bandwidth allocation among all trunks. A second bandwidth portion of each trunk carries television information services on a demand basis established by subscriber usage of the home interface controllers utilizing the trunk for service. The data communications link may include a return path, from each home interface controller in a collection of neighboring home interface controllers, to the node in which a common trunk line is utilized for all of the home interface controllers in the collection.

This embodiment may further utilize a main trunk carrying television information signals for non-interactive information services from the headend to each of the express trunks. Also an interactive trunk may carry television information signals for information services on a demand basis from the headend to each of the express trunks. A splitter splits from the interactive trunk the television signals for information services on a demand basis for each of the express trunks. A group of couplers couples the signals from the main trunk and the splitter to feed each of the express trunks.

BRIEF DESCRIPTION OF THE DRAWINGS

These and other aspects of the invention will be more readily understood by reference to the following detailed description taken with the accompanying drawings, in which.

DETAILED DESCRIPTION OF SPECIFIC EMBODIMENTS

For the purposes of the description herein and the claims that follow it, unless the context otherwise requires, the terms "cable television environment" and "cable television system" include all integrated systems for delivery of any information service to subscribers for use in connection with their televisions. These include conventional cable television systems utilizing coaxial cable for distribution primarily of broadcast and paid television programming, cable television systems using fiber optics and mixed fiber optic-coaxial cable, as well as other means for distribution of information services to subscribers. Similarly, unless the context otherwise requires, the term "information service" includes any service capable of being furnished to a television viewer having an interface permitting (but not necessarily requiring) interaction with a facility of the cable provider, including but not limited to an interactive information service, video on demand, local origination service, community event service, regular broadcast service, etc. "Television communication" means providing an information service via a television information signal. A "television information signal" is any signal that may be utilized by a television for video display, regardless of the form, including a standard NTSC-modulated rf carrier, an MPEG-compressed digital data stream, or any other format. "Interactive television service" means an information service that utilizes an interface affording two-way communication with a facility of the cable provider. When a node is said to be in an "interactive mode," it means that the node is providing an information service to the home interface controller; the home interface controller may, but need not, be furnishing data to the node as to what information service to provide.

Figure 1:
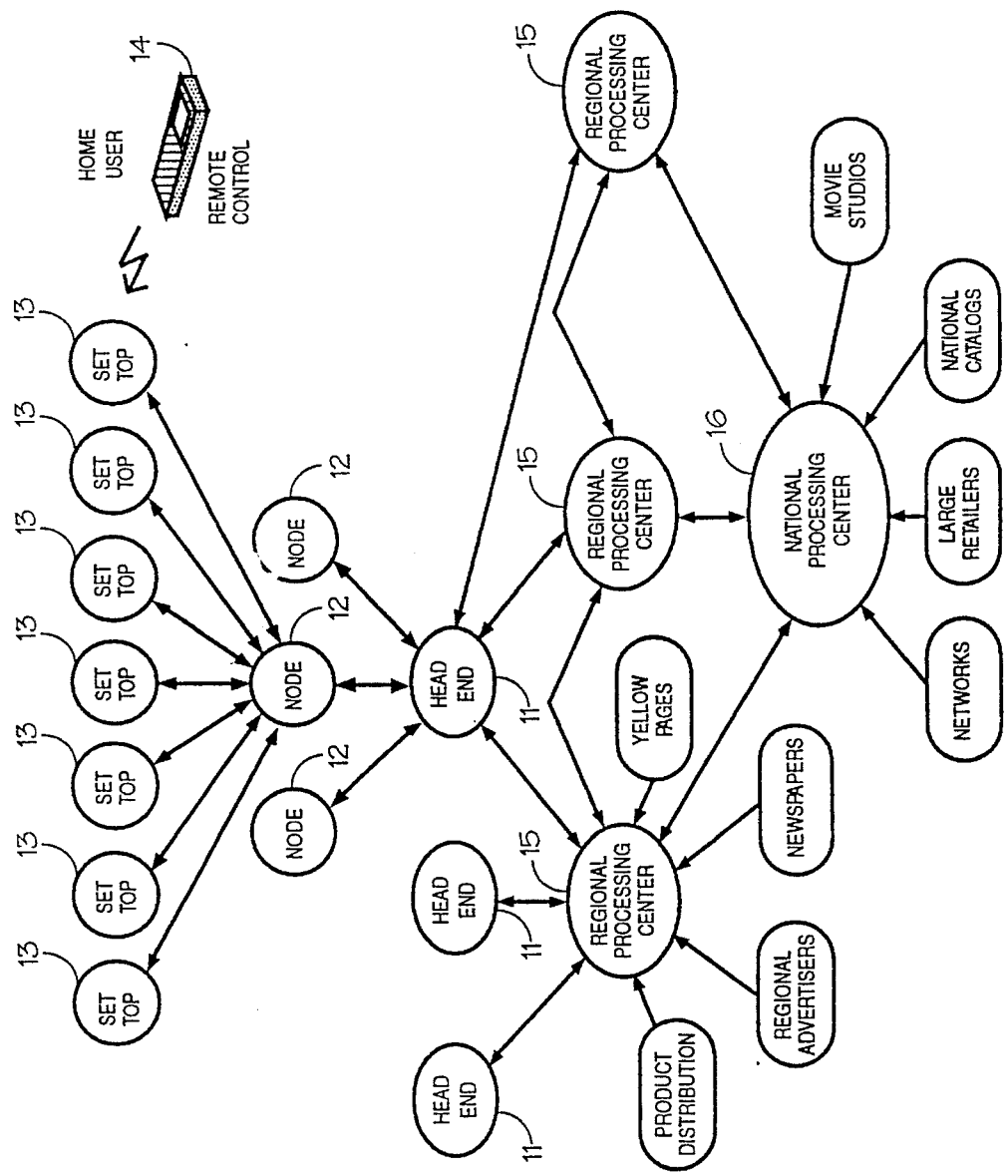
FIG. 1 is a schematic of an interactive television information system in accordance with a preferred embodiment of the present invention, showing relations with national and regional processing centers.

In FIG. 1 there is shown the relationship of a cable television system in accordance with the present invention to regional and national processing systems. A headend 11 is in communication with a plurality of nodes 12 that in turn communicate with set top units 13, which below are referred to as "home interface controllers". Each of these home interface controllers has a remote control 14 operable by the user. Each headend 11 may obtain items for use in providing an information service from a regional processing center 15, which in turn may obtain some information services from a national processing center 16. The information services may include a wide range of offerings, such as classified advertising services, newspapers, advertising, televised catalogue ordering, video on demand or near video on demand, etc. Information services that are conventional television network programming may also be distributed from the national and regional processing centers.

Figure 2:
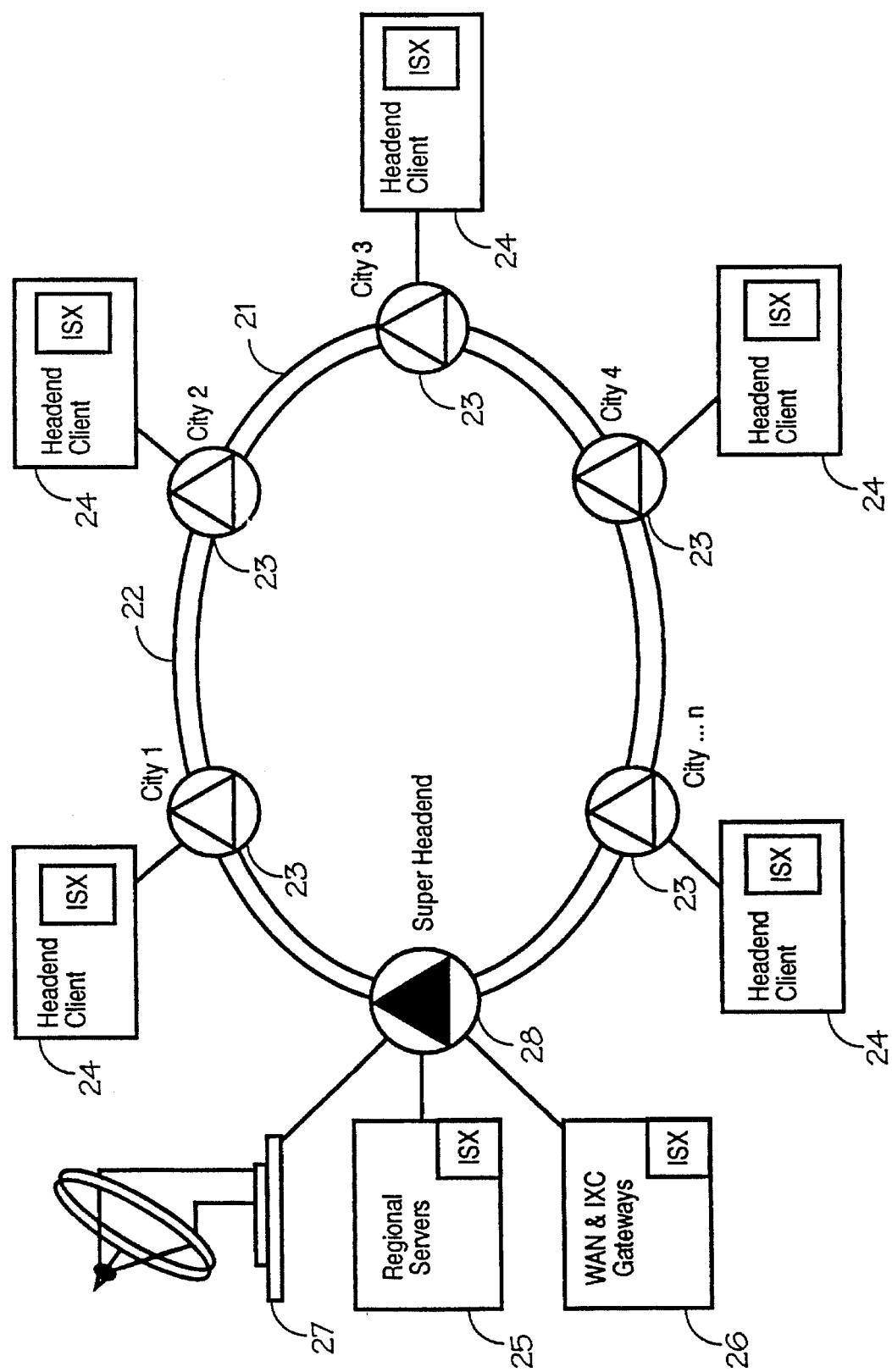
FIG. 2 is a schematic showing the manner in which a multiheadend system with fiber optic interconnection may be employed to provide interactive television service in accordance with an embodiment of the invention.

FIG. 2 is a schematic showing the manner in which a multiheadend system with fiber optic interconnection may be employed to provide interactive television service in accordance with an embodiment of the invention. A pair of fiber optic cables 21 and 22 provide information services in clockwise and counter-clockwise directions (for redundancy in the event of disruption of the cables) from super headend 28 to headend clients 24 serving a number of cities 23. The super headend in turn may obtain conventional broadcast services as well as interactive information services from satellite receiver 27, and other information services from servers 25 from regional processing centers, as well as WAN and interexchange (IXC) facilities 26. Each headend client 24 may contain an interactive service node, here designated by the trademark ISX, a trademark of ICTV, the assignee herein.

Figure 3:
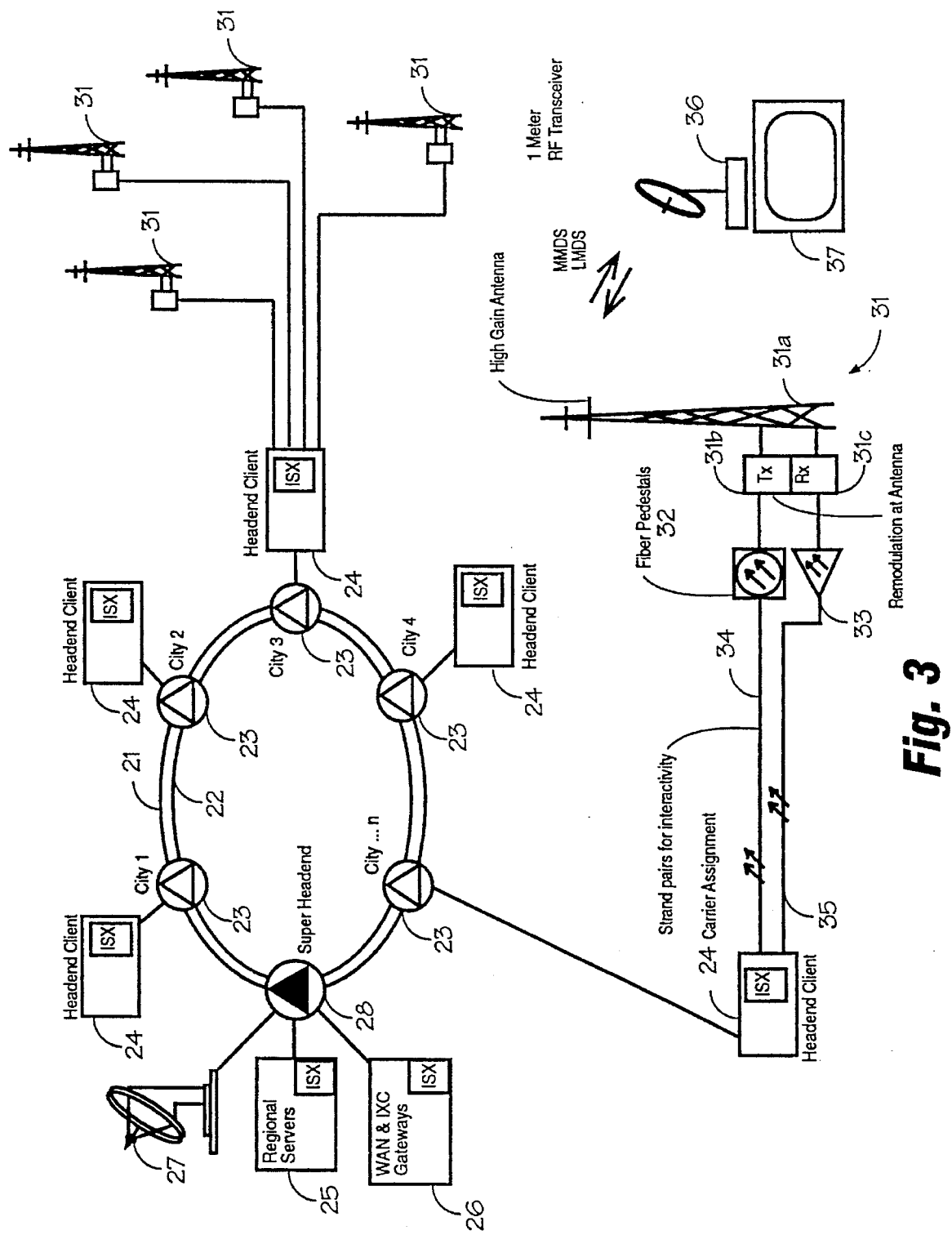
FIG. 3 is a schematic showing an embodiment similar to that shown in FIG. 2, but in which a headend may have wireless communication with subscribers.

FIG. 3 is a schematic showing an embodiment similar to that shown in FIG. 2, but in which a headend 24 may have two-way wireless communication using transceiver facilities 31 with subscribers. A transceiver facility 31 may include a high gain antenna system 31a communicating with a transceiver 36 coupled to a television 37 at each subscriber location. The antenna system 31a radiates rf signals fed by transmitter 31b; the antenna 31a also receives signals from the subscriber transceivers and feeds them to receiver 31c. The transmitter 31b and the receiver 31c are linked to fiber optic receiver 32 and fiber optic transmitter 33 respectively, which in turn communicate with the headend 24 over optical fibers 34 and 35.

Figure 4:
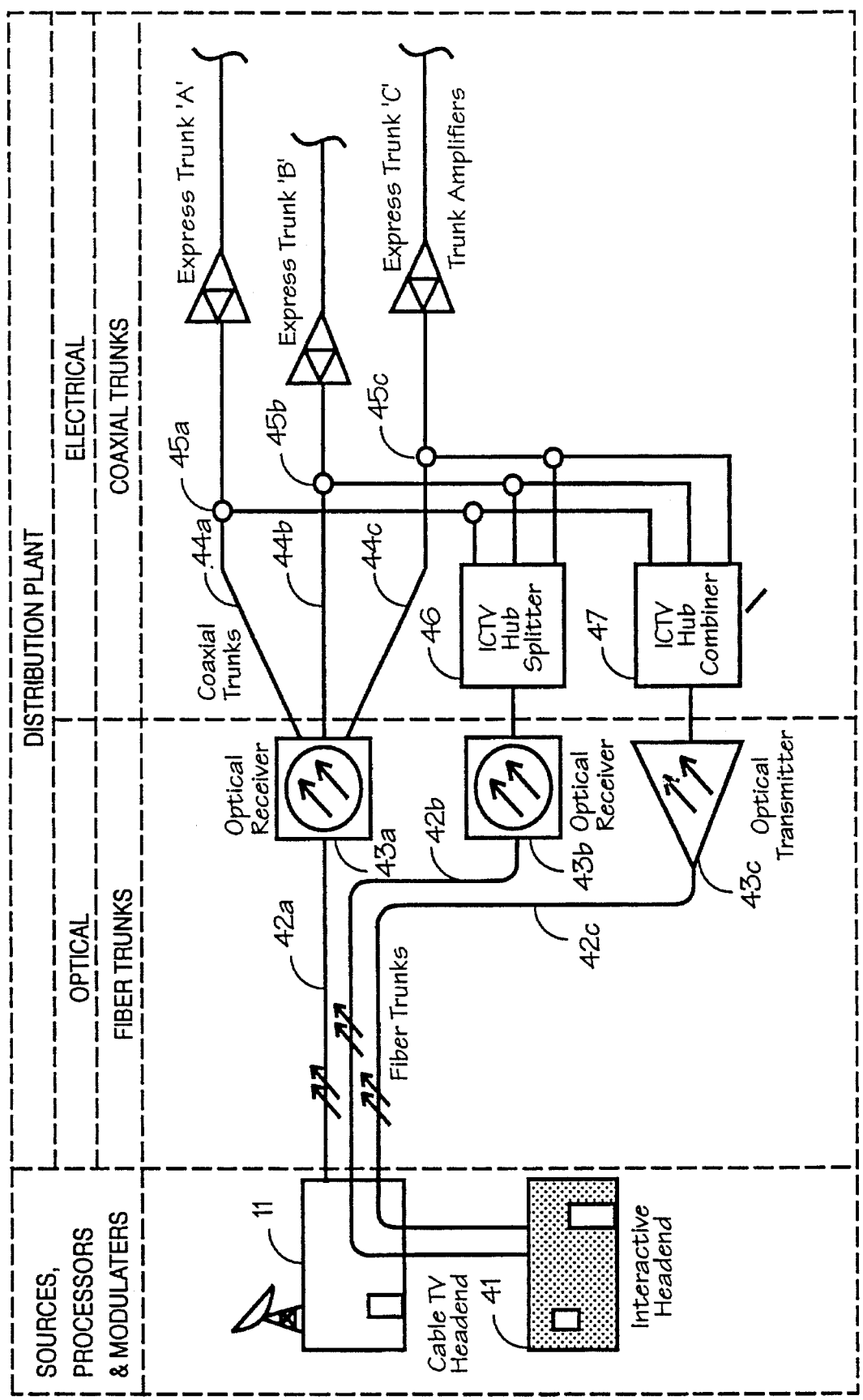
FIG. 4 is a schematic showing a mixed fiber optic coaxial cable system in accordance with a preferred embodiment of the present invention.

FIG. 4 is a schematic showing a mixed fiber optic coaxial cable system in accordance with a preferred embodiment of the present invention. In this embodiment, main fiber trunks 42a carrying conventional cable and broadcast programming go to optical receiver 43a, from which coaxial trunks 44A (express trunk A), 44B (express trunk B), and 44C (express trunk C) derive regular cable television programming signals. Each express trunk has a first bandwidth portion carrying these non-interactive television information services that are substantially identical in nature and in bandwidth allocation among all express trunks.

An interactive fiber trunk 42b in FIG. 4 carries desired interactive information services in the outbound direction that are not provided over main fiber trunks 42a, and these information services are fed into optical receiver 43b. As will be shown in further detail in FIG. 9, the electrical output of the optical receiver 43b includes information services in separate spectral portions for each of express trunks A, B, and C. This output is provided to hub splitter 46. The information services for each of express trunks A, B, and C are then translated into common spectral portions by hub splitter 46, and then fed to the designated trunks, where they are coupled to the conventional signals via couplers at locations 45a, 45b, and 45c on trunks 44a, 44b, and 44c respectively. It should be pointed out that although the information services for each of these trunks occupy similar spectral regions, their information content is different, since the information content of the information services on trunk A is supplied on demand to the home interface controllers served by trunk A, the content on trunk B is supplied on demand to the home interface controllers served by trunk B, and the content on trunk C is supplied on demand to the home interface controllers served by trunk C. Thus a second bandwidth portion of each express trunk carries television information services on a demand basis established by subscriber usage of the home interface controllers utilizing the trunk for service.

The path of inbound data from the each express trunk 44A, 44B, and 44C is from a splitter at each of locations 45a, 45b, and 45c respectively to hub combiner 47. The inbound data, like the outbound interactive television information services, on each of the express trunks occupy similar spectral regions, although the data on each express trunk have different information content reflecting the particular demands made by the home interface controllers using each particular express trunk. The inbound data from each trunk are frequency shifted by hub combiner 47 in the manner described in further detail in connection with FIG. 9 to cause the data from these trunks to occupy separate spectral regions, and the output of the combiner 47 feeds optical transmitter 42c. The optical transmitter 43c feeds the optical fiber trunk 42c to provide a common trunk return path, for all the home interface controllers served by express trunks 44A, 44B, and 44C, for the interactive headend 41.

Figure 5:
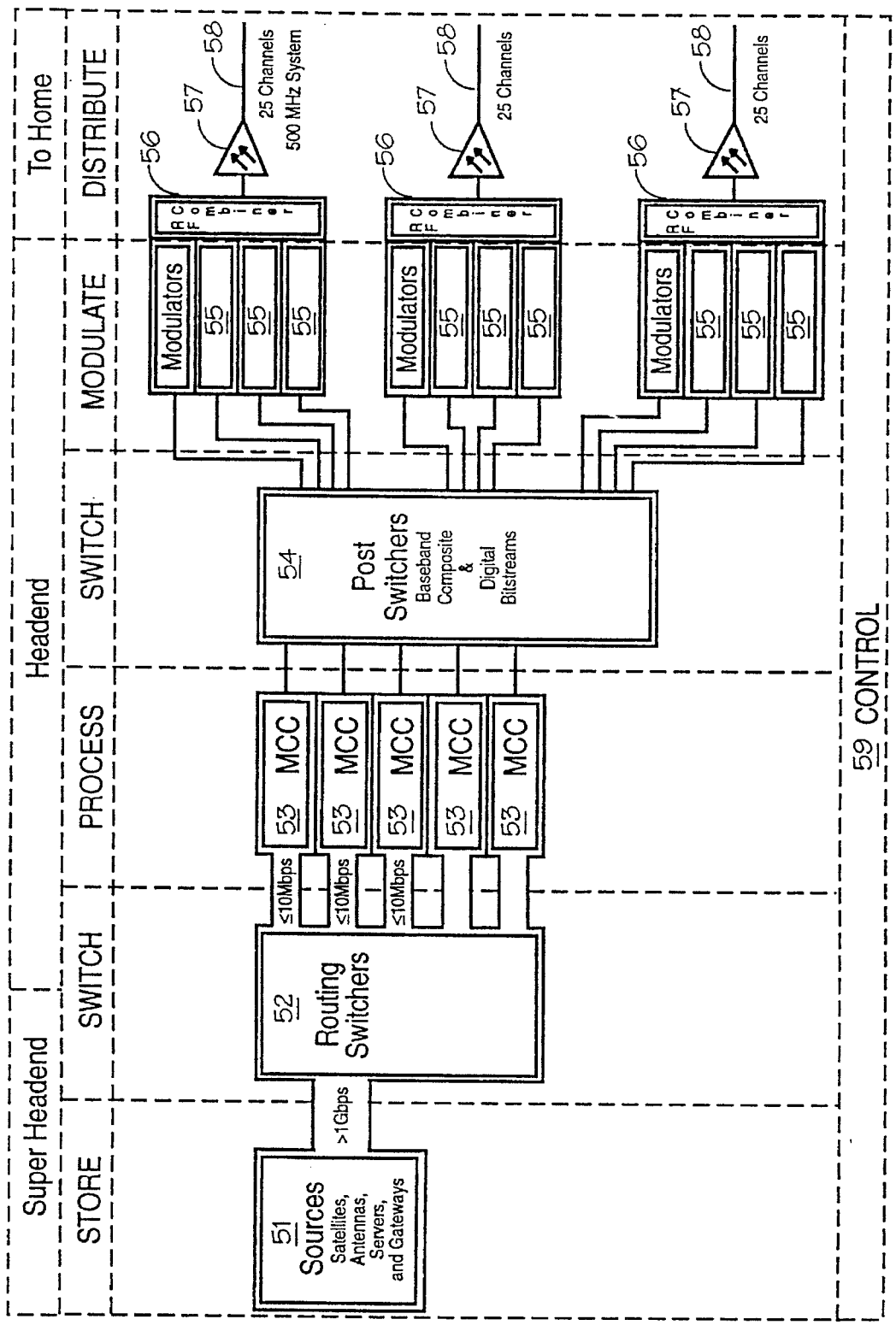
FIG. 5 illustrates the general architecture of outbound signal flow and two-way control in a system in accordance with a preferred embodiment of the present invention.

FIG. 5 illustrates the general architecture of outbound signal flow in a system in accordance with a preferred embodiment of the present invention. At the super headend, for example, item 28 in FIG. 2, a variety of sources of information services are available from satellites, antennas, servers, and gateways, and they are routed to subscribers via routing switchers 52. A portion of these information services may, but need not, be provided to all subscribers as basic non-interactive service. The routing switchers 52 feed appropriate modular multimedia controllers 53 (MMCs) which may provide appropriate processing for providing the service in question to each subscriber. Differently configured cards are used depending on the nature of the information service. Where the information service is interactive, an individual MMC 53 is assigned on a demand basis to each requesting home interface controller, which is in data communication with MMC, and the MMC provides interactive television information service. Post switchers 54 switch the MMC outputs to appropriate modulators 55, which are in turn grouped so that their outputs feed rf combiners used for each fiber optic transmitter 57 and associated optical fiber 58. As indicated by item 59, two-way control, to be discussed in further detail below, is exerted over the outbound signal flow from end to end.

Figure 6:
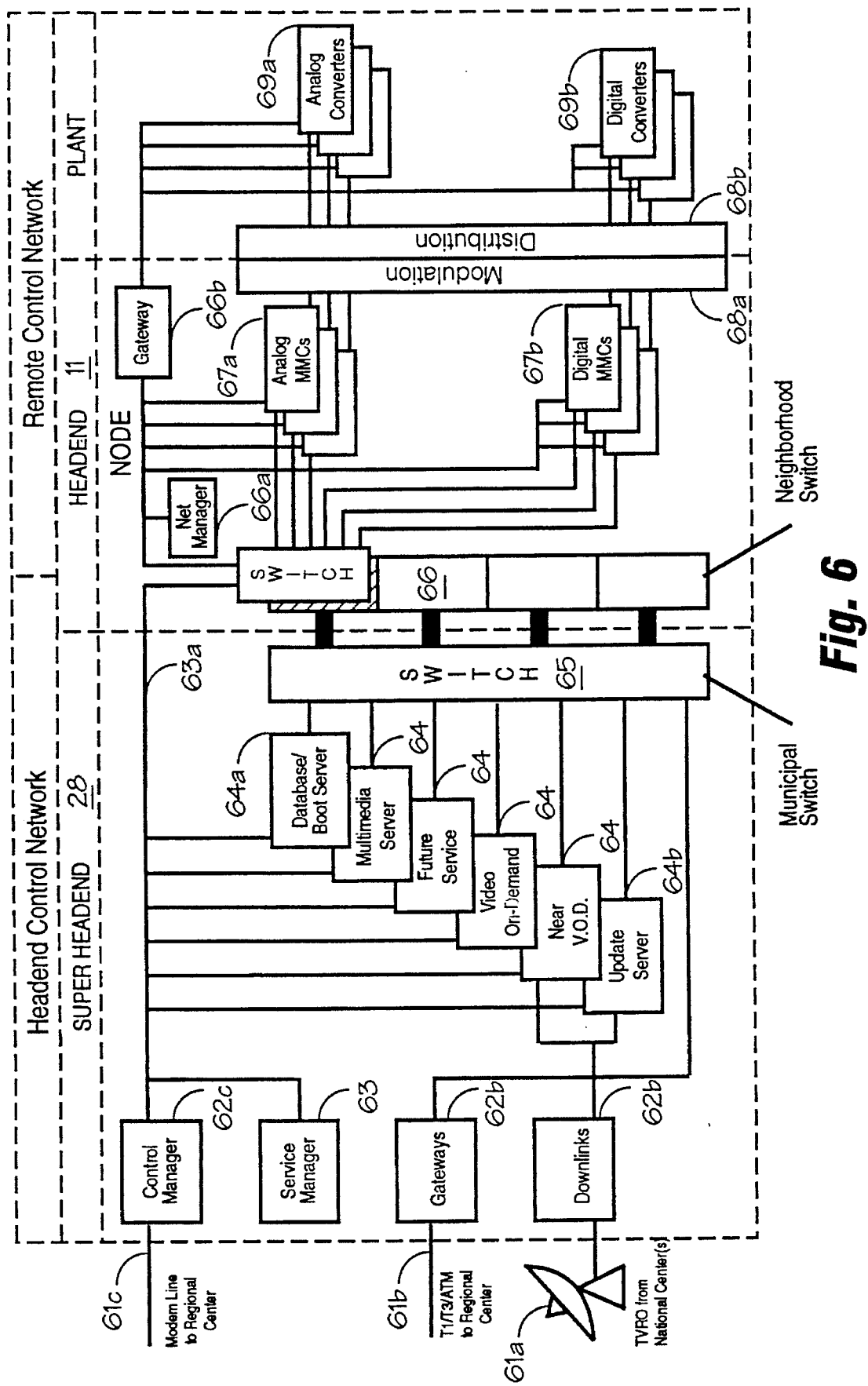
FIG. 6 illustrates the manner in which the architecture of a system similar to that of FIG. 5 uses controls to handle a wide range of information services in both analog and digital formats and distribution arrangements.

FIG. 6 illustrates the manner in which the architecture of a system similar to that of FIG. 5 may handle a wide range of information services in both analog and digital formats and distribution arrangements. A super headend 28 may obtain some information services via television receive only (TVRO) system 61a and downlink 62a, as well as over line 61b using, for example, T1 or T3 bands or ATM digital protocols and gateways 62b. The super headend 28 furnishes information services 64 via switch 65 to the headend 11. These information services may include video on demand, near video on demand, and multimedia presentations. They are provided under the general control of control manager 62c over control bus 63a. A central database may be maintained on server 64a for all subscribers as to the types of service subscribed to and terms for delivery of service, and the delivery of services to the subscribers is monitored and controlled over the control bus 63a by service manager 63. The control manager also has supervisory control on bus 63a over the input switch 66 to headend 11. This switch 66, having an input from the output switch 65 of the super headend 28, feeds the analog MMCs 67a for analog signals in conventional formats and digital MMCs 67b for signals in digital formats. The MMC outputs are then subjected to modulators for appropriate frequency translation (item 68a) and to distribution 68b over the cable network to subscribers having analog converters 69a or digital converters 69b. Interactive information service is enabled by the net manager 66a, which maintains two-way data communication over gateway 66b with each of the converter types 69a and 69b.

Figure 7:
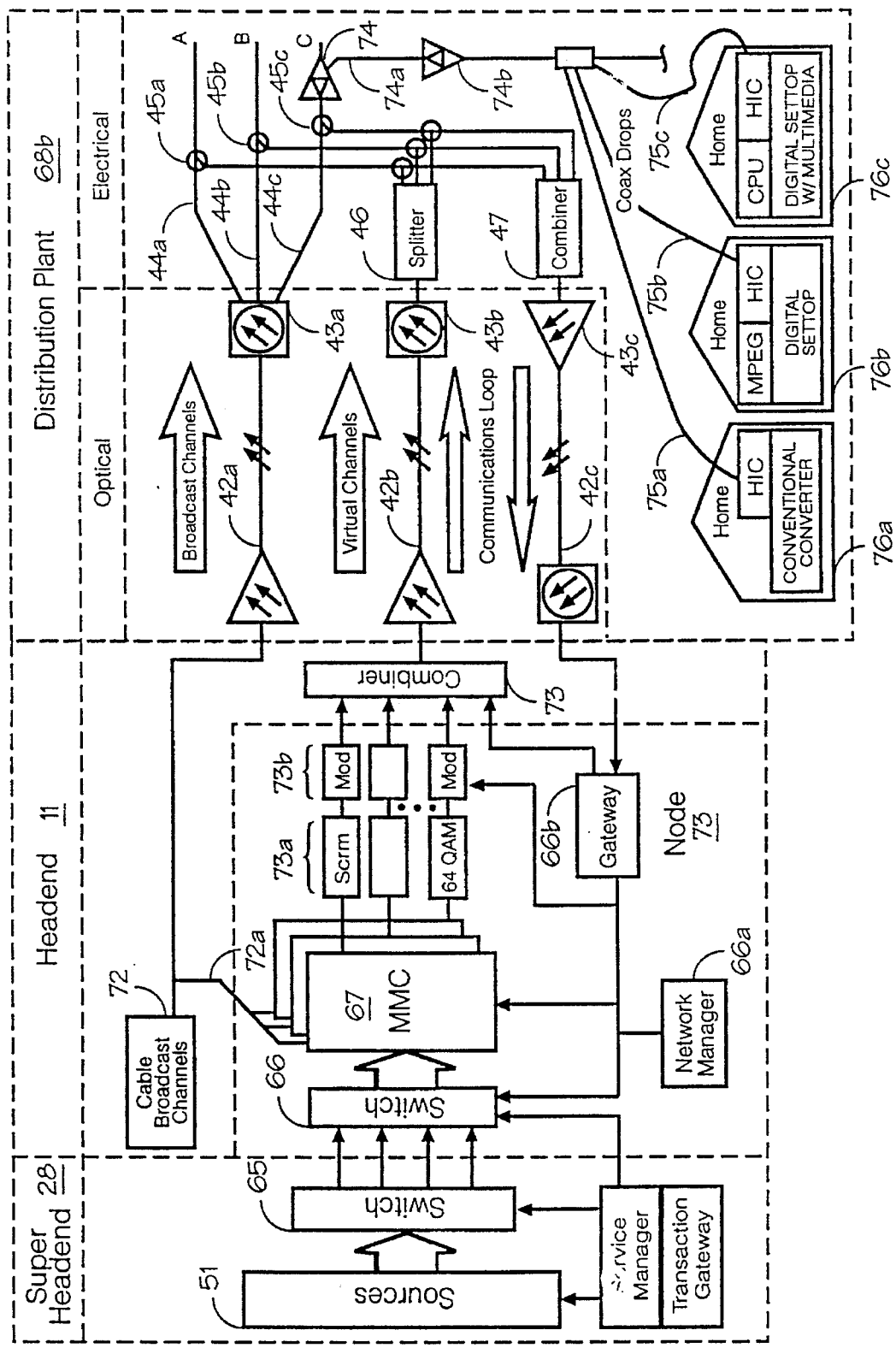
FIG. 7 provides further detail of the system of FIG. 6.

FIG. 7 provides further detail of a system in accordance with FIGS. 4–6. The information sources 51 from the super headend 28 feed its switch 65, the output of which is directed to the headend 11, which contains, in a node 77, input switch 66 feeding a series of MMCs, usage of which is allocated on a demand basis. As described in connection with FIG. 4, conventional cable broadcast channels are routed over main fiber trunk 42a to express trunks 44A, 44B, and 44C. An interactive fiber trunk 42b carries interactive channels (here called "virtual channels" for reasons that will be described below) to splitter 46 for coupling at 45a, 45b, and 45c to express trunks 44A, 44B, and 44C. Combiner 47 takes inbound data from each of the express trunks for delivery over common data fiber trunk 42c to the node at the headend. Analog television information signals from appropriate analog MMCs are processed by scrambling at 73a and modulators at 73b, whereas digital television information signals from appropriate digital MMCs are processed by combining them into a composite QAM (quadrature amplitude modulation) signal before going to modulators at 73b. In this embodiment (as contrasted with the otherwise similar embodiment of FIG. 5), the modulators are preferably capable of modulating a carrier that is tunable by the network manager 66a, so that any given modulator may be configured to best handle demands placed on the system. (In FIG. 5, the modulators are associated with carriers at dedicated frequencies, and the inputs to the modulators are varied by switch 54.) Depending on capacity of the cable system and the information services sought to be delivered, some of the cable broadcast channels 72 may alternatively be provided, over path 72a to the MMCs, as information services on demand furnished by node 77. (Such an approach may conserve bandwidth on the cable distribution plant 68b or permit more offerings to be made to subscribers.) Additionally, the path 72a permits the MMCs operating interactively to permit a subscriber to make overlays on otherwise conventional cable television programming. The outputs of items 73b are then combined by combiner 73 and fed to the interactive trunk 42b. The cable distribution plant 68b includes bridger amplifiers 74, feeders 74a, feeder amplifiers 74b, and cable drops such as 75a, 75b, and 75c serving homes 76a, 76b, and 76c.

The information services can be provided to a subscriber over virtual channels in which the channel number changes for different interactive information services, even though the various information services may be provided over a fixed frequency input to the set top, with the control data from subscriber's set top causing the headend to supply a different information service as the subscriber appears to be changing the channel. This feature is described in further detail below.

The modular structure of the node 77 and the arrangement of the distribution plant 68b permit serving simultaneously homes such as 76a with a conventional converter, 76b with a digital set top having MPEG decompression, and 76c with a digital set top having multimedia capability achieved with a home-based central processing unit. Each home has a home interface controller operating as part of the set top configured as described below.

Figure 8:
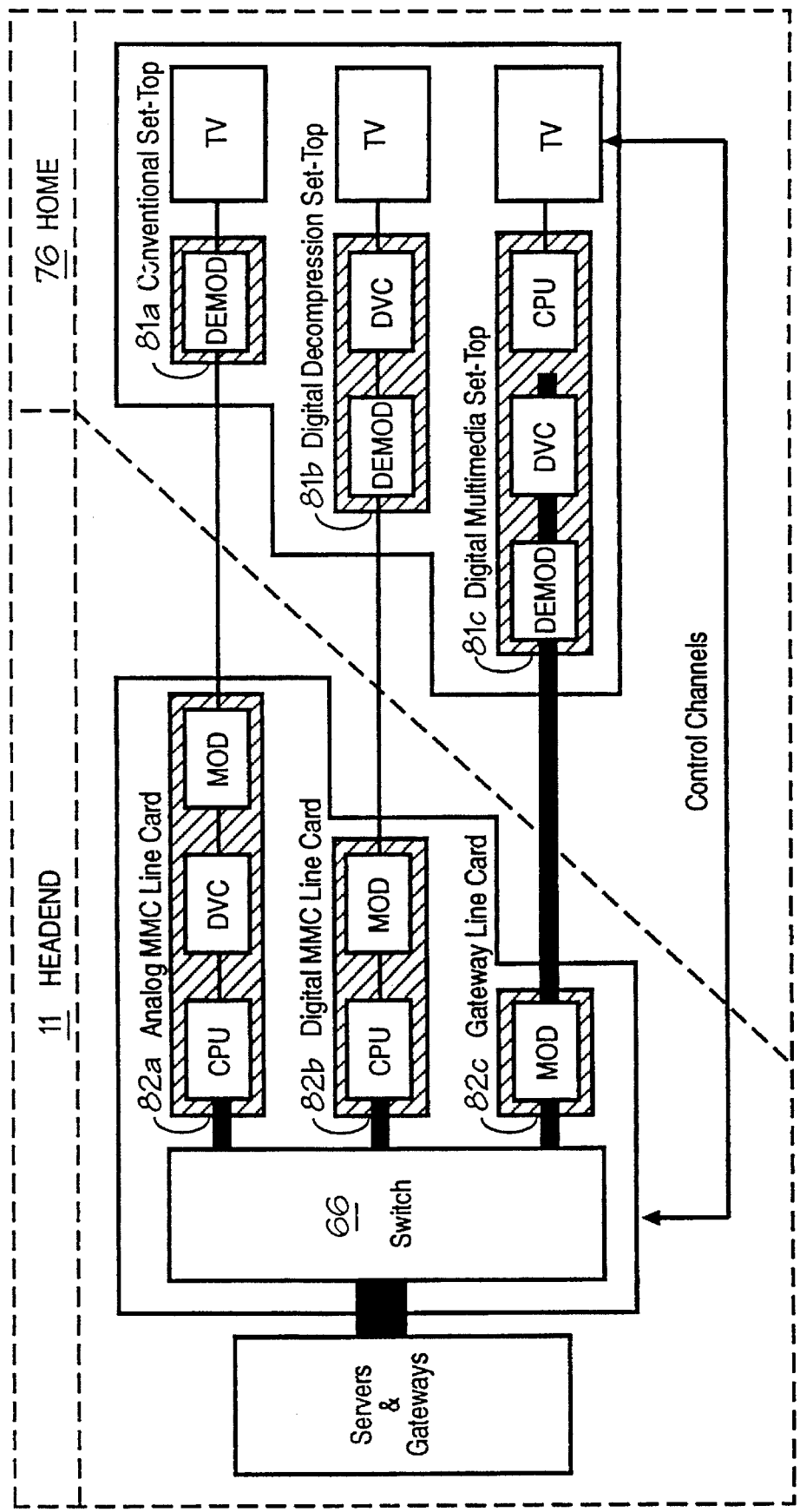
FIG. 8 shows the signal processing aspects of the system of FIG. 7.

FIG. 8 shows the signal processing aspects of the system of FIG. 7. This figure does not show the distribution system, and therefore applies equally to telephone or cable distribution architectures. An analog MMC 82a in the node at headend 11 will typically pick off, under control of a central processing unit (CPU), a television information signal in digital form from switch 66 and then decompress the signal, subject it to appropriate frequency translation by a modulator and provide over the distribution system to homes where a conventional set top in block 81a can permit the signal to be demodulated for display by the television. A digital MMC 82*b* in the node at headend 11 also operates under control of a CPU, but does not need to decompress the signal. The signal is subjected to appropriate frequency translation and then distributed to the home. At the home, in block 81*b*, the signal is demodulated and decompressed at the set top for display by the television. In the case of digital multimedia set tops in the home, it is primarily frequency translation that needs to be provided at the headend node, which is achieved by gateway card 82*c*, and the set top in block 81*c* includes the CPU for processing of the signal from the headend.

Figure 9:
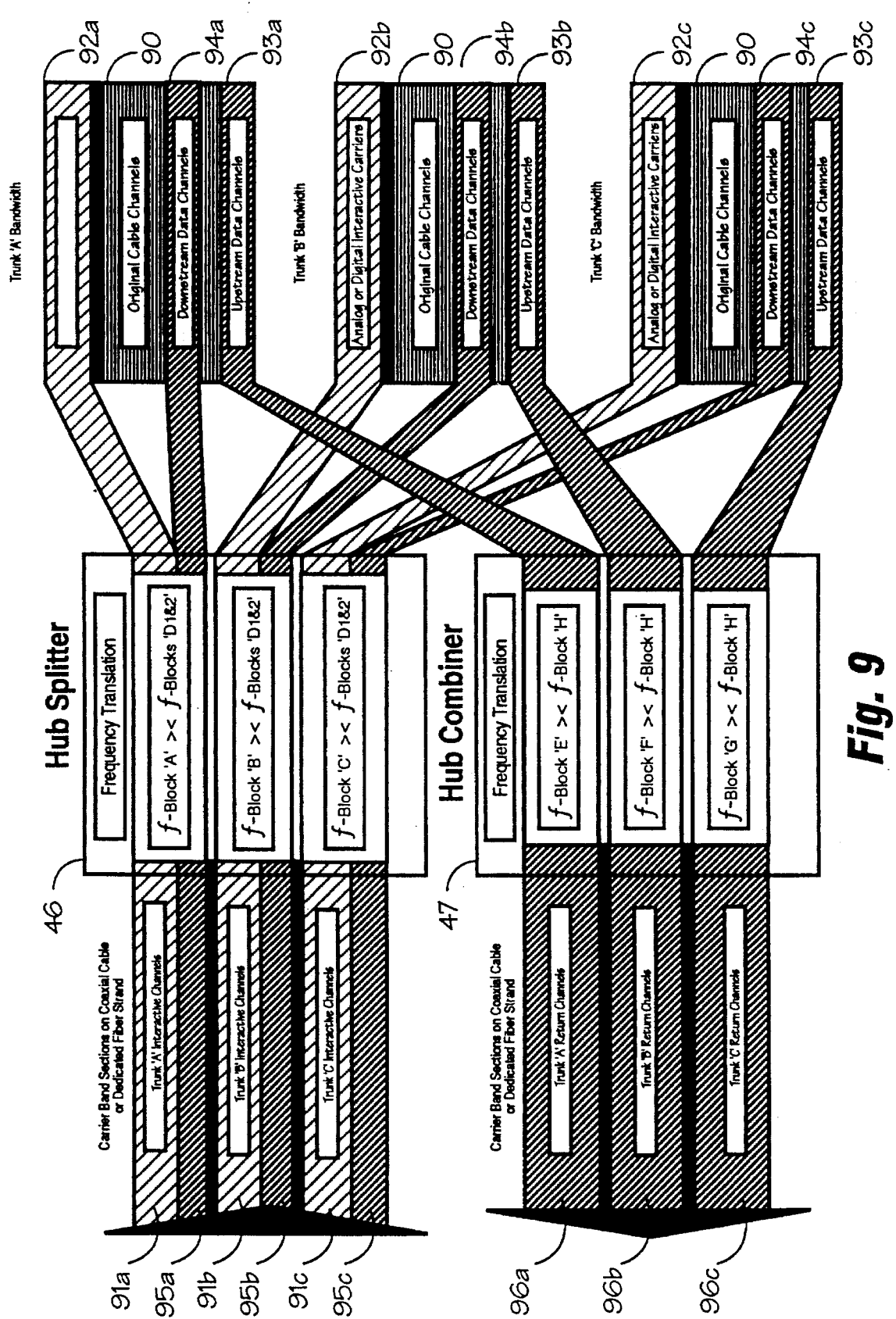
FIG. 9 shows detail of the splitter and combiner of FIG. 7.

FIG. 9 shows detail of the splitter 46 and combiner 47 of FIGS. 4 and 7. Signals fed into splitter 46 include spectral regions for television information signals 91A for information services on demand for subscribers served by express trunk 44A and for outbound data 95A for providing interactive service to these subscribers. Similarly, there are spectral regions for television information signals 91B for information services on demand for subscribers served by express trunk 44B and for outbound data 95B for providing interactive service to these subscribers; also television information signals 91C for information services on demand for subscribers served by express trunk 44C and for outbound data 95C for providing interactive service to these subscribers. The signals in these spectral regions are subject to frequency translation so that corresponding bands 92A, 92B, and 92C in each of express trunks 44A, 44B, and 44C respectively carry television information signals for information services on demand to subscribers served by these trunks. Frequency translation is also used so that corresponding bands 94A, 94B, and 94C carry outbound (downstream) data for providing interactive service to these subscribers in each of express trunks 44A, 44B, and 44C respectively. As discussed above in connection with FIG. 4, conventional cable channels occupy corresponding bands (here shown as item 90) in each of the express trunks.

Inbound (upstream) data for interactive service are handled by the hub combiner in the reverse manner. The data initially occupy corresponding bands 93A, 93B, and 93C on trunks 44A, 44B, and 44C, and are subject to frequency translation by combiner 47 so that the inbound data from trunk 44A occupy a first spectral region 96A, the inbound data from trunk 44B occupy a second spectral region 96B, and the inbound data from trunk 44C occupy a third spectral region 96C.

Figure 10:
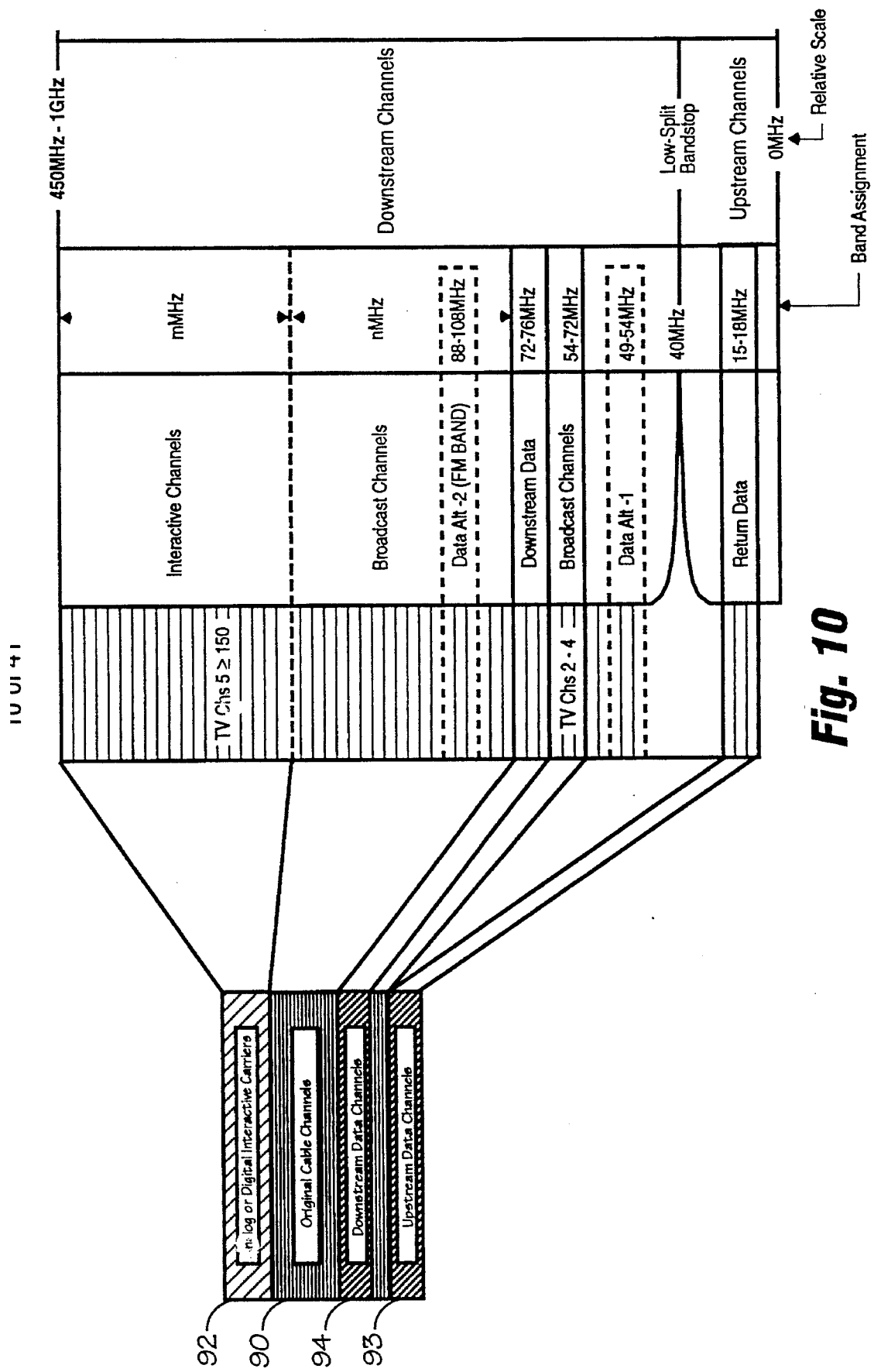
FIG. 10 shows the allocation of frequency bands in the express trunks of FIG. 9.

FIG. 10 shows the allocation of frequency bands in the express trunks 44A, 44B, and 44C. The return data in band 93 occupy the 15–18 MHz region. The downstream data in band 94 occupy the region above channel 4 in the range 72–76 MHz. The television information signals for interactive service in band 92 are located above the allocation 90 for conventional cable broadcast channels. These frequency assignments are merely illustrative, however. Moreover, the television communications and the data communications between node and subscriber home can be achieved in a wide variety of formats. Instead of putting each television information signal on a separate carrier at a separate frequency in the express trunks 44A, 44B, and 44C, for example, the signal could be provided as a compressed digital data stream on a time-shared basis or as addressed packets. In fact, data communications in both directions (inbound to the node and outbound to the home interface controller) in accordance with a preferred embodiment of the invention utilizes slotted ALOHA protocols, so that data communications utilizes addressed packets.

FIGS. 11A–11D show the structure of a chassis in accordance with a preferred embodiment of the present invention for holding multimedia controllers (MMCs) and modulator cards constituting components of the system illustrated in FIG. 7. A rack 112 in FIG. 11A holds switch 66 of FIG. 7 along with the MMCs and encoder and modulator cards 73*a* and 73*b* of FIG. 7. The MMCs and other cards are mounted in rows 114 of the rack 112. Each row of cards is supported on a chassis 113 shown in FIG. 11D. The MMCs (called processor line cards in FIG. 11B and processors in FIG. 11D) are plugged into the left, rearward portion of the chassis 113, and the encoder and modulator cards are plugged into the right, forward portion of the chassis. The central vertical member 115 of the chassis provides on both sides buses for digital and rf communication, as well as power for the cards that are mounted on either side of the chassis. The chassis 113 is mounted in the rack 112 so that the processor line cards 67 face the reader in FIG. 11A. It can be seen, from the code letters in FIG. 11A for the card types listed in FIG. 11B, that a wide range of specialized MMCs may be employed to permit the system to provide a wide range of information services in a wide range of formats. Thus MMCs may be employed for movies only (A) (providing, for example, decompression of stored digitally compressed movies in MPEG format), for providing multimedia presentations using software utilizing the Intel 486 microprocessor (B) or the Intel Pentium microprocessor (C), or using 3DO or SGI formats (D and E). Digital MMCs (item (configured with corresponding modulator as suggested in item 82*b* of FIG. 8) (item F), as well as various communications cards including some with Live Sync (permitting interactive overlays on broadcast programming) (G) and permitting Home-v-Home communications (by which subscribers in two or more homes may communicate interactively, for example, in a computer game)(H) and gateway cards (I) are also provided. (Live Sync and Home-v-Home are trademarks of ICTV Inc., the assignee herein.)

Figure 11:
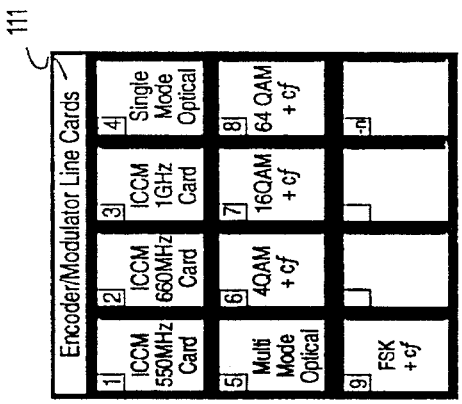
FIGS. 11A–11D show the structure of a chassis in accordance with a preferred embodiment of the present invention for holding multimedia controllers (MMCs) and modulator cards constituting components of the system illustrated in FIG. 7.
Figure 11:
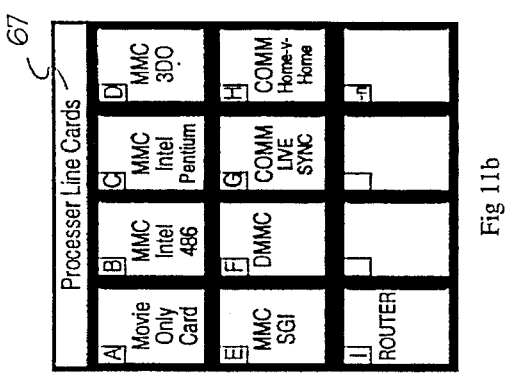
Figure 11:
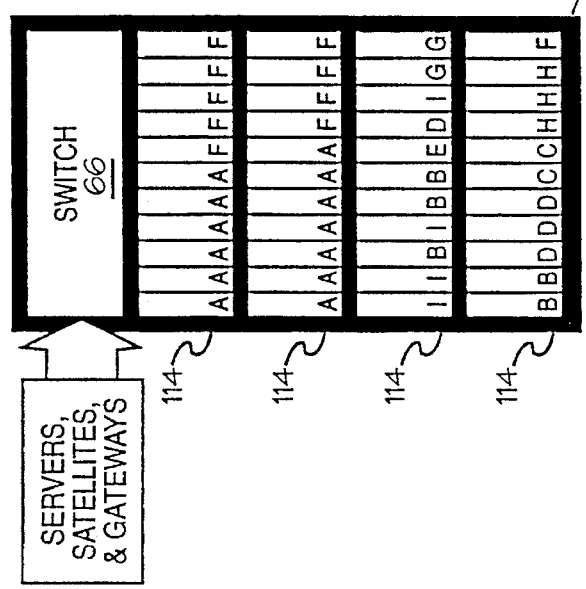
Figure 11:
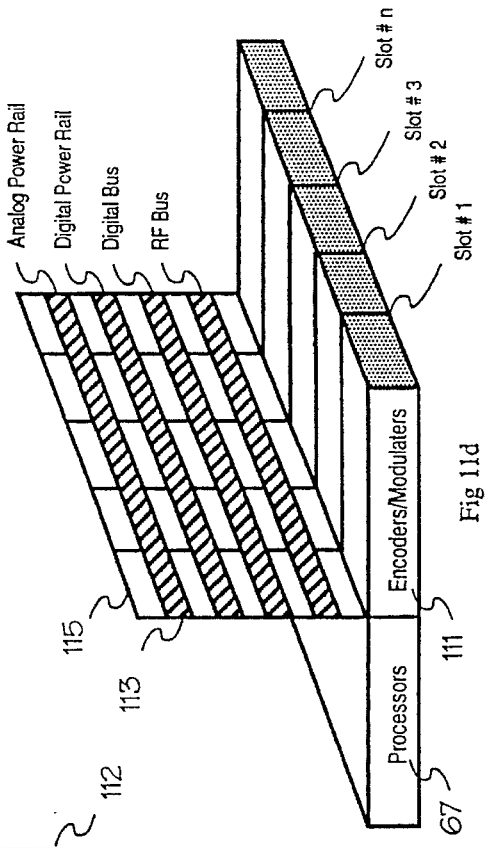
Figure 12:
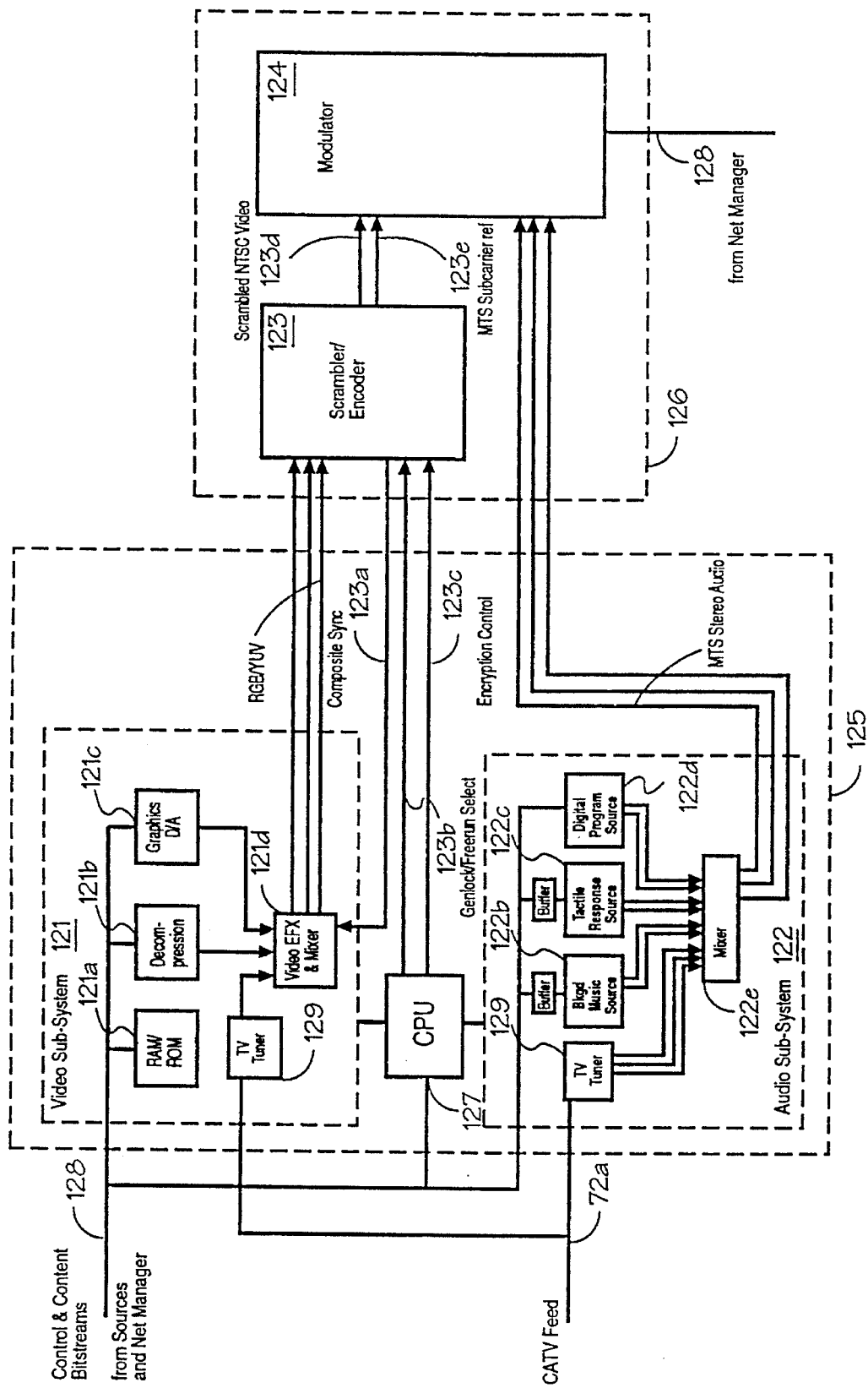
FIG. 12 illustrates the structure of analog MMC and modulator cards for the chassis of FIG. 11.

FIG. 12 illustrates the structure of an analog MMC 125 and a scrambler-modulator card 126 for the chassis of FIG. 11. The MMC includes a video sub-system 121 and audio sub-system 122 operating under control of CPU 127 and control line 128 from the net manager 66*a* of FIG. 7. Line 128 also is in communication with sources of information services, which receive decompression by block 121*b* and are mixed in the video effects and mixer module 121*d*. The module 121*d* also receives input from graphics digital-to-analog converter 121*c* (providing, among other things, display for subscriber interaction) utilizing data from RAM/ROM storage 121*a* and control/content bitstream data obtained over line 128. TV tuner 129 also provides video signals from conventional cable television channels over line 72*a* to the module 121*d*. The RGB/YUV output of the module 121*d* is provided to the scrambler-modulator card 126. The module 121*d* also receives a composite sync signal input from scrambler/encoder 123 for use in providing a system timing reference to the video overlay.

The audio sub-system 122 in FIG. 12 has a coupling to TV tuner 129 (redrawn in this sub-system for convenience in reference) to provide audio signals from conventional cable television channels over line 72*a* to a mixer 122*e*, which also receives signals from background music source 122*b*, tactile response source 122*c* (for use in connection with the subscriber's remote control 14 in interactive television service), and digital program source 122*d*, which obtain control and content data over line 128. MTS stereo audio output of the mixer 122*e* is then provided to the modulator 124 of card 126.

The scrambler-modulator card 126 takes the RGB input from the video sub-system 121 and encryption control signal from CPU 127 to provide a scrambled video output to modulator 124. The audio output of the mixer 122e of the audio sub-system 122 is fed directly to the modulator 124. The frequency of the carrier that is modulated is determined by control of the net manager over line 128.

Figure 14:
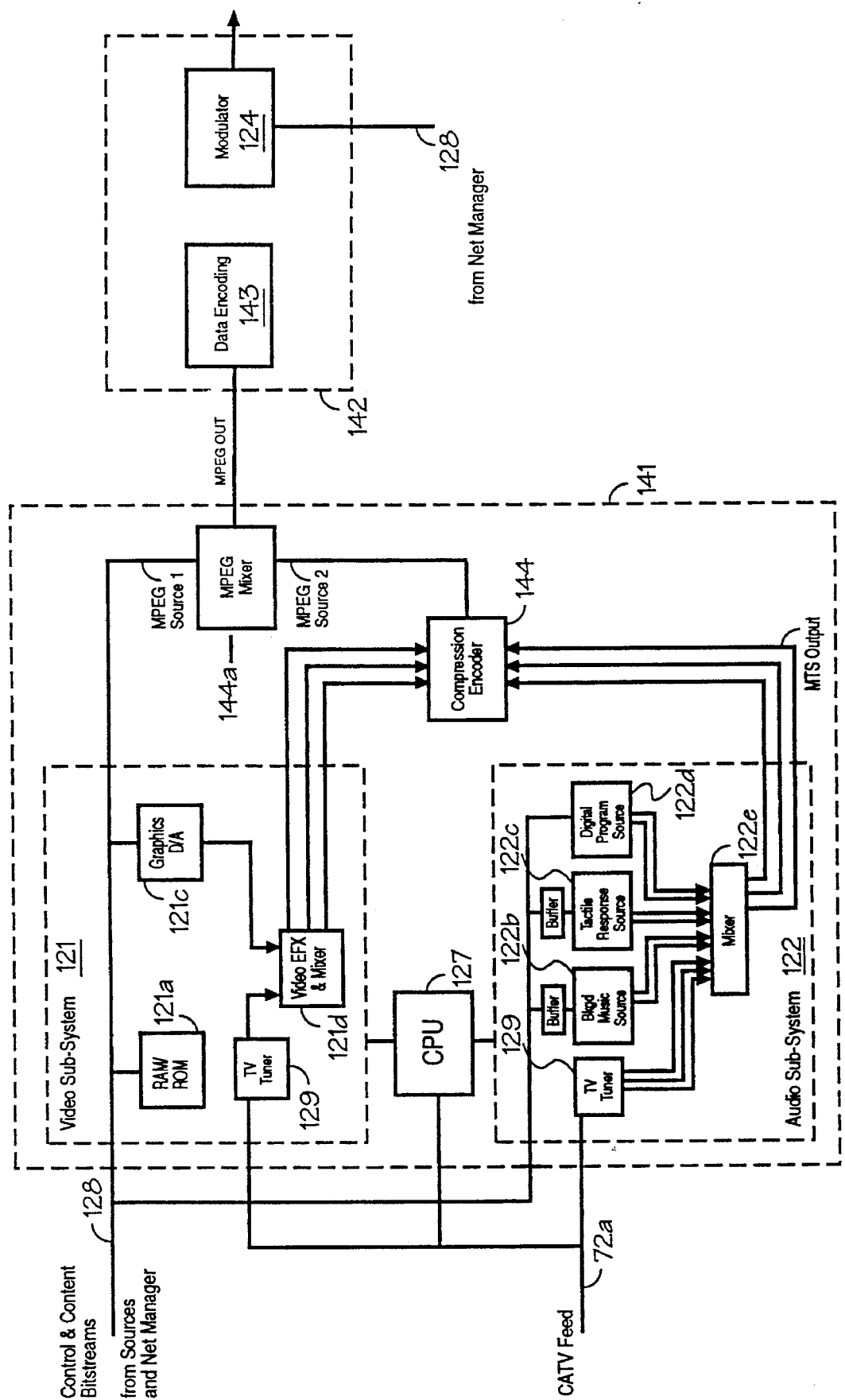
FIG. 14 illustrates the structure of digital MMC and modulator cards for the chassis of FIG. 11.

The structure of digital MMC and modulator cards 141 and 142 shown in FIG. 14 is similar to that of the analog cards in FIG. 12. The TV tuner and graphics digital-to-analog converter outputs are mixed as in FIG. 12. Instead of decompressing the digital video source before feeding it to the mixer module 121d, however, the compression here is maintained and sent directly to MPEG mixer 144a as MPEG source 2. The analog output of mixer 121d is compressed by compression encoder 144, which also receives the MTS audio output. The output of the compression encoder serves as source 1 input to MPEG mixer 144a. This MPEG output is then sent to encoder 143 and modulator 124. The MPEG mixing in block 144a is achieved by recognizing that the graphics overlay data from digital-to-analog converter 121c provides video content that does not change rapidly, and therefore can be implemented by causing the mixer to affect only the I-frame picture elements in the MPEG compression scheme with respect to the overlay content. (MPEG's compression scheme is described in "C-Cube CL450 Development Kit User's Guide," dated Dec. 14, 1992, Chapter 2, available from C-Cube Microsystems, Milpitas, Calif., which is hereby incorporated herein by reference.) The MPEG mixer 144 includes an arrangement for providing the source 1 MPEG-encoded digital signal to a buffer; an arrangement for extracting from the source 2 digital signal I-frame picture elements to be overlayed; and an arrangement for overlaying the I-frame picture elements from the source 2 digital signal onto the corresponding regions of the I-pictures of the source 1 digital signal. The other picture types of the source 2 signal are not permitted by the mixer to modify portions of the I-picture that have resulted from the mixing.

Figure 13:
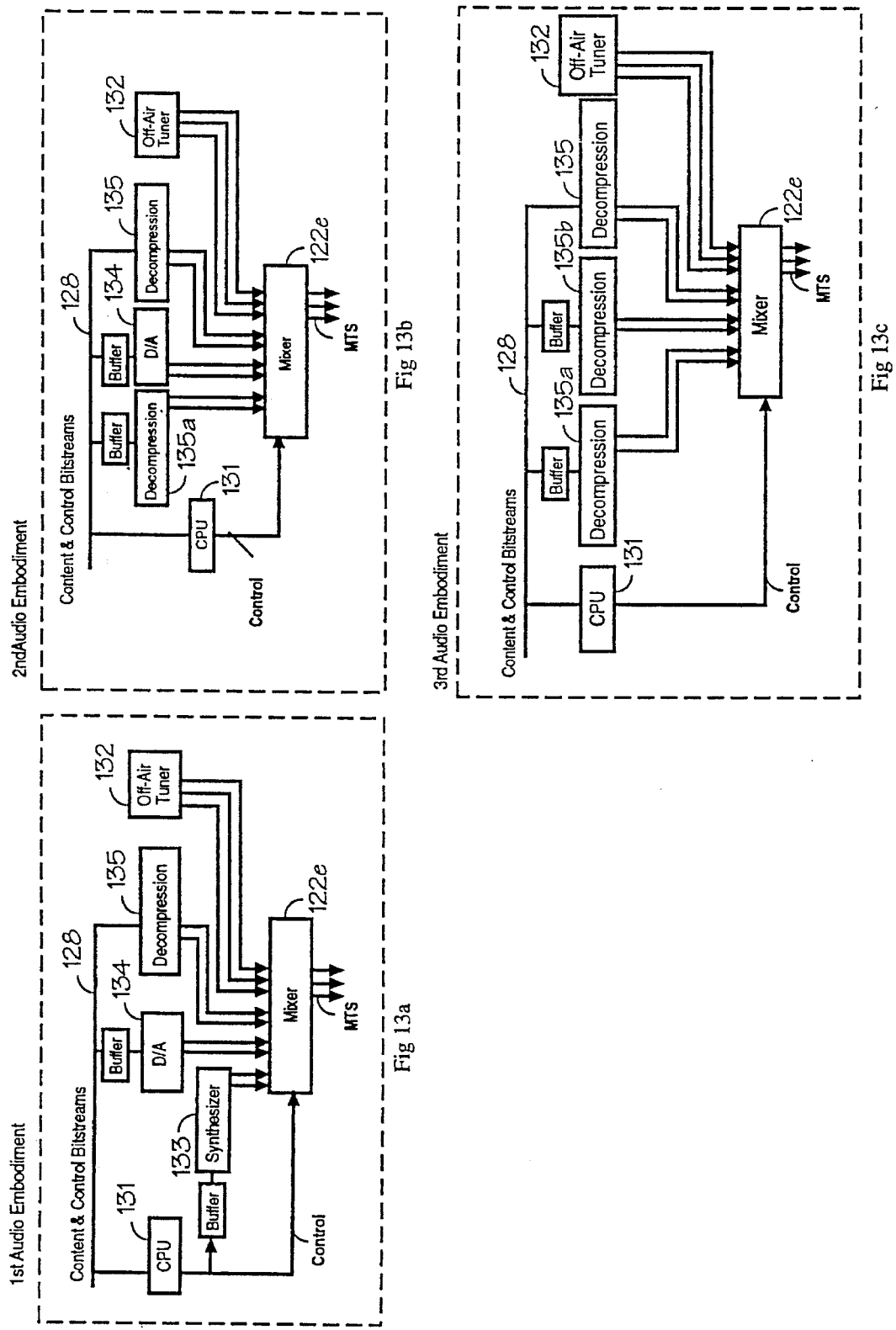
FIG. 13 illustrates the structure of preferred embodiments of the audio subsystems for the MMCs of FIGS. 12 and 14.

FIGS. 13A–13C illustrate the structure of preferred embodiments of the audio subsystems for the MMCs of FIGS. 12 and 14. In these embodiments, there are provided mixer 122e and, controlling its operation, a CPU 131, which may, but need not, be the same as CPU 127 of FIGS. 12 and 14. The CPU 131 of FIG. 13A is operated in association with synthesizer 133. The content bitstreams on line 128 may include digitally compressed audio that is decompressed by block 135. These embodiments also have an off-air tuner 132, which may, but need not, be the same as tuner 129 of FIGS. 12 and 14. Other formats of digital audio, shown here coverted by digital-to-analog converter 134, are also within the scope of the use of these embodiments. In lieu of synthesizer 133 there may be provided a second decompression unit 135a (FIG. 13B), and similarly, in lieu of digital-to-analog converter 134, there may be provided a third decompression unit 135b.

Figure 15:
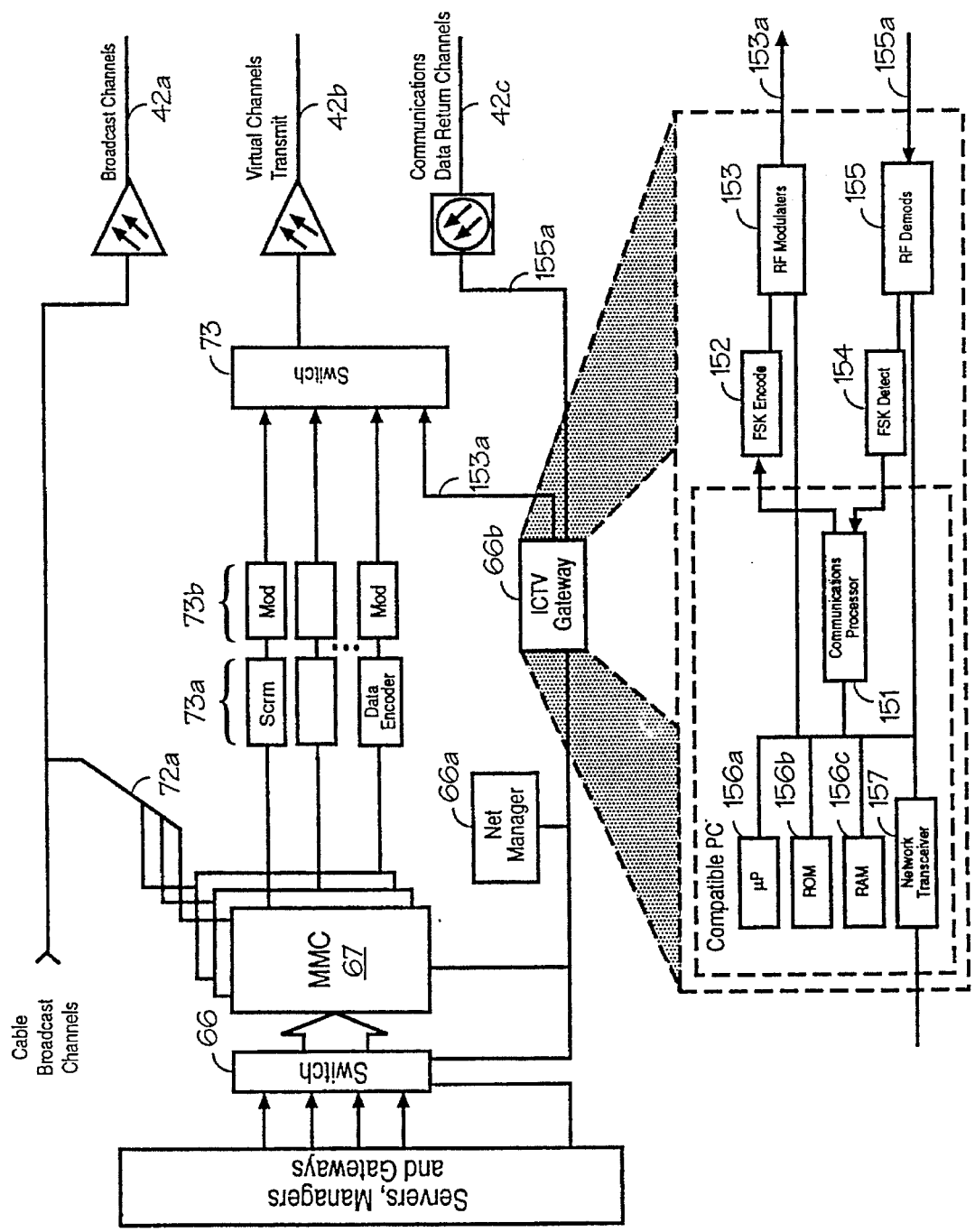
FIG. 15 illustrates the structure of the data communications link at the headend (node) of the system of FIG. 7.

FIG. 15 illustrates the structure of the data communications link at the headend (node) of the system of FIG. 7 with subscriber home interface controllers downstream. Outbound data leave gateway 66b via line 153a where they go out over the interactive fiber trunk 42b. Inbound data enter gateway 66b via line 155a from common return line 42c. The outbound data leave from rf modulators 153 utilizing frequency shift key (FSK) encoding via encoders 152, and the inbound data enter via rf demodulators 155 using FSK detectors. Communications processing of the data is handled by communications processor 151 under control of compatible PC having microprocessor 156a, ROM 156b, and RAM 156c. The control may be managed additionally via network transceiver 157. The slotted ALOHA protocol used in a preferred embodiment for inbound and outbound data communications requires that each home interface controller is assigned an address for data packets that are used in communication with the node. When a subscriber causes his home interface controller to select a virtual channel, the net manager 66a of the node is signalled to that effect. The net manager 66a, on determining that a given home interface controller is sought to be used for interactive television service (i.e., that the given home interface controller should be placed in an interactive mode), allocates additional data communication bandwidth for data communication with the particular home interface controller, so as to establish on a demand basis the data communications bandwidth utilized by the particular home interface controller.

Depending on the nature of the information service selected by the subscriber in selecting a particular virtual channel, an appropriate MMC is assigned by the net manager 66a on a demand basis to serve the subscriber's home interface controller while it is in the interactive mode. In the case of many types of interactive television service, the home interface controller will have exclusive use of the assigned MMC, a "private line" to it over the data communications link and the interactive trunk 42b. In the case of near video on demand, however, several home interface controllers may share the same time slot on a movie, for example, and these subscribers would have a "party line" to the MMC.

As described in further detail below, appropriate MMCs can be used to provide overlays or other graphics on the television screen when the home interface controller is appropriately equipped.

Figure 16:
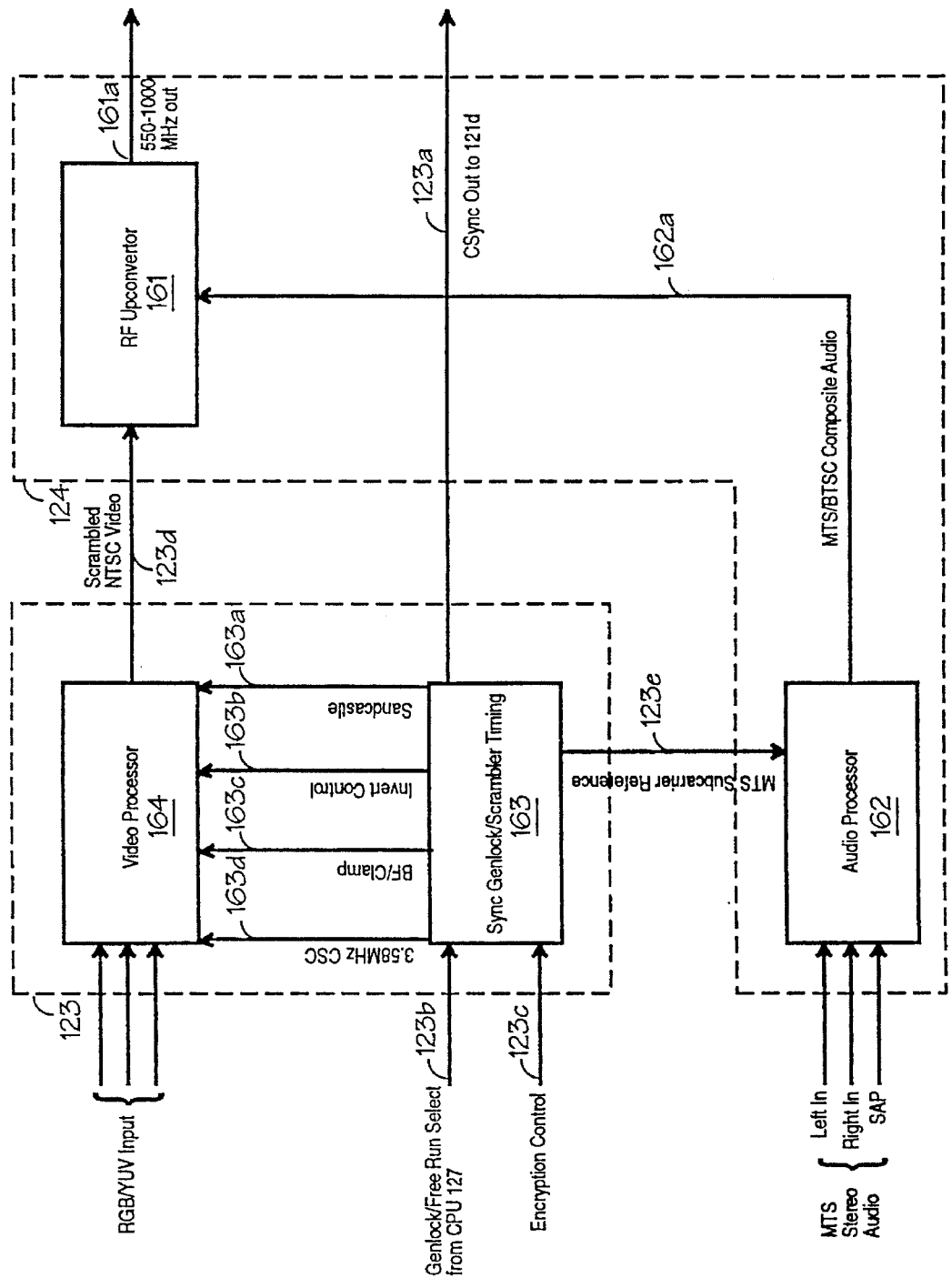
FIG. 16 illustrates the structure of the encoder/modulator of FIG. 12.

FIG. 16 illustrates the structure of the encoder/modulator 126 of FIG. 12. It includes a video processor 164 that has an RGB/YUV input and produces a scrambled NTSC video output on line 123d. The video processor has inputs from sync genlock/scrambler timing block 163, including 3.58 MHz color subcarrier on line 163d, burst flag on line 163c, invert control on line 163b, and sandcastle pulses on line 163a. The sync genlock/scrambler timing block 163 has inputs including genlock/free run select and encryption control 123c from CPU 127, and provides composite sync output on line 123a. The sync genlock/scrambler timing block 163 also provides MTS subcarrier reference signal over line 123e to audio processor 162. The audio processor 162 includes standard MTS stereo audio inputs for left, right, and secondary audio program. The scrambled NTSC video signal on line 123d together with the MTS composite audio output of audio processor 162 are used to modulate a carrier at a desired frequency (established by the net manager 66a of FIGS. 6 and 7) by rf upconverter 161.

Figure 18:
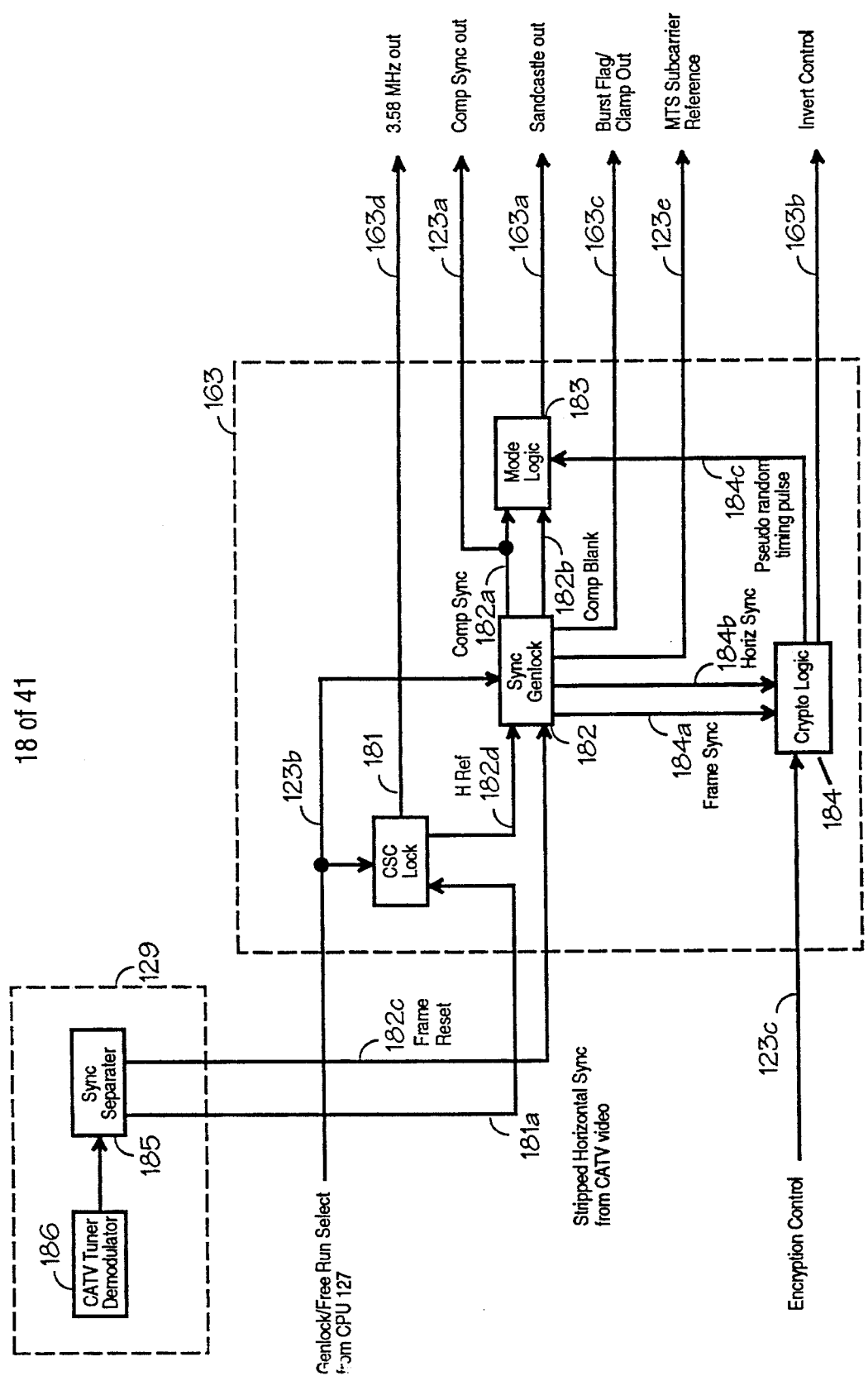
FIG. 18 illustrates the structure of the sync generator lock and scrambler timing section of FIG. 16.

FIG. 18 illustrates the structure of the sync genlock/scrambler timing block 163 of FIG. 16. It is used to generate a series timing signals for both scrambling and overlay synchronization that are either genlocked to an external CATV signal or are otherwise inherently stable. The TV tuner 129 of FIG. 12 additionally includes demodulator 186 in FIG. 18 and sync separator 185. The sync separator includes stripped horizontal sync output from conventional cable television video on line 181a and frame reset signal on line 182c. The stripped horizontal sync signal on line 181a forms a reference for phase-locking a 3.58 MHz oscillator in color subcarrier lock block 181, the output of which is furnished on line 163d. The signal on line 163d is divided down to provide a horizontal reference signal on line 182d. The signal on line 182d provides a reference for phase locking the generation of sync signals by sync genlock block 182. This block provides composite sync and blanking signals on lines 182a and 182b, as well as frame sync, horizontal sync, burst flag, and MTS subcarrier reference on lines 184a, 184b, 163c, and 123e respectively. Block 182 provides frame sync and horizontal sync signals to crypto logic block 184. It also provides composite sync and composite blanking signals to mode logic block 183. The crypto logic block 184 and mode logic block 183 work in cooperation with one another to produce sandcastle pulses on line 163a in the manner described below in connection with FIG. 21. The sandcastle pulses are used to provide scrambled NTSC video in the manner also described below in connection with FIG. 21.

Figure 21:
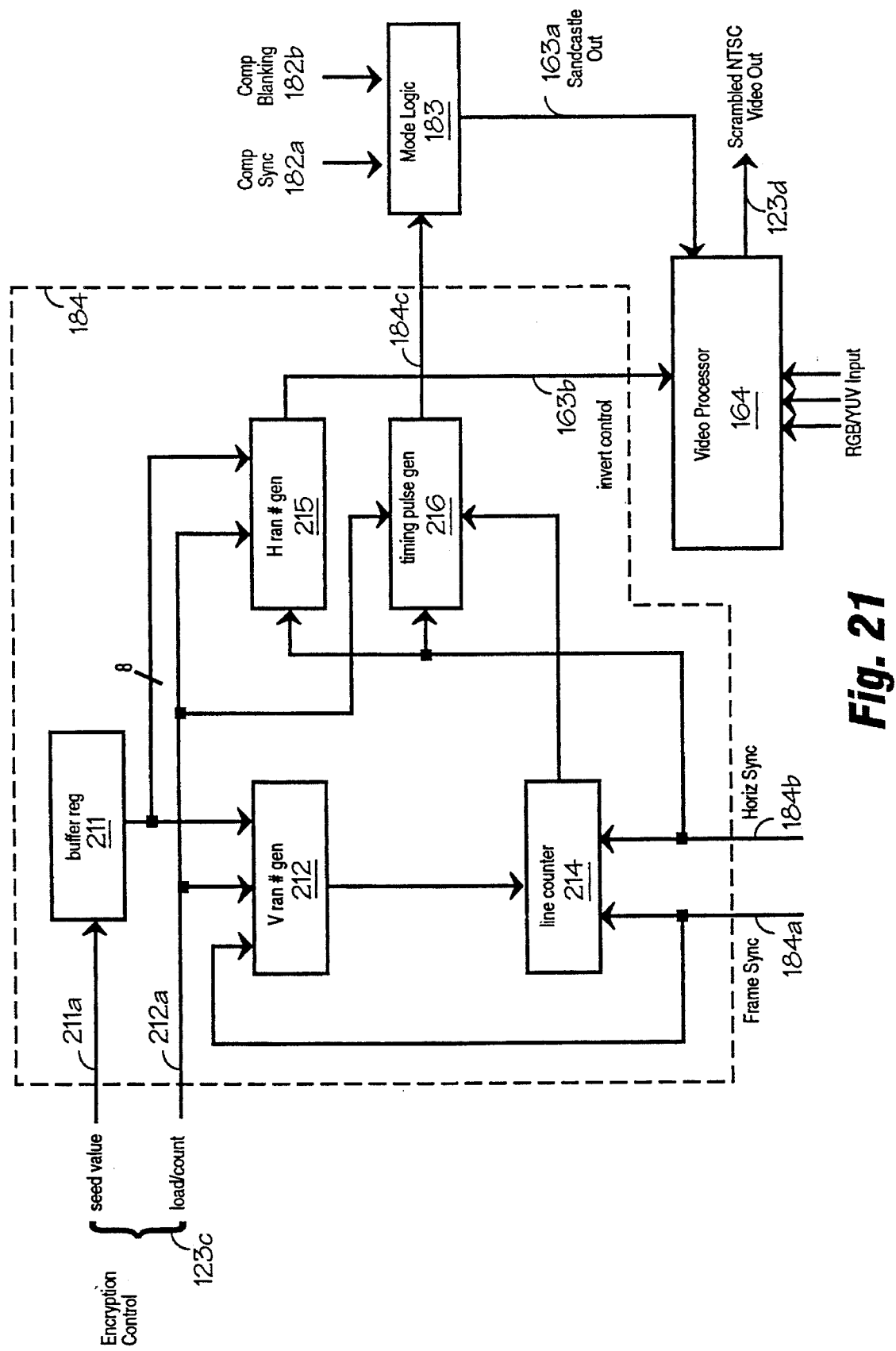
FIG. 21 illustrates the structure of a scrambler for use with the modulator of FIG. 16.

FIG. 21 illustrates an implementation of scrambling by crypto logic block 184 of FIG. 18 in cooperation with mode logic 183 and video processor 164. The scrambling is achieved by removing substantially all sync pulses from the NTSC signal. Infrequent (at least once per frame, two fields per frame) and randomly spaced horizontal pulses (sandcastles) are then reinserted. The effect of such scrambling is to deprive the standard NTSC receiver from obtaining horizontal and vertical sync lock with the incoming signal. This causes rapid horizontal and vertical roll of the picture. During the intervals in which the removed sync signals were formerly present, the scrambler clamps the video to a nearly white level. As a result when the video signal tends toward levels corresponding to black, the receiver frequently interprets this video content as a sync signal, with the further effect that the horizontal rolling and the vertical rolling are aperiodic.

The sandcastles are reinserted at a pseudorandom position in each consecutive frame, determined by vertical random number generator 212 in FIG. 21. The line counter 214 is clocked by horizontal sync presented on line 184b, and is reset by frame sync pulses on line 184 each frame. The line counter 214 stores a new number from the vertical random number generator 212 each time a frame reset pulse is received. When line counter 214 has counted down to zero from the stored number, it triggers timing pulse generator 216 to send a pulse into mode logic control 183. Occasionally, on command from the load/count line 212a, the timing pulse generator 216 is caused to produce sandcastles in a plurality of successive lines. A command from the load/count line 212a also triggers the loading from buffer register 211 of a previously stored seed value (loaded from line 211a) into both the vertical random number generator 212 and the horizontal random number generator 215. The seed value and load/count numbers over lines 211a and 212a are provided by CPU 127 of FIG. 12 on command of the net manager initially each time an MMC is assigned to serve a particular home interface controller and subsequently whenever the home interface controller reports over the data communications link that it has lost sync. Additionally the CPU 127 may be programmed to generate new seed values and load/count numbers in accordance with any desired strategy to resist efforts at rederiving sync without authorization.

Each sandcastle pulse looks like the sum of the composite blanking and composite sync signals. The shape of the sandcastle pulse is therefore such that when summed in the summer 172 of FIG. 17 with sync suppressed video, the result is a signal that has a normal NTSC blanking period once per frame, and moreover, the normal blanking period occurs at pseudorandomly located lines in successive frames. The sandcastle pulses appear on line 163a from mode logic controller 183. Composite sync signals 182a and composite blanking signals 182b are therefore summed and gated by the mode logic control 183 on receipt of pulses from the timing pulse generator 216 as described above. The width of the timing pulse generator signal over line 184c, which governs the duration of the sandcastle pulse, is equal to the horizontal blanking period.

In a manner analogous to the functioning of the vertical random number generator, the horizontal random number generator 215 issues a pulse at pseudorandom line intervals. Each pulse has the duration of the active video portion of one horizontal line, and is fed over input 163b so as to cause the video processor 164 to produce entire horizontal lines having inverted video.

Figure 17:
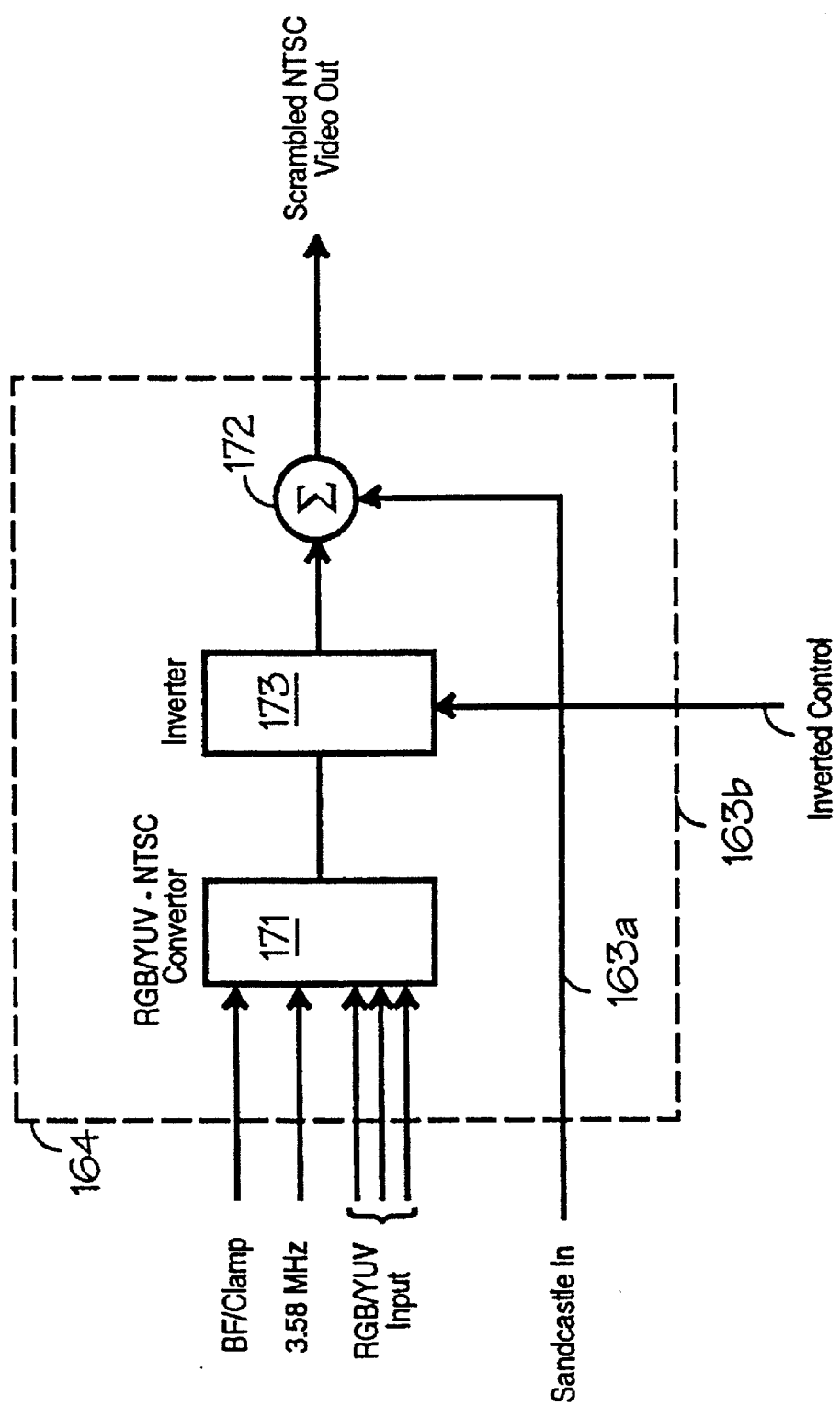
FIG. 17 illustrates the structure of the video processor of FIG. 16.

FIG. 17 illustrates the structure of the video processor 164 of FIGS. 16 and 21. Block 171 shows a RGB/YUV to NTSC converter that is supplied with conventional inputs (including RGB/YUV, 3.58 MHz color subcarrier, and burst flag) but, in this case, lacking any sync or blanking input signals. The converted output is standard NTSC with the exception that all sync information is suppressed. The inverter 173, under control of pulses present over line 163b, operates to invert the video on a random line-by-line basis in the manner described in connection with FIG. 21 above. The inverter output is then summed in summer 172 with the sandcastle pulses to produce the scrambled NTSC waveform described above.

Figure 22:
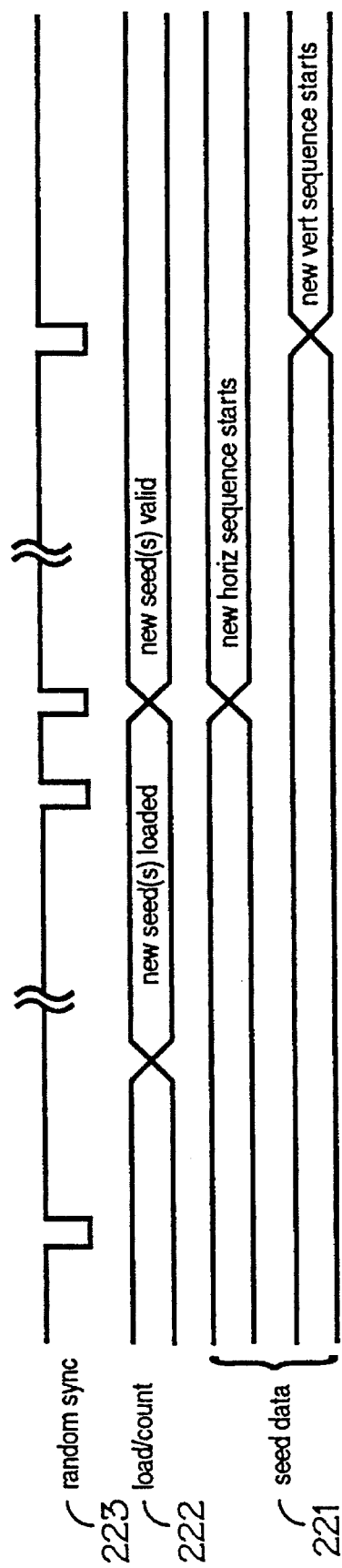
FIG. 22 illustrates the seed data timing used in connection with the scrambler of FIG. 21.
Figure 23:
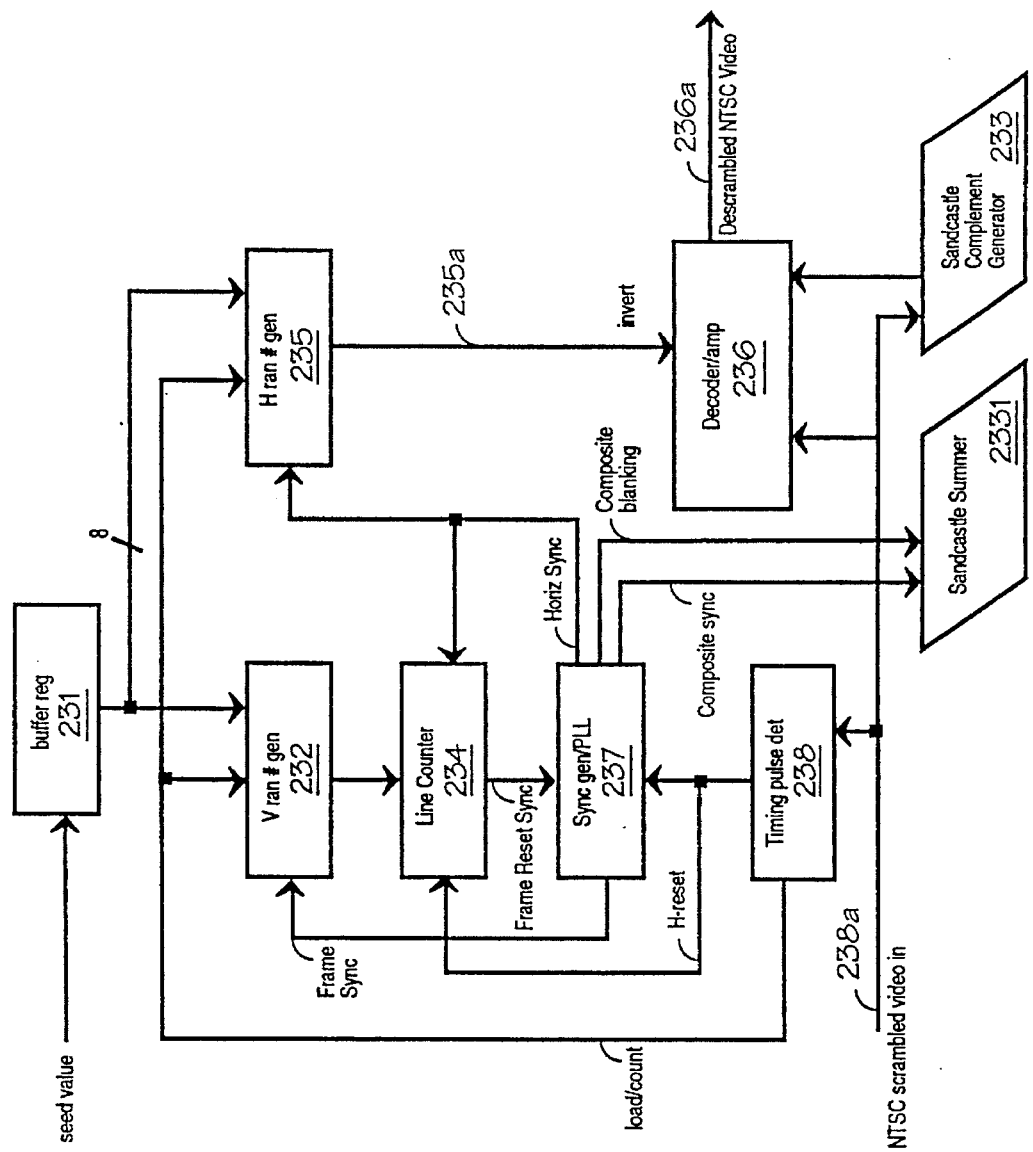
FIG. 23 illustrates the structure of a descrambler suitable for use in a home interface controller in accordance with a preferred embodiment of the present invention for descrambling a video signal that has been scrambled by a system in accordance with FIG. 21.

FIG. 23 illustrates the structure of a descrambler suitable for use in a home interface controller in accordance with a preferred embodiment of the present invention for descrambling a video signal that has been scrambled by a system in accordance with FIG. 21. It will be recalled in connection with FIG. 21 that the seed value and load/count numbers over lines 211a and 212a are provided by CPU 127 of FIG. 12 on command of the net manager initially each time an MMC is assigned to serve a particular home interface controller. The same seed value is also provided to the particular home interface controller and is stored in the buffer register 231. Each time a new seed value is loaded into buffer register 211 of the scrambler, the same seed value is loaded into the buffer register 231 of the descrambler. The value in register 231 remains in the register until clocked into the vertical and horizontal pseudorandom number generators 232 and 235 respectively by a pulse from the timing pulse detector 238. The relative timing of the seed data, and the load/count pulses, and the occurrence of sandcastles in the scrambled NTSC video are shown as items 221, 222, and 223 of FIG. 22.

Timing pulse detector 238 monitors the incoming scrambled video over line 238a. The timing pulse detector 238 produces a clocking pulse when it detects the plurality of pulses produced in the scrambled NTSC video when the scrambler in FIG. 21 received a load/count pulse over line 212a. (In this manner the timing pulse detector causes the generation a pulse at a time with respect to the received scrambled signal corresponding generally to the occurance of the load/count pulse when the original signal was being scrambled.) The timing pulse detector clocking pulse then causes the stored seed value to be loaded into the pseudorandom number generators 232 and 235.

The timing pulse generator 238 also detects the occurance of single sandcastle pulses, and these are used to trigger the loading of the line counter 234 and the reset of the sync generator 237. This generator is phase-locked to the color burst and therefore produces the necessary sync signals to reconstruct a descrambled NTSC signal. The composite sync and composite blank signals from the generator 237 feed sandcastle summer 2331 to produce a full series of sandcastles for every line and the entire NTSC frame structure. The output of summer 2331 goes to sandcastle complement generator 233, which gates the input every time a sandcastle occurs on the scrambled video input line 238*a*. The output of the sandcastle complement generator is therefore a stream of sandcastles that lacks a sandcastle at each time, and only at each time, a sandcastle is present in the scrambled video signal. This output is fed to the decoder/ amplifier 236, where it is summed with the scrambled video signal to produce an output that has a sandcastle at every line and is therefore a descrambled NTSC video signal.

In a manner analogous to the function of the inverter control on line 163*b* of FIGS. 21 and 17, there is produced an inverter control signal on line 235*a* by the horizontal pseudorandom number generator 235, which produces a pulse at time corresponding to the production of a pulse by horizontal pseudorandom number generator 215. This control signal on line 235*a* causes a second inversion (and therefore restoration) of the previously inverted line of video caused by inverter 173 of FIG. 17. The result is fully restored NTSC video on line 236*a*.

Figure 19:
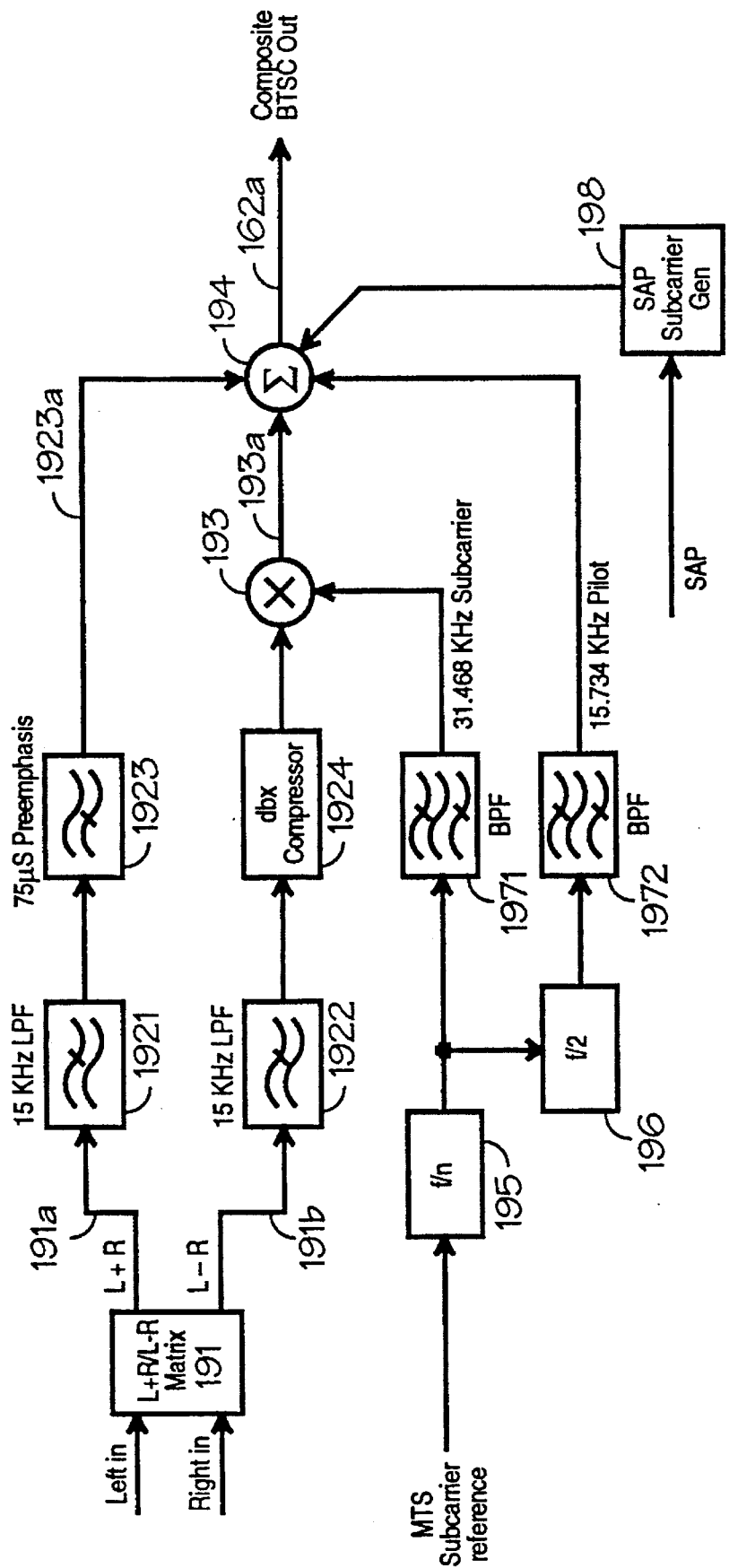
FIG. 19 illustrates the structure of the audio processor section of FIG. 16.

FIG. 19 illustrates the structure of the audio processor section 162 of FIG. 16. Left and right audio inputs from audio sub-system 122 are provided to the sum and difference matrix 191. The L+R sum output on line 191*a* is subjected to low-pass filter 1921 and pre-emphasis filter 1923. Similarly, the L–R difference on line 191*b* is subjected to low-pass filter 1922 and dbx compressor 1924 and the compressor output is fed to a double balance mixer 193. MTS subcarrier reference signal on line 123*e* is subject to frequency division by divider 195, and further frequency division by halver 196. The output of the first divider 195 is bandpass filtered by item 1971, and the resulting output is furnished to the double balanced mixer, so as to produce a double sideband suppressed carrier signal on line 193*a*. This signal is summed by summer 194 with the pre-emphasized L+R signal on line 1923*a* and the SAP subcarrier signal, the latter which is provided by SAP subcarrier generator 198, to which the SAP signal from audio sub-system 122 is supplied. This produces a composite BTSC signal on line 162*a*, which is furnished to rf upconverter 161 described in FIG. 16.

Figure 20:
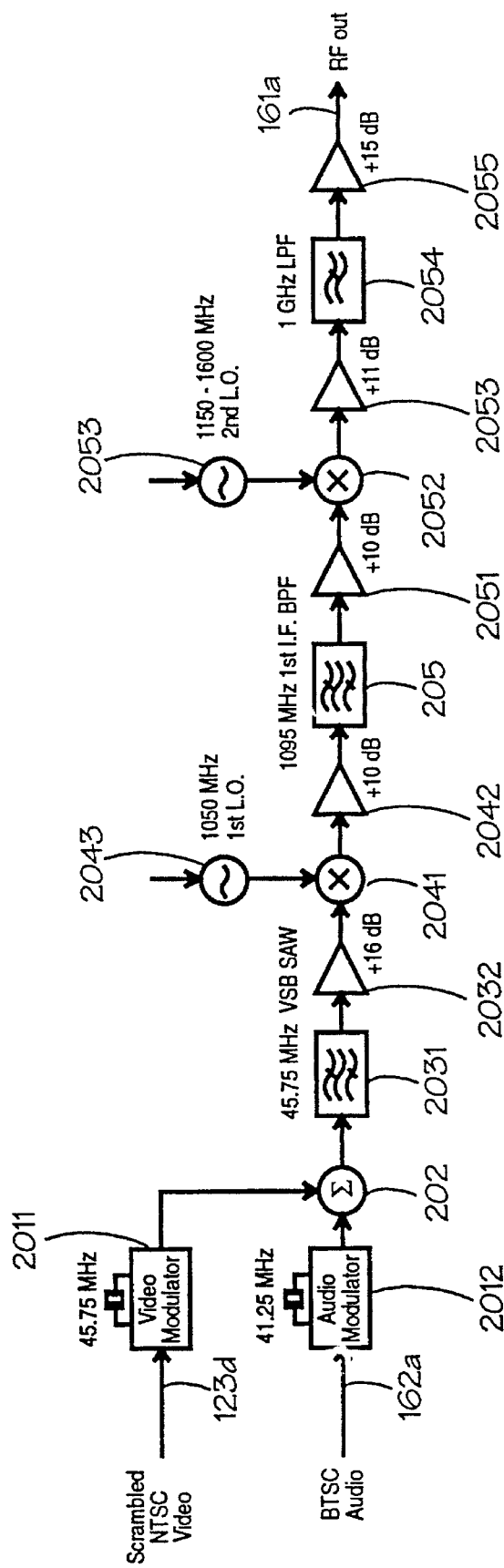
FIG. 20 illustrates the structure of the rf upconverter section of FIG. 16.

FIG. 20 illustrates the structure of the rf upconverter section 161 of FIG. 16. The inputs include BTSC audio on line 162*a* and scrambled NTSC video on line 123*d*. The video input is provided to an a.m. modulator 2011 and the audio input is provided to an f.m. modulator 2012, and the respective modulator outputs are summed in summer 202. The output of the summer is bandpassed by filter 2031 and amplified by amplifier 2032. The amplifier output is mixed with the signal from first local oscillator 2043, and the desired upper sideband is amplified and bandpass filtered by amplifier 2042 and filter 205. This intermediate frequency signal is then run through amplifier 2051 and mixed in mixer 2052 with a signal from a second local oscillator 2053 that is frequency agile (here a phase-locked oscillator). The output is amplified (in amplifier 2053) and low-pass filtered by filter 2054, to eliminate the upper sideband, and the resulting signal is amplified by amplifier 2055 and provided as an output on line 161*a*. (This output is fed to combiner 73 of FIG. 7.)

Figure 24:
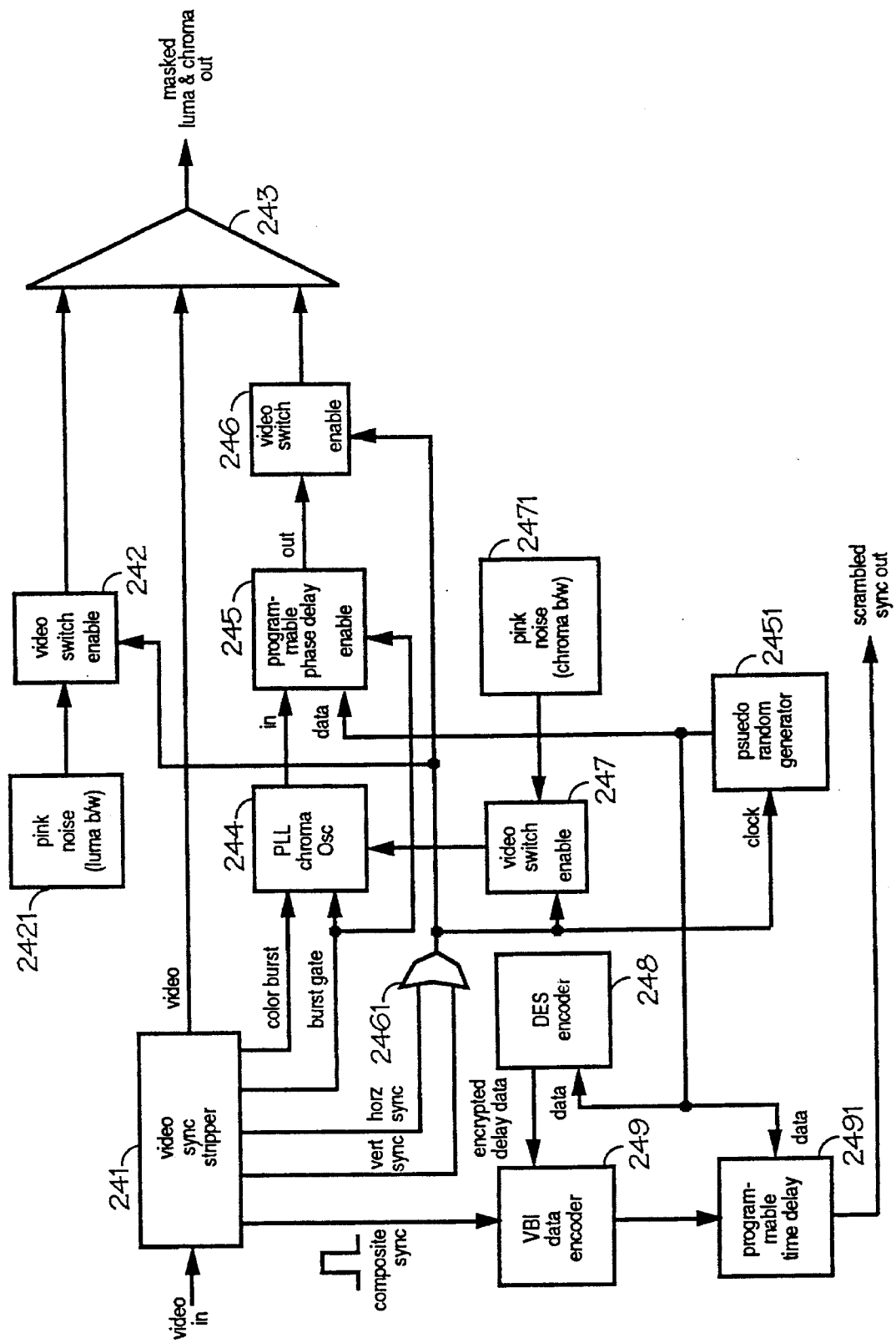
FIG. 24 illustrates an alternative scrambling system.

FIG. 24 illustrates an alternative scrambling system. The system has an NTSC sync stripper 241 that supplies sync stripped video to a mixer 243, which masks sync signals by supplying a chroma subcarrier at all times, including during horizontal and vertical retrace. In addition, the luminance signal is caused to be present at all times.

These results are achieved by using the vertical and horizontal sync outputs from stripper 241 to provide an output from OR gate 2461 when either of both of vertical and horizontal retrace signals are present. This output gates via switch 242 a pink noise luminance masking signal from generator 2421 into the mixer 53. This output also is affected via switch 247 by a pink noise signal from generator 2471 used in turn to modulate phase-locked loop oscillator 244 to produce a modulated chroma subcarrier masking signal. This signal is subject to an optional programmable phase delay 245 to cause different phase shift of the signal during the color burst interval on a line-by-line basis in accordance with a phase offset generated by pseudo random generator 2451. The composite sync signal output from stripper 241 is provided with an encrypted value for the current phase shift caused by generator 2451. The encrypted value is obtained from DES encoder 248, and this encrypted value, a digital signal, is placed on the signal during the vertical blanking interval as a binary pattern by vertical blanking interval data encoder 249. The composite sync signal is then subjected to an optional variable time delay by delay 2491 by a reference value that is also obtained from pseudo random generator 2451. Of course a separate generator could be used, provided that the value obtained from such a generator is also encoded on the composite sync signal. This resultant scrambled composite sync signal is then provided as an output. This system therefore provides a continuously present chroma subcarrier, a continuously present luminance signal, and shifts the color burst by a random amount. The scrambled video is therefore relatively difficult to descramble, without access to the method of scrambling.

Figure 25:
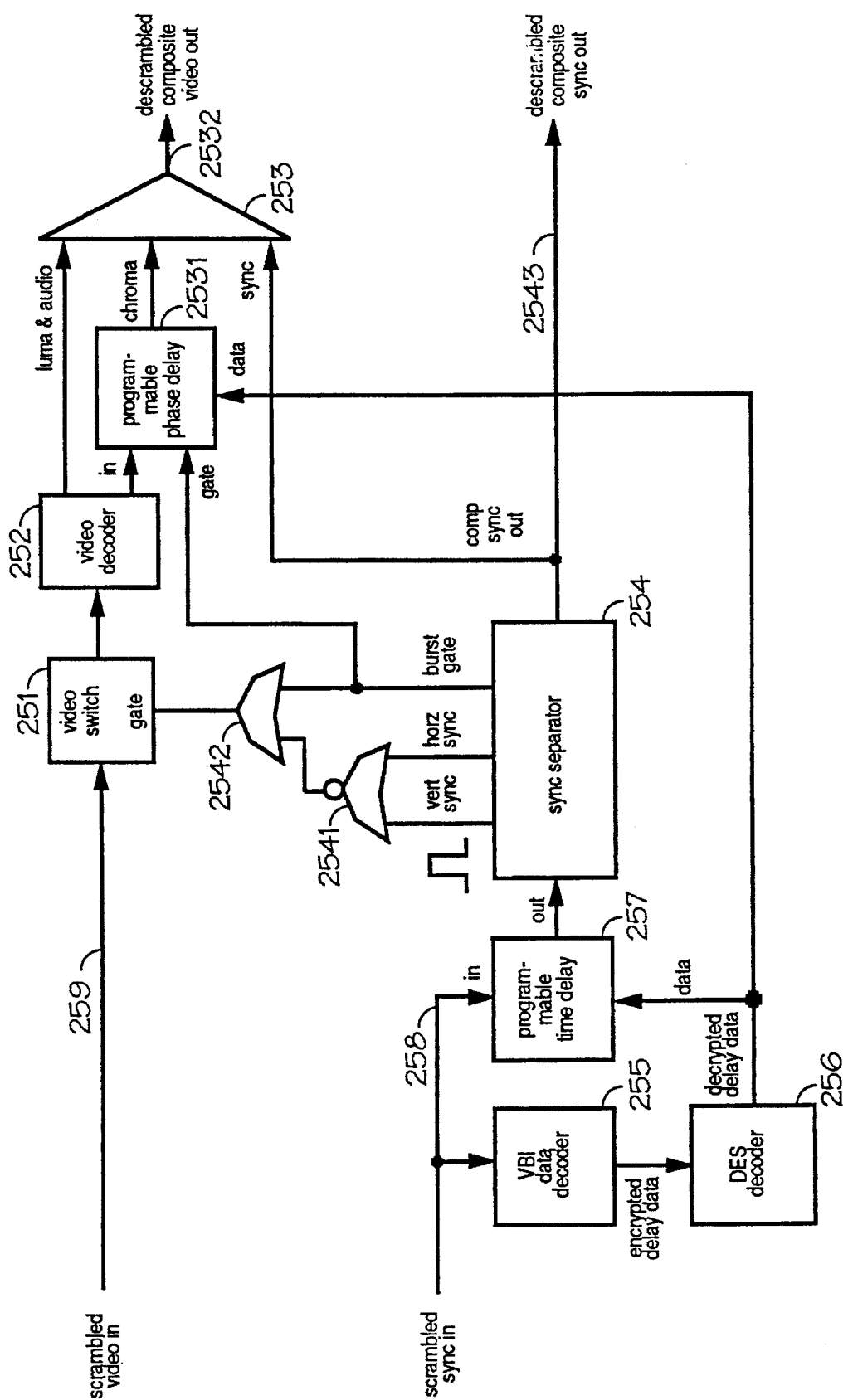
FIG. 25 illustrates a descrambling system for use with video that has been scrambled by the system in accordance with FIG. 24.

FIG. 25 shows a video descrambler system for descrambling the video scrambled in accordance with a system such as shown in FIG. 24. The scrambled video signal provided over line 259 is gated off during both the vertical and the horizontal retrace intervals by gate 251, thereby removing the masking signals that interfere with proper sync, and the proper sync signal, presented on line 2543, is also added to mixer 253 to provide the composite video output over line 2532. The scrambled sync present at input 258 is first used to provide the encrypted delay information (if an encrypted delay is used) which is decoded from the vertical blanking interval data by decoder 255 and deciphered by DES decoder 256. The scrambled sync signal is run through the programmable time delay 257 to provide a composite sync signal that is in phase with the video. Sync separator 254 provides separate outputs for vertical and horizontal sync as well as a gate signal for the color burst. The vertical and horizontal sync signals are run through NOR gate 2541 and OR gate 2542, so that 251 gates off the video during vertical and horizontal retrace except during color burst. Optional video decoder 252 separates the chroma subcarrier (in the event that it is phase shifted), and the separated subcarrier is run through optional programmable phase delays 2531 in an amount specified by the decrypted delay data to recover the original phase of the subcarrier. The resultant corrected subcarrier is mixed with the luminance and audio subcarrier and the composite sync signal by mixer 253 to provide a descrambled composite video signal over line 2532.

Figure 26:
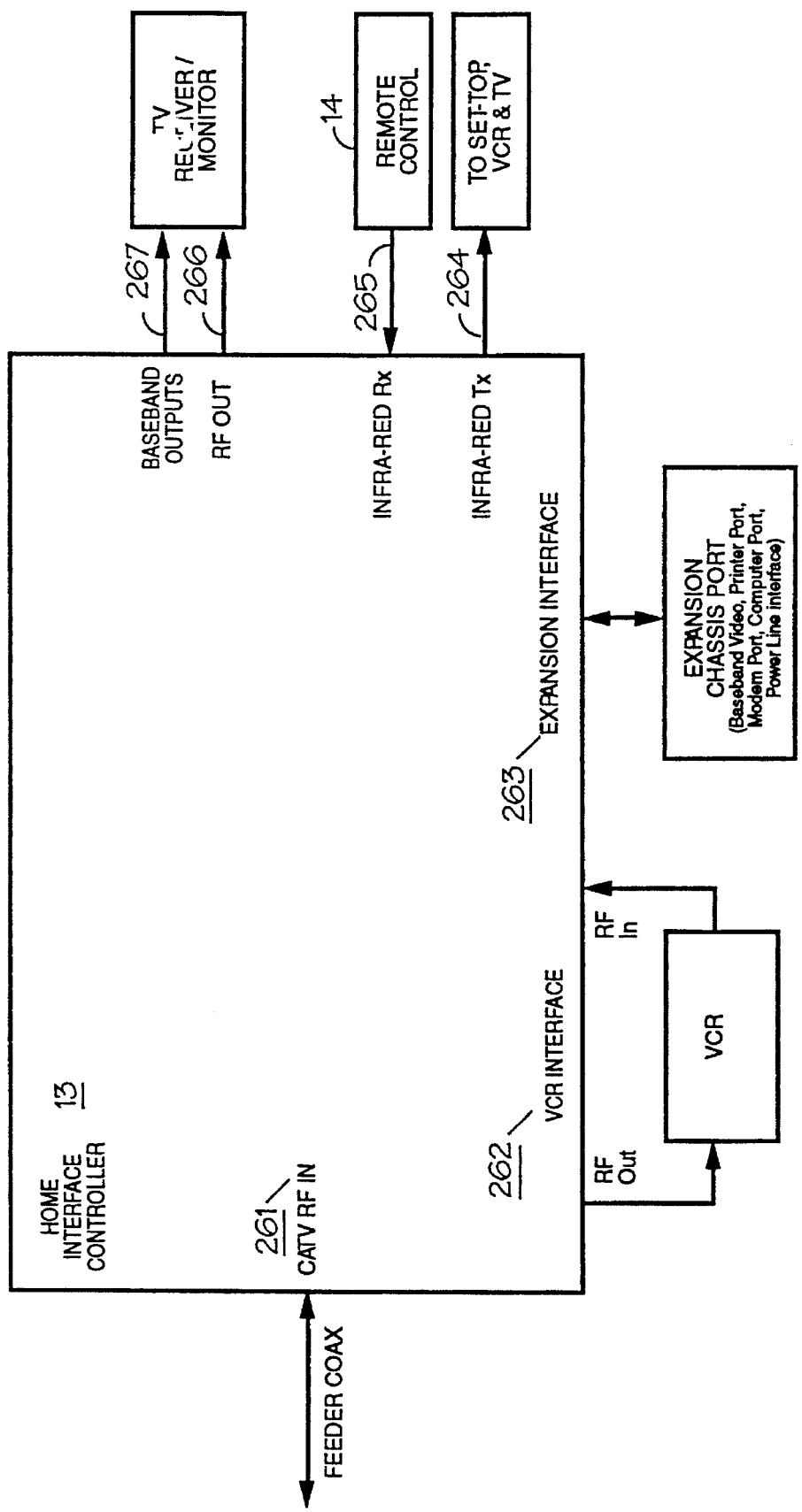
FIG. 26 illustrates the input and output structure of a home interface controller in accordance with a preferred embodiment of the present invention.

FIG. 26 illustrates the input and output structure of a home interface controller 13 in accordance with a preferred embodiment of the present invention. The controller includes input and output connections 261 for cable television rf, a video cassette recorder interface 262, an expansion interface 263 (for providing for baseband video; ports for printer, modem, and computer; and power line interface), infra-red transmitter port 264 for communication with conventional set top, video cassette recorder, and television, infra-red receiver port for communication with remote control 14, rf output 266 for communication with a television receiver, and baseband outputs 267 for communication with a television monitor.

Figure 27:
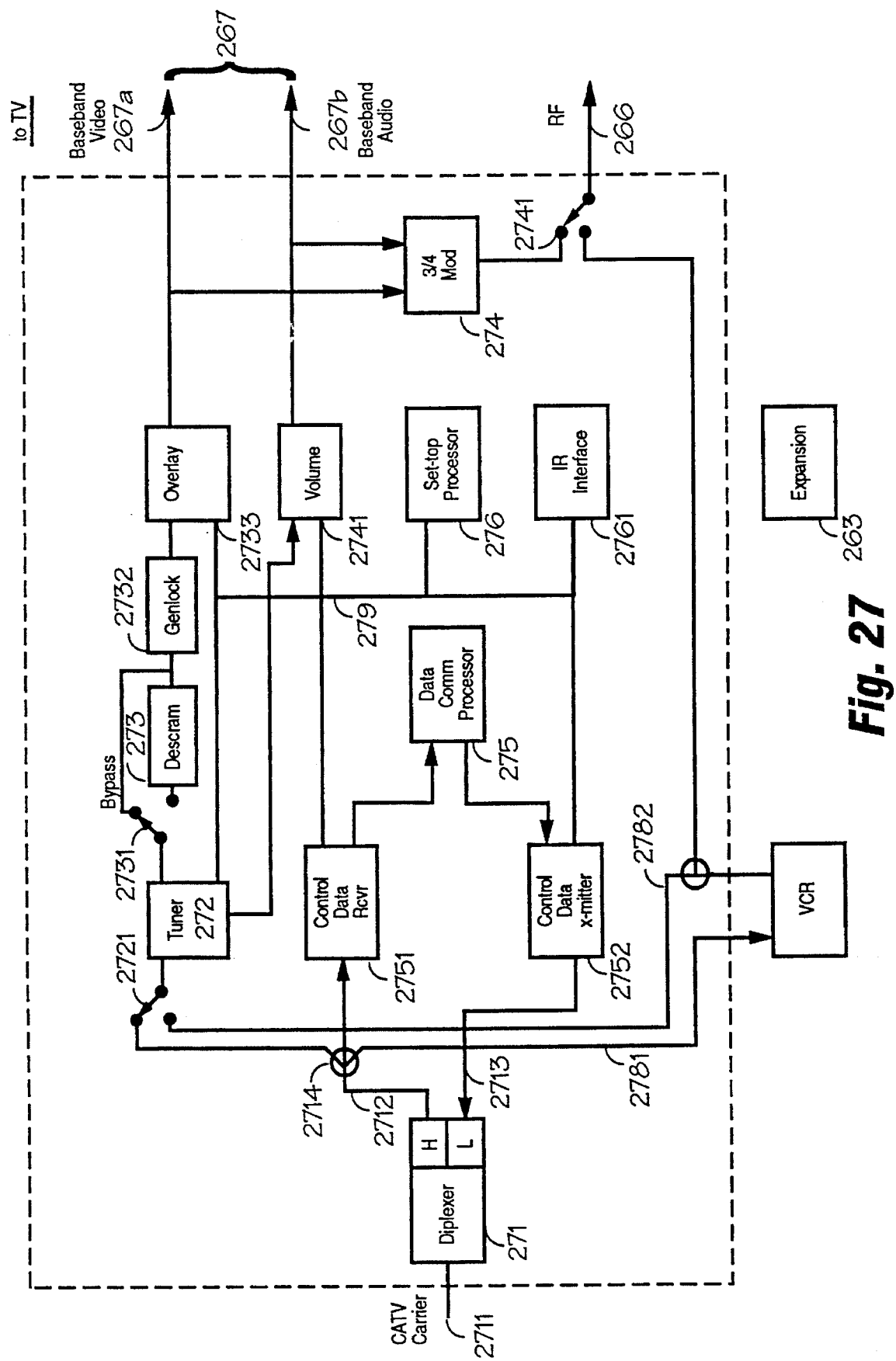
FIG. 27 illustrates an embodiment of the controller of FIG. 26.

FIG. 27 illustrates an embodiment of the controller of FIG. 26 suitable for analog television signal inputs. The rf cable television input 2711 feeds diplex filter 271, the high pass section of which feeds television information signals and downstream data to line 2712 and splitter 2714 for division among VCR rf output at 2782, control data receiver 2751 and tuner 272. The low pass section receives upstream data communications from control data transmitter 2752 over line 2713. Tuner 272 is switched between VCR rf output 2782 and the television information signals from line 2712. The tuner's output is fed to descrambler 373, which is bypassed by switch 2731. Genlock block 2732 provides sync signals necessary for permitting overlay controller 2733 to function properly with the tuner output. The overlay controller's output is fed directly to baseband video output 267a, and the tuner's audio output is routed through volume control 2741 to baseband audio output 267b. A channel 3/channel 4 modulator 274 coupled to these baseband outputs provides rf output over line 266 to the subscriber television. Switch 2741 switches the television between the home interface controller's television information signals and the VCR's rf output. Data communications involving the data receiver 2751 and the transmitter 2752 is handled by data communications processor 275, and the information flow is via data bus 279 to and from set top processor 276, infra red interface 2761 for the remote control 14, overlay controller 2733, tuner 272, and volume control (setting) 2741.

Figure 28:
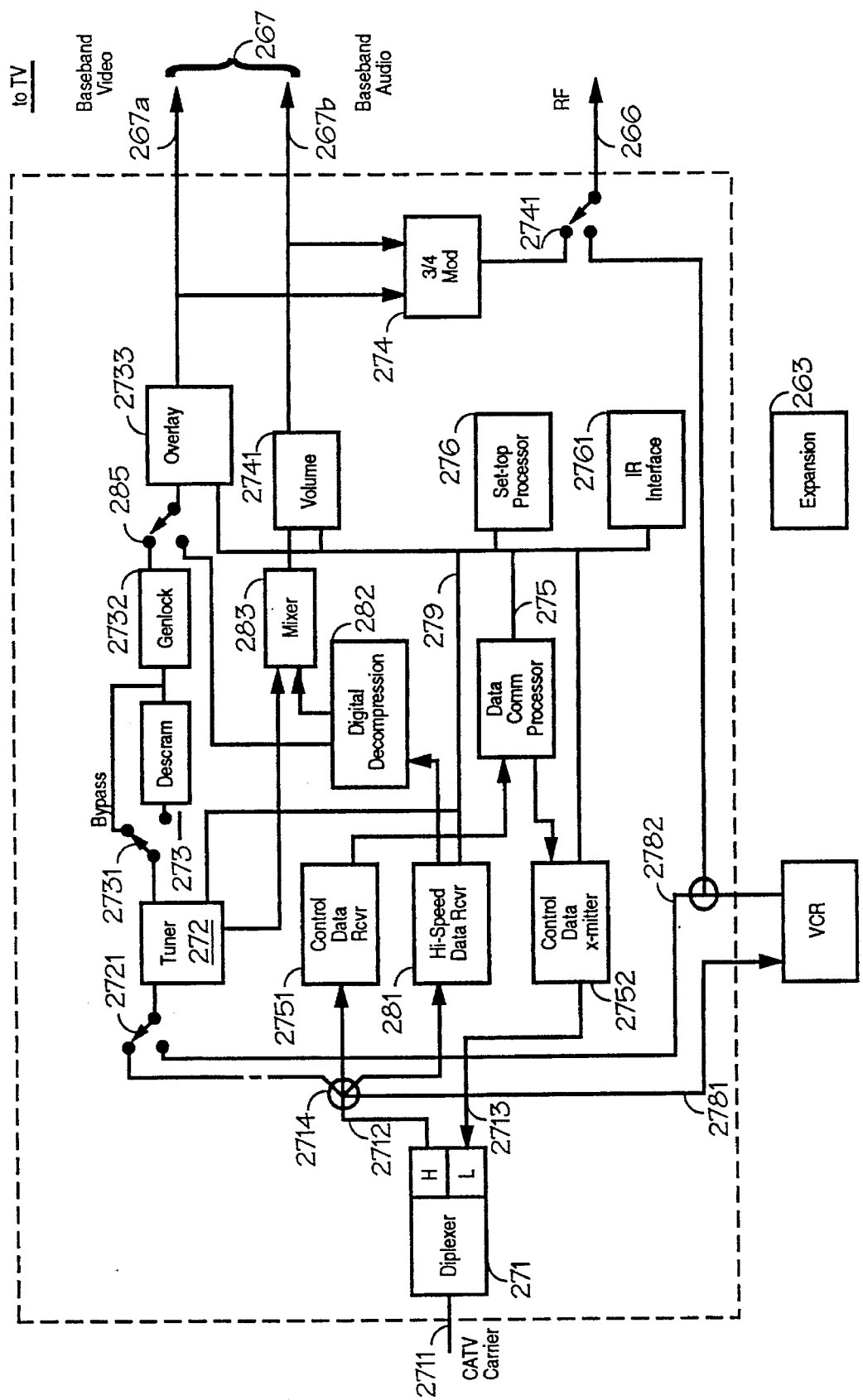
FIGS. 28 and 29 illustrate embodiments of digital decompression and multimedia versions of the controller of FIG. 26.
Figure 29:
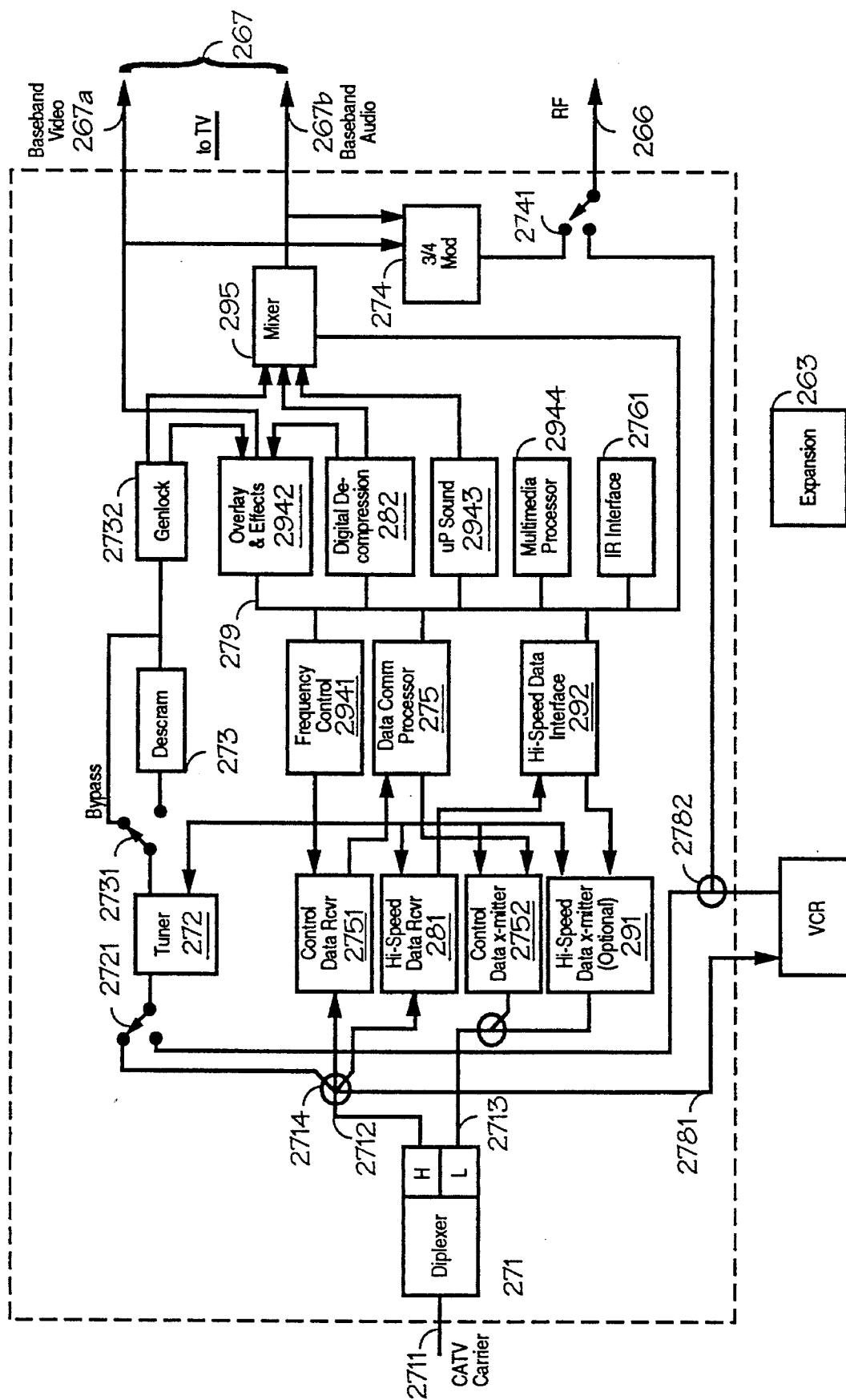

FIGS. 28 and 29 illustrate embodiments of digital decompression and multimedia versions of the controller of FIG. 26. The embodiment of FIG. 28 is similar to that of FIG. 27, except that there is also provided a high-speed data receiver 281 having an input connected to splitter 2714. The output of the high-speed receiver feeds digital decompression module 282. This module has an audio output feeding mixer 283 along with the audio from tuner 272 and a video output that can be switched into the overlay controller 2733 by switch 285, the other position of which causes the overlay controller 2733 to obtain its video solely from the analog origin as before.

The multimedia embodiment of FIG. 29 represents a further enhancement of the embodiment of FIG. 28. In addition to the high-speed data receiver 281, there is a high-speed data transmitter 291. These communicate with data bus 279 via high-speed data interface 292. Frequency control of communication at these data rates is assisted by frequency control block 2941. Audio mixer 295 operates under control of sound microprocessor 2943. Additional effects are achieved by multimedia processor 2944, and overlay and effects block 2942.

Figure 30:
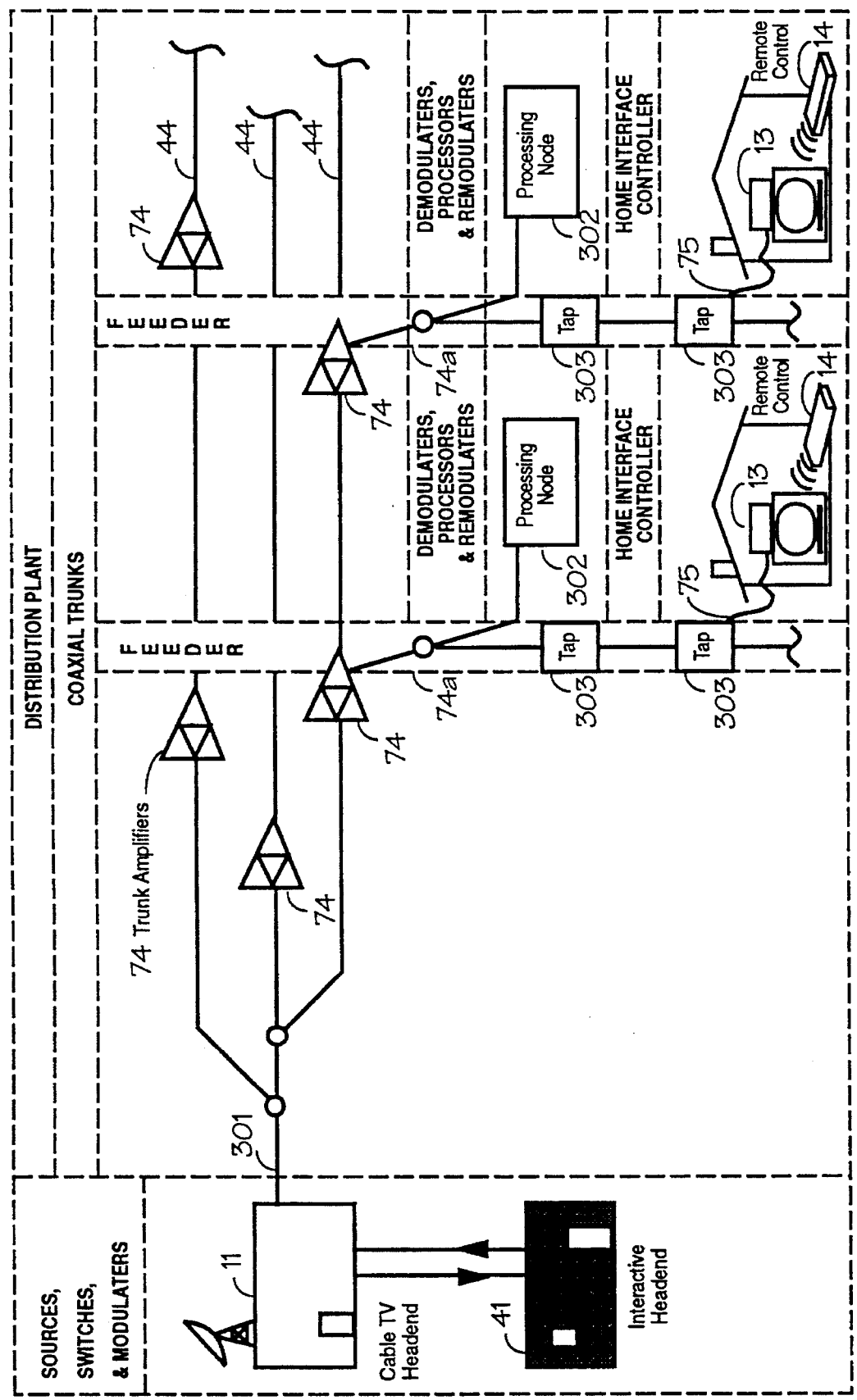
FIG. 30 illustrates an alternative embodiment to the system of FIG. 7 in which the node is disposed at a feeder.

FIG. 30 illustrates an alternative embodiment to the system of FIG. 7 in which the node 302 is disposed at a feeder 74a, typically proximate to abridger amplifier 74. In some embodiments where abridger amplifier may serve a plurality of feeders, the node may similarly serve home information controllers on each of these feeders. In this embodiment main trunk 301 feeds express trunks 44. Bridger amplifiers 74 are disposed at locations where the feeders 74a are connected to the trunks 44. At a tap 303 is disposed drop 75 to a subscriber home having a home interface controller 13 and remote control 14.

Figure 31:
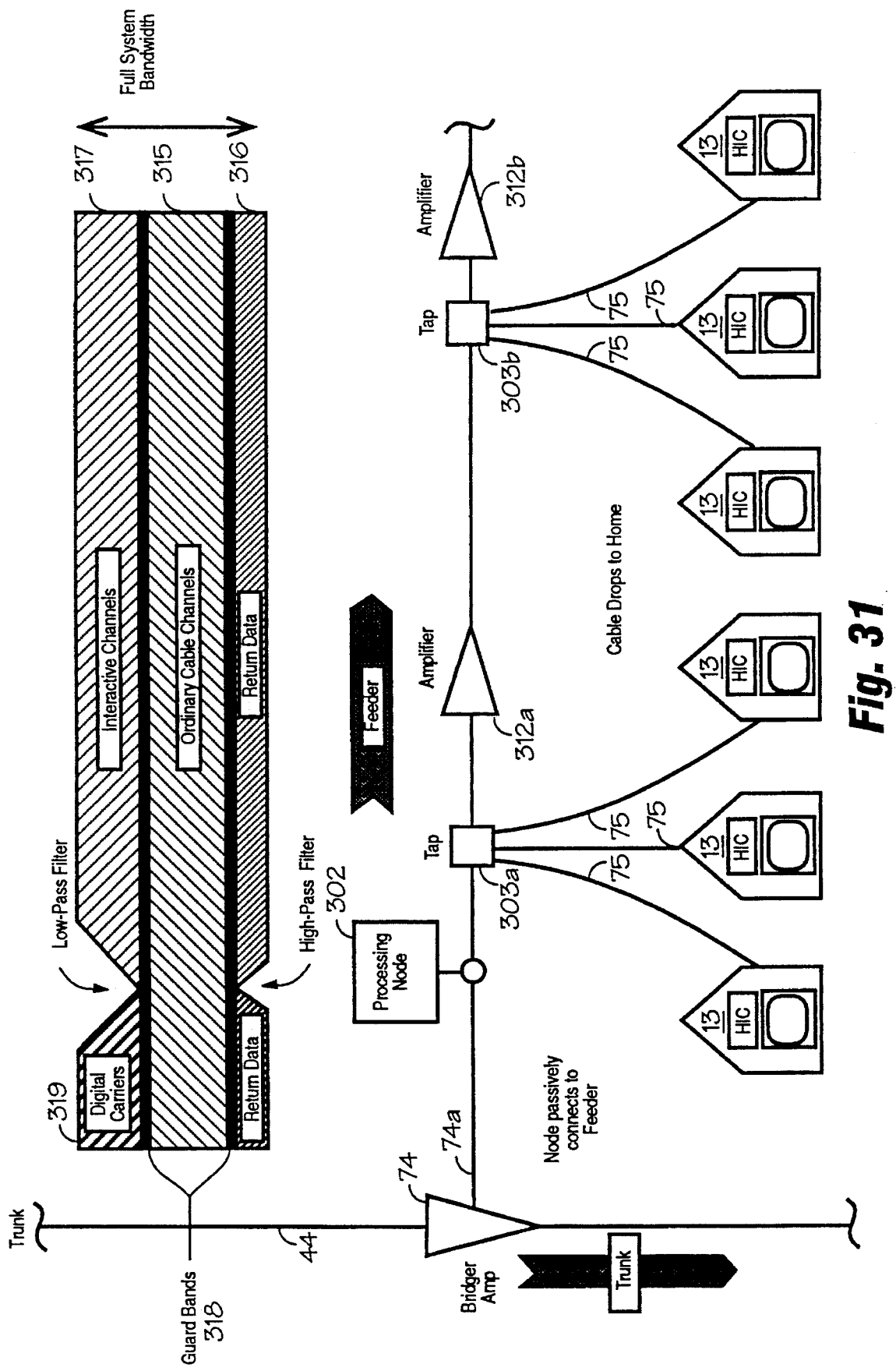
FIG. 31 shows the bandwidth usage in a system in accordance with that of FIG. 30.

FIG. 31 shows the bandwidth usage in a system in accordance with that of FIG. 30. The bandwidth is limited at the node 302 by a low pass filter so that digital carrier signals 319 at the bandwidth portion above the region 315 allocated to ordinary cable channels cannot reach the home interface controllers downstream of the node on the feeder 74a. (Alternatively, the bandwidth may be limited naturally by the bridger amplifer 74, with the node in communication with the trunk 44.) The removed digital signals in the bandwidth 319 may typically carry compressed digital television information, and those of these signals that may be needed to serve downstream home interface controllers are obtained by the node 302 and remodulated to provide interactive televsion service downstream in the same spectrum 317 utilized upstream by the digital signals 319. Decompression of the digital signals may be accomplished either at the node 302 or at the home interface controllers 13. Thus the node 302 is able to utilize, uniquely for communication to the home interface controllers 13 associated with its own group of feeders 74a, the interactive channel bandwidth 317 shown in FIG. 31. Each node may utilize this bandwidth region independently of the other nodes, because signal transfer among nodes in the frequency spectrum portion 317 is small, and in any event can be controlled between different nodes. Above the bandwidth used for delivery of non-interactive television signals, including region 315 of the system, is placed the spectrum portion 317 used for carrying interactive television information signals from the headend. Inbound return data communications is achieved utilizing lower frequency band 316, with high pass filter at each node to prevent unwanted signal transfer; fresh remodulated carrers are introduced at the node for upstream communications. Guardbands 318 are placed between bands 315 and 317 and between 316 and 315 to prevent interference. Each node 302 then achieves utilization of those interactive television information signals pertinent to the subscribers associated with such node who have obtained access to such signals.

Figure 32:
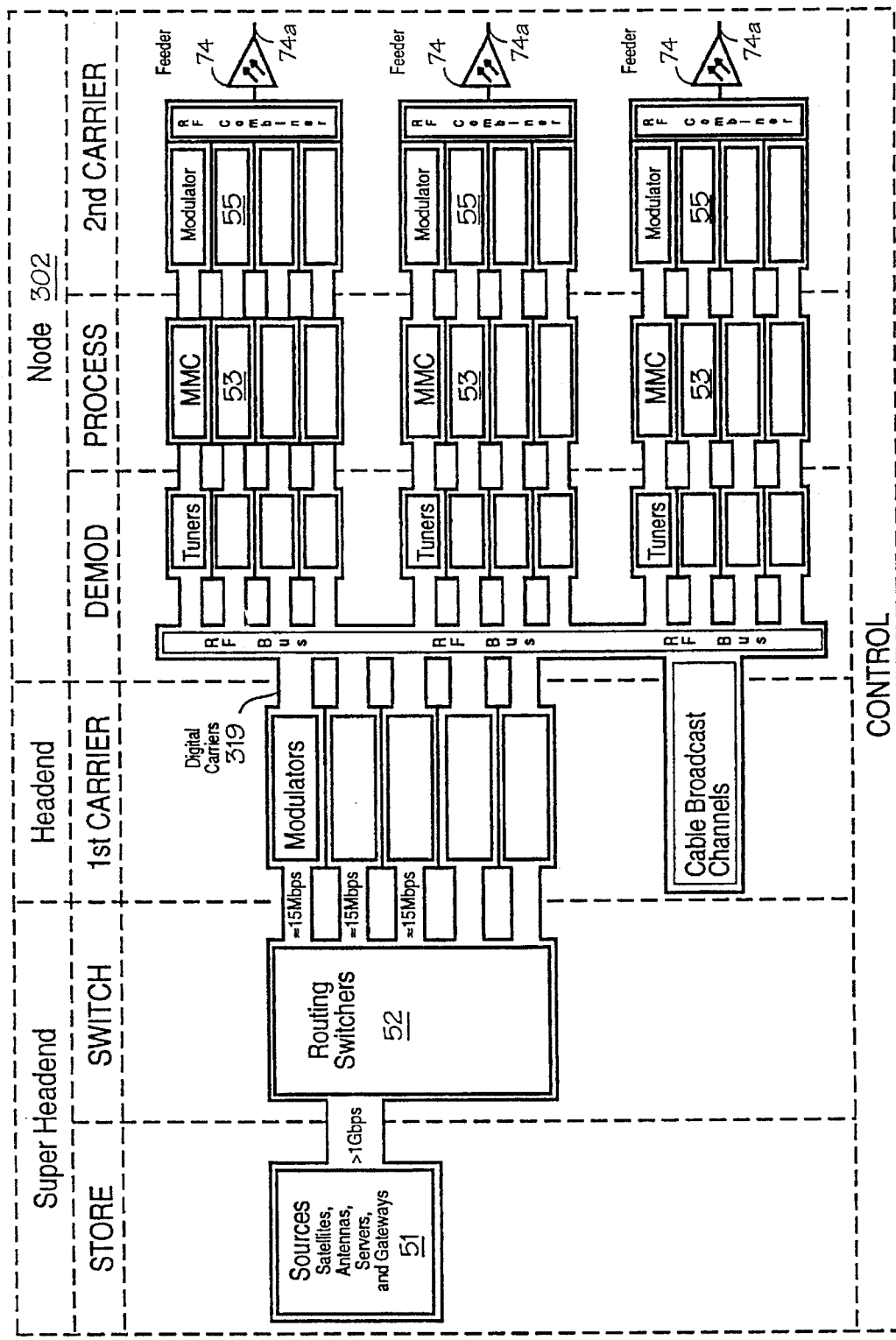
FIG. 32 shows the general architecture of outbound signal flow and two-way control in a system in accordance with the embodiment of FIG. 30.

FIG. 32 shows the general architecture of outbound signal flow and two-way control in a system in accordance with the embodiment of FIG. 30. At the feeders 74a is disposed the node 302, which may include an rf bus and tuners to demodulate television information signals (which may include conventional cable television signals as well as interactive television signals) from the headend. An MMC 53 with related modulator, as in the above embodiments, is placed in direct communication with a home interface controller 13 on a demand basis, so that the node 302 functions in essentially the same manner as does the node 77 when it is placed in the headend.

Figure 33:
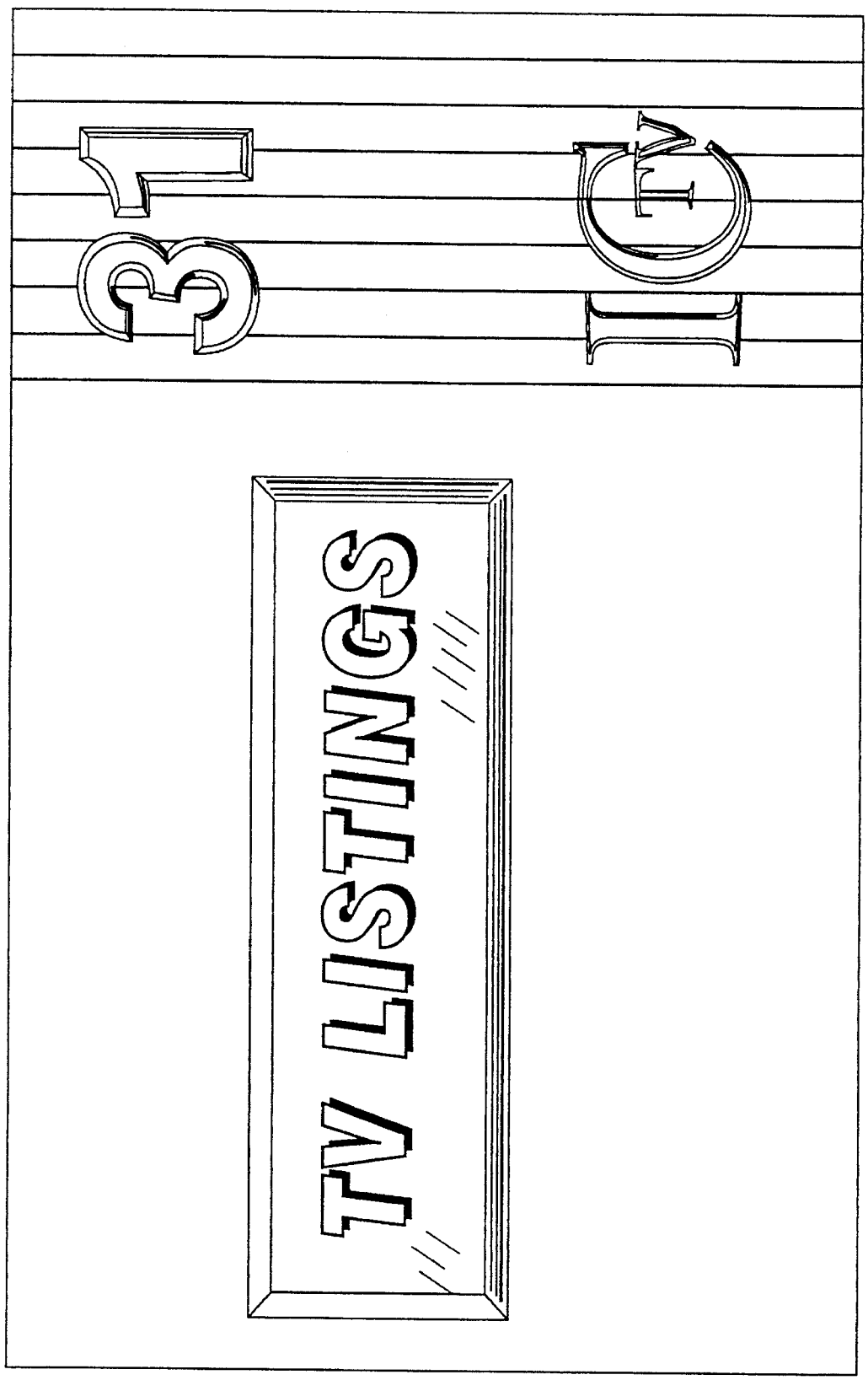
FIGS. 33 and 34 illustrate use of the channel menu system in accordance with a preferred embodiment of the invention.
Figure 34:
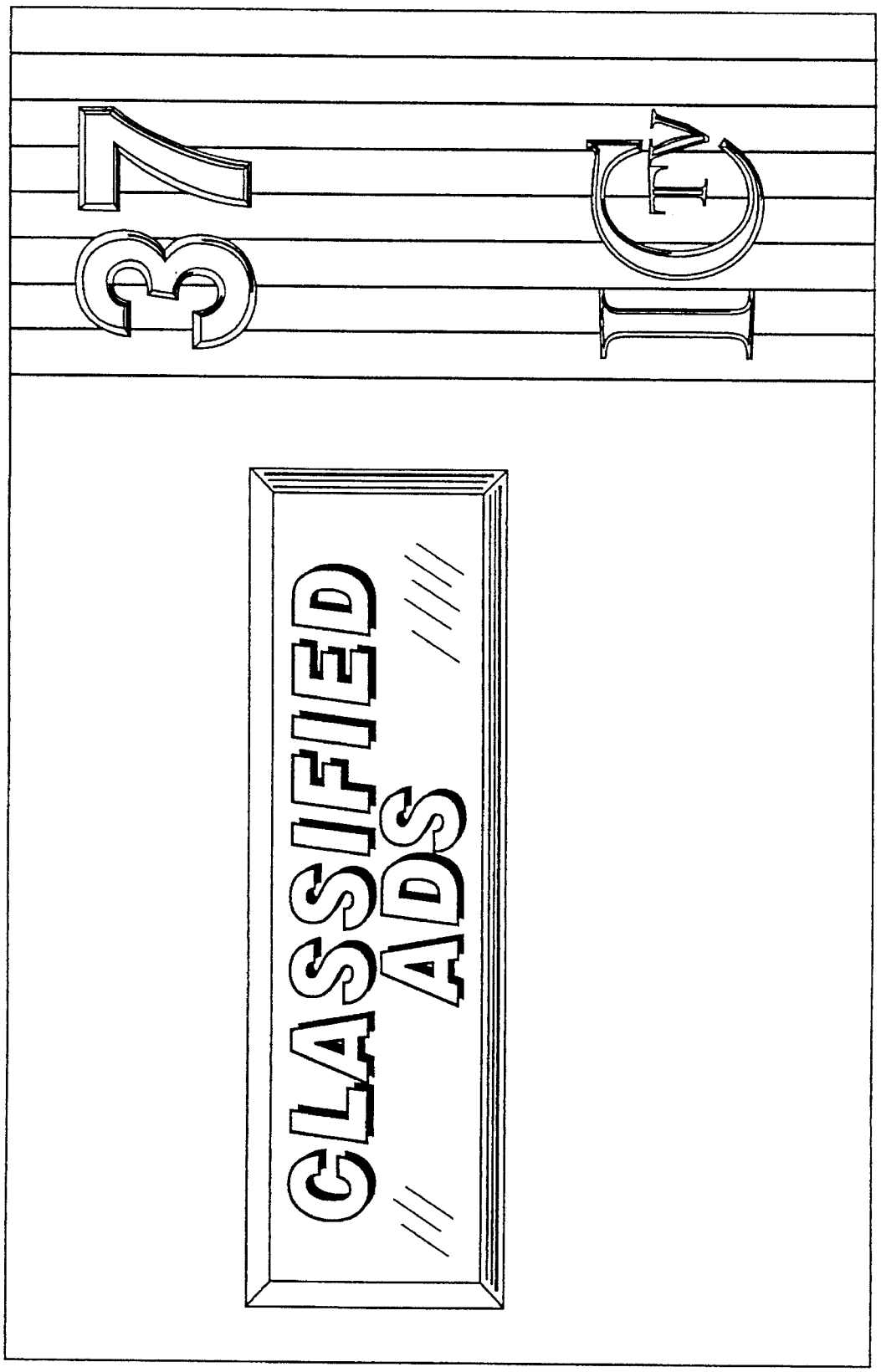

FIGS. 33 and 34 illustrate use of the channel menu system in accordance with a preferred embodiment of the invention. FIGS. 33 and 34 show apparently different channels used for different information services, here TV listings (channel 31) and classified advertisements (channel 37), even though in the manner described previously, the frequency over which the home interface control unit receives information that has not changed. The term "different information service" as used in this description and in the claims following can mean any information service in a mode appearing to be different to the subscriber, including an interactive service in a different information area, or a different interactive service, or a different television broadcast signal provided by the headend, etc.

Figure 35:
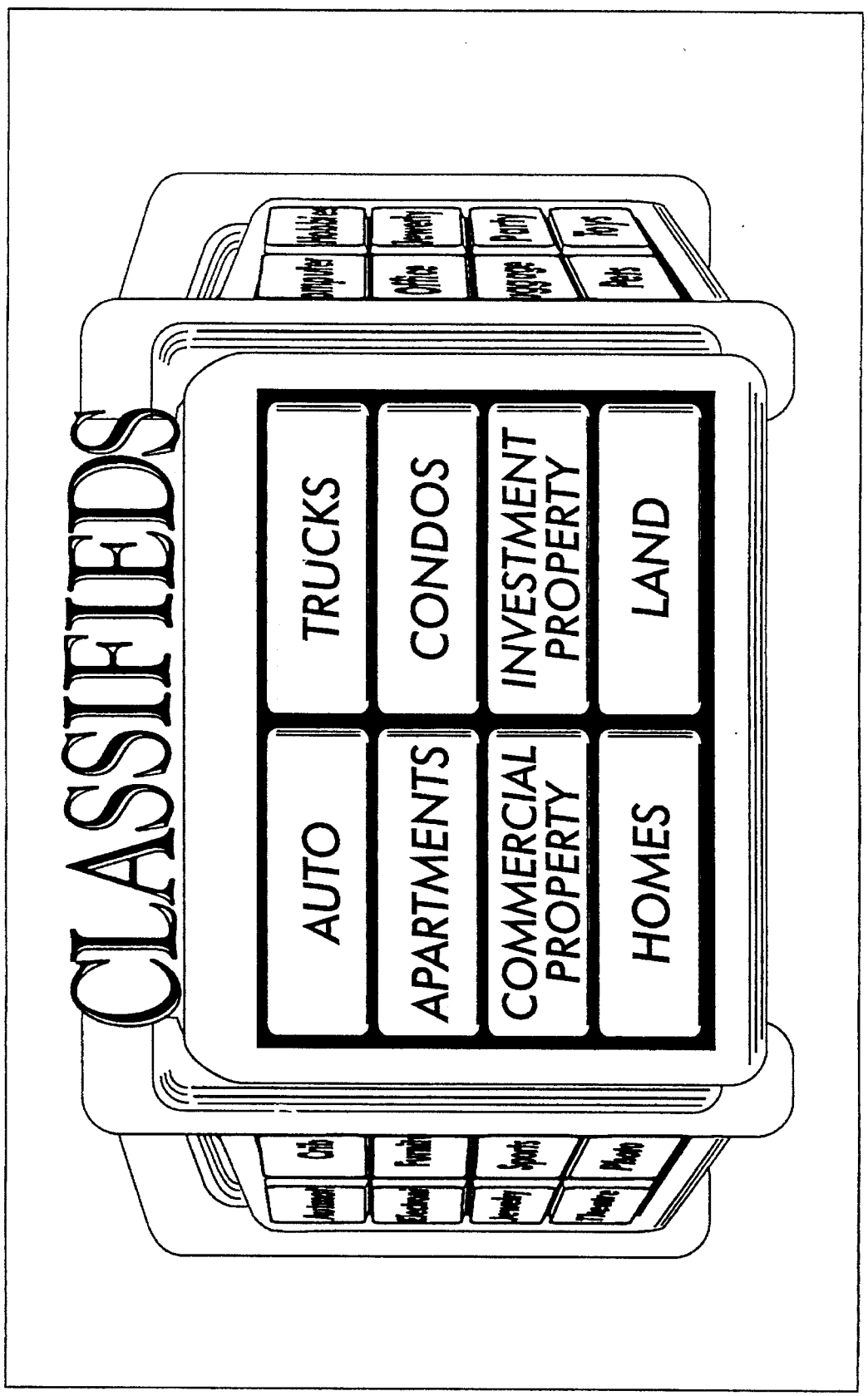
FIGS. 35–41 illustrate use of the carousel menu system and of the manner in which the invention in a preferred embodiment provides interaction with the user.

FIGS. 35–41 illustrate use of the carousel menu system and of the manner in which the invention in a preferred embodiment provides interaction with the user. FIG. 35 illustrates an embodiment of the carousel menu system in accordance with the invention when an interactive information service has been selected. (In this case, the interactive service is classified advertisements.) The carousel here shows three faces, one of which is a frontal face. The frontal face shows one or more menu choices. The two side faces shown are greeked, so as to display the apparent availability of other choices if the carousel is caused to rotate so that one of the side faces is moved to the frontal position. Via operation of the overlay 2733 described in connection with FIGS. 27–29, or the video effects and mixer block 121d of FIGS. 12 and 14, a cursor can be moved over the television display by the remote unit 14, and when the cursor overlays the menu choice of interest, the choice may be selected by pushing the appropriate button on the remote unit 14. Depending on the choice selected (and if subchoices are required by the area of interest in particular interactive information service), the carousel is momentarily shown to be apparently rotated in one direction or another, and thereafter another set of choices is caused to appear on the frontal face, the flanking side faces again being greeked.

Figure 36:
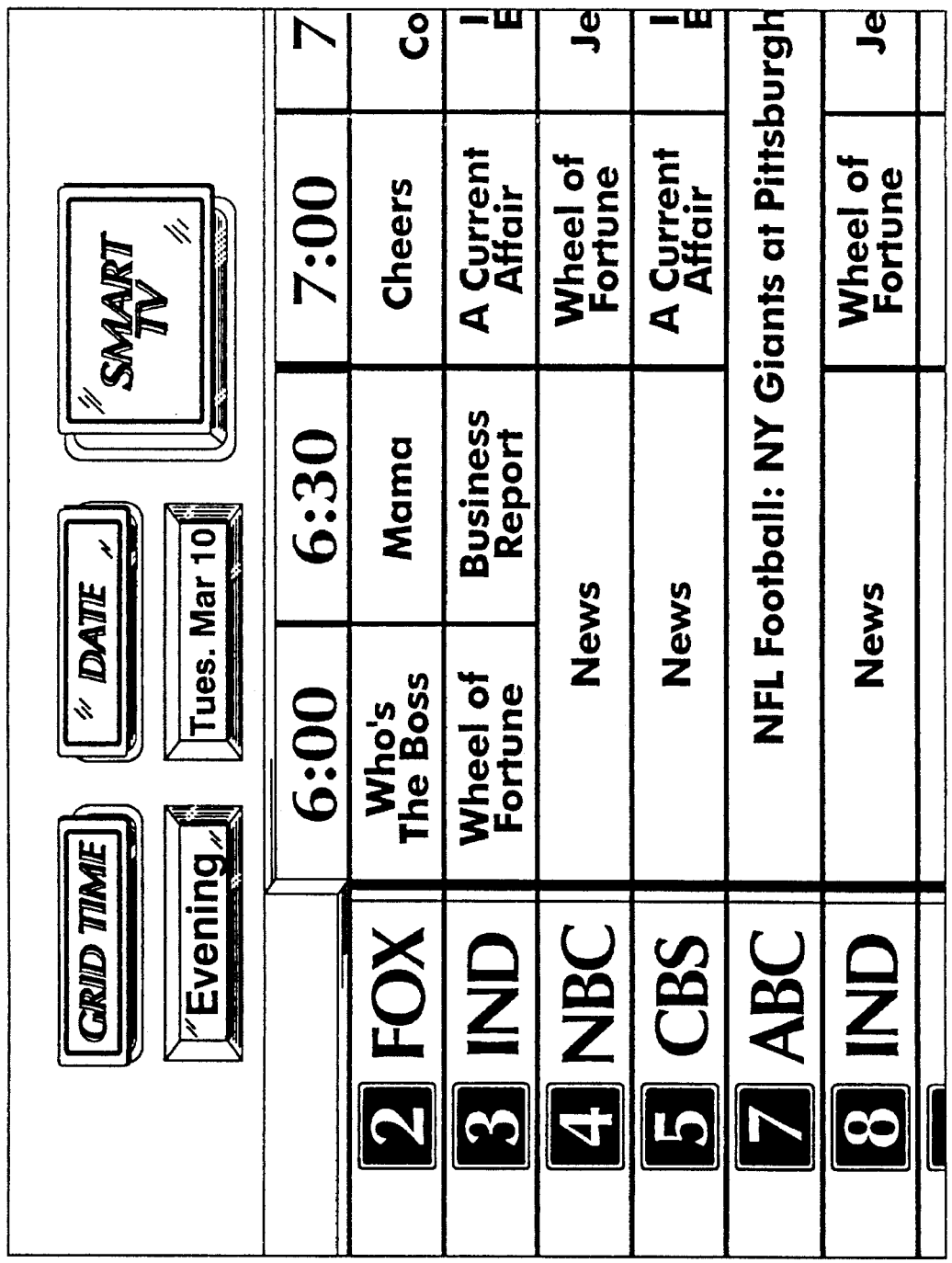
Figure 37:
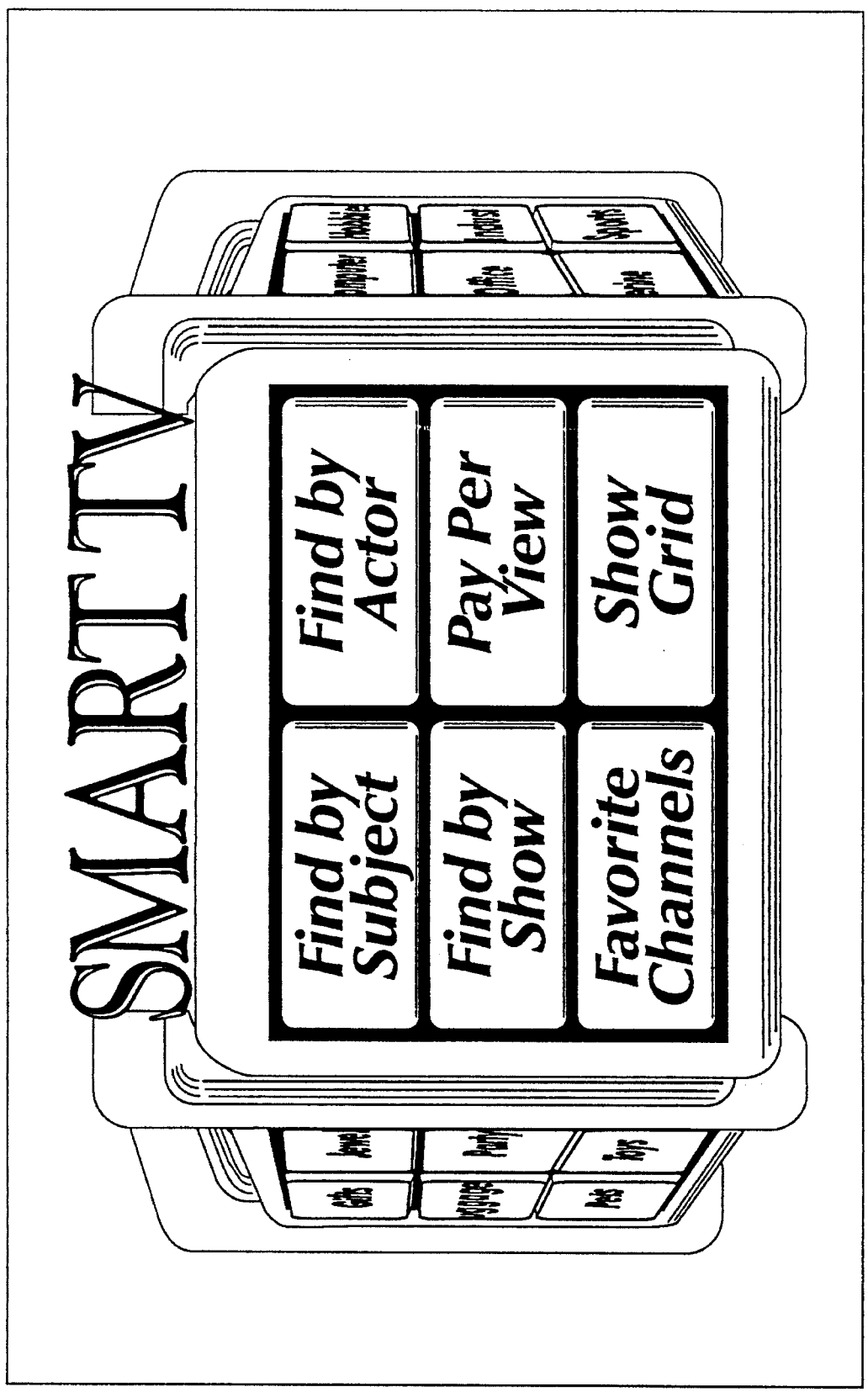

FIGS. 36 through 41 illustrate how interactive television service may be provided in accordance with a preferred embodiment of the invention. If TV listings (here channel 31) has been selected, there is displayed a grid portion, which can be shifted on screen for viewing the grid in the entirety. Shown in FIG. 36 is a portion of the grid display, plotting television programs as a function of channel and time for a given date and portion of the day; and the date and portion of the day can be selected by the subscriber.

Figure 38:
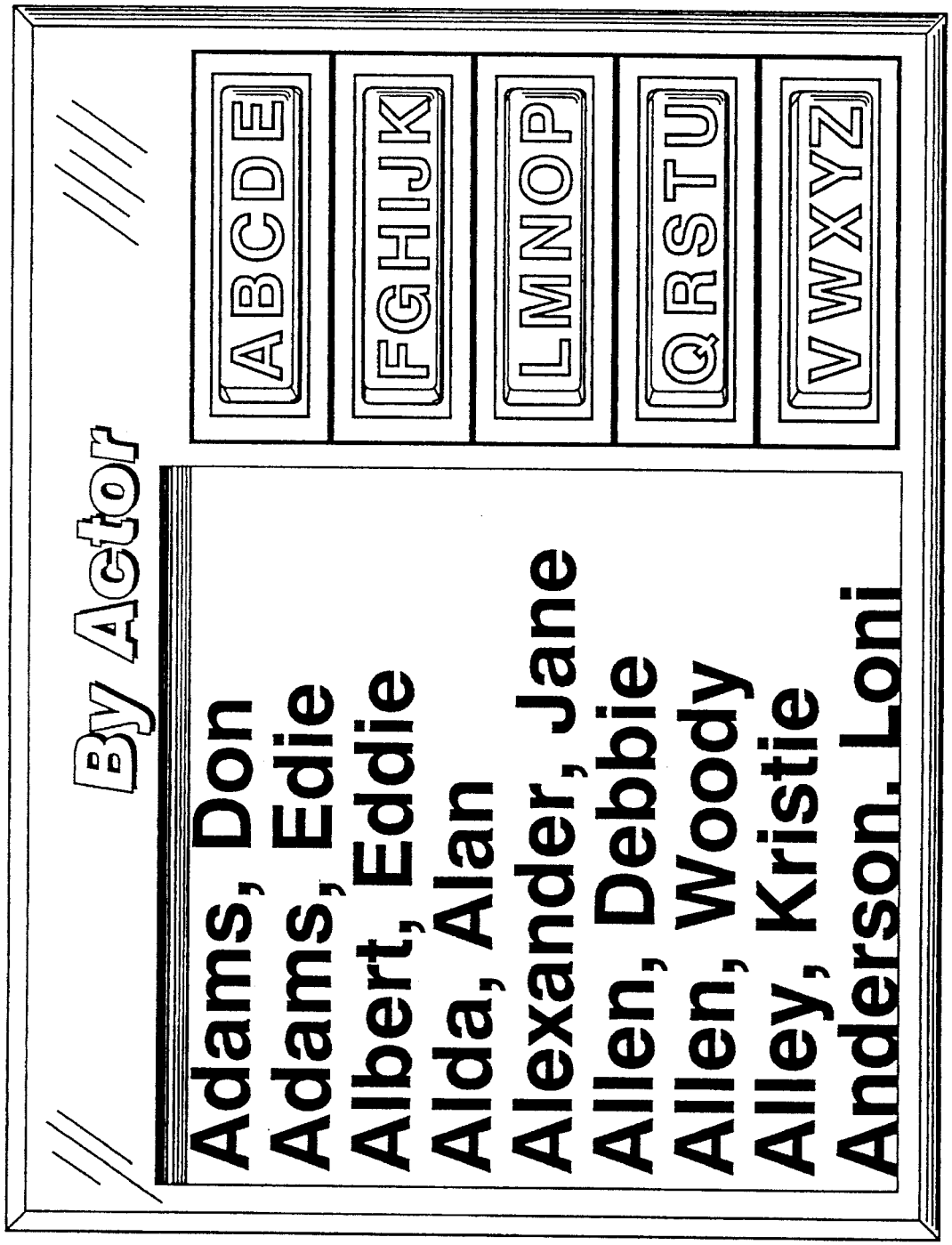
Figure 39:
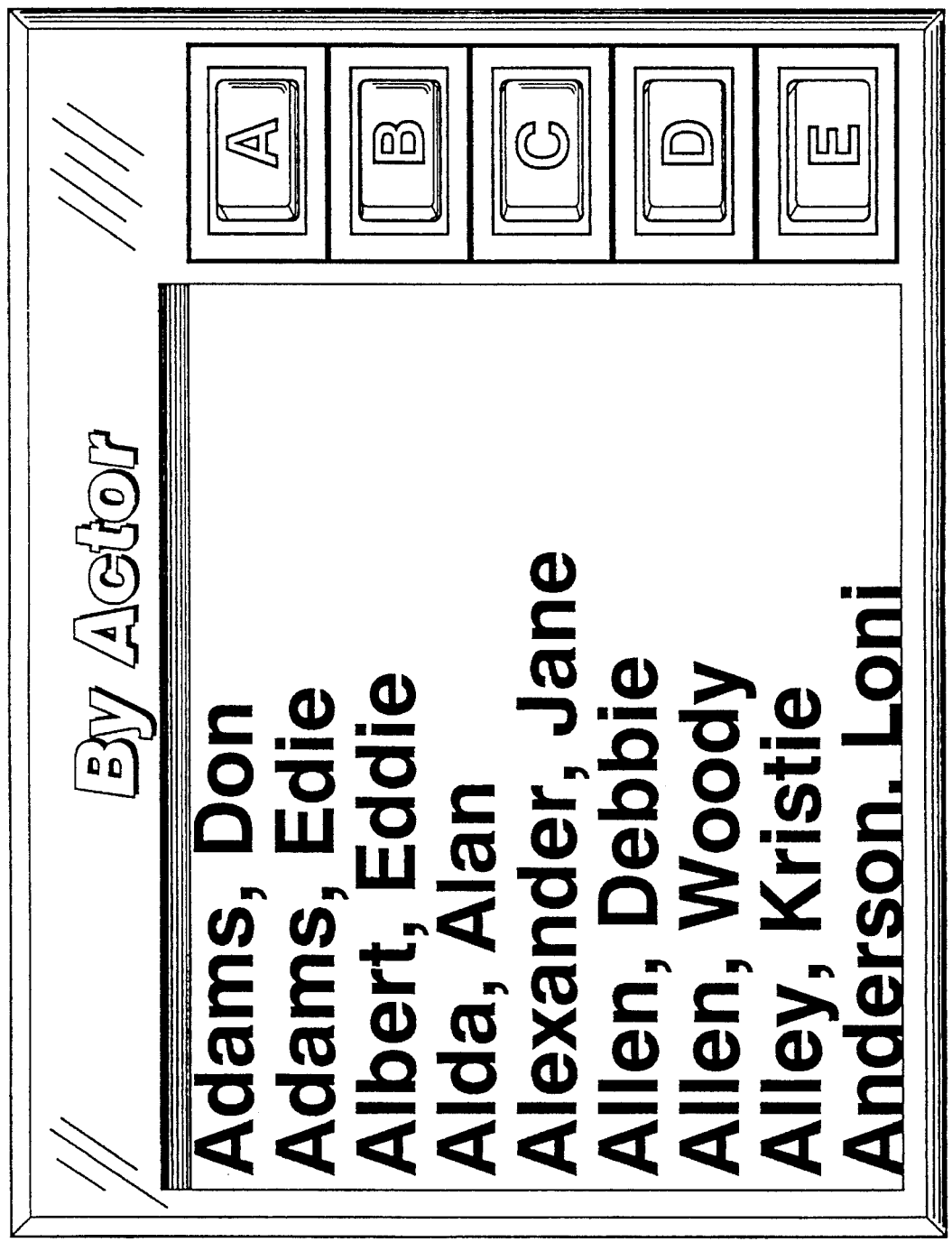
Figure 40:
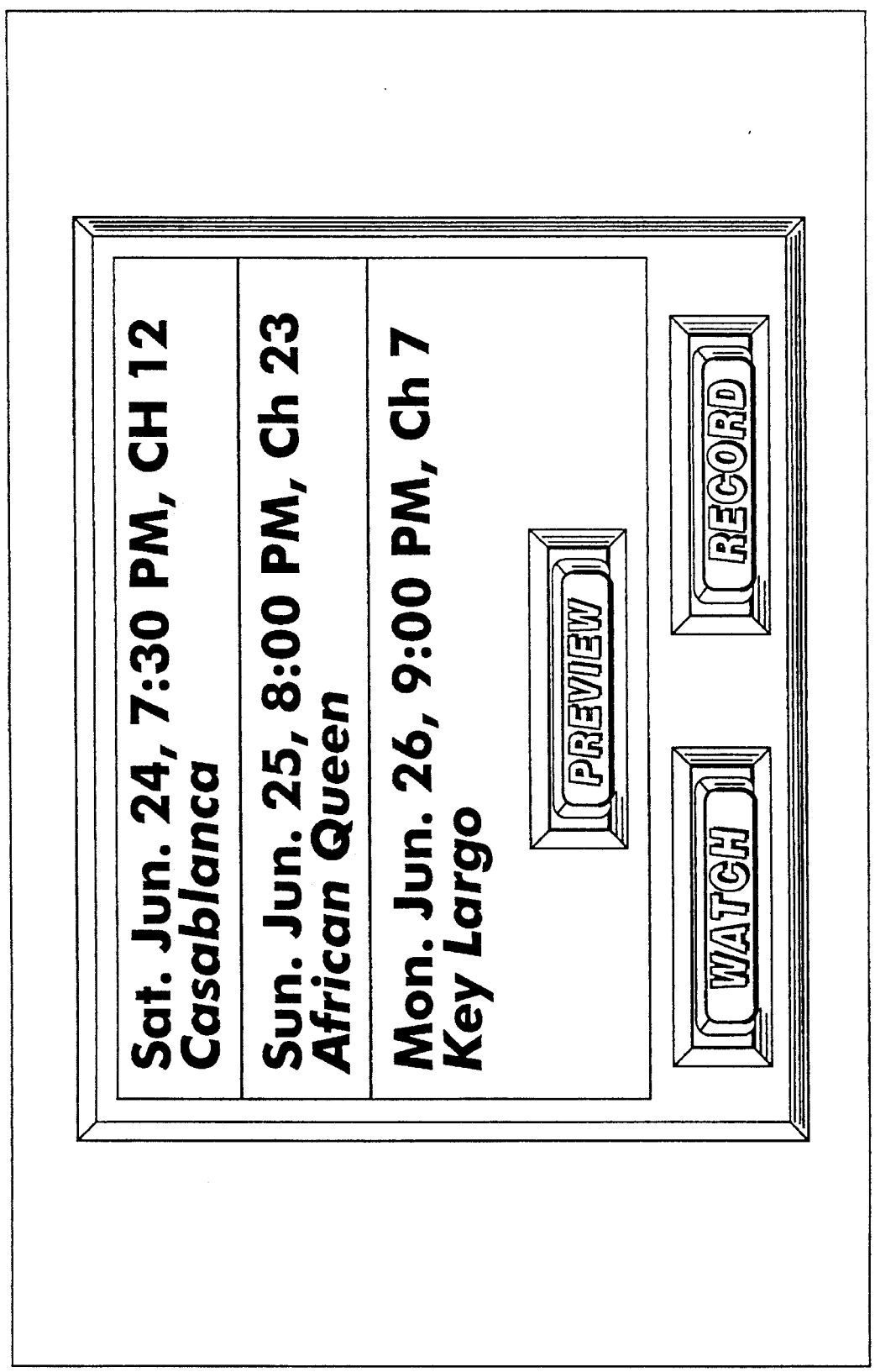
Figure 41:
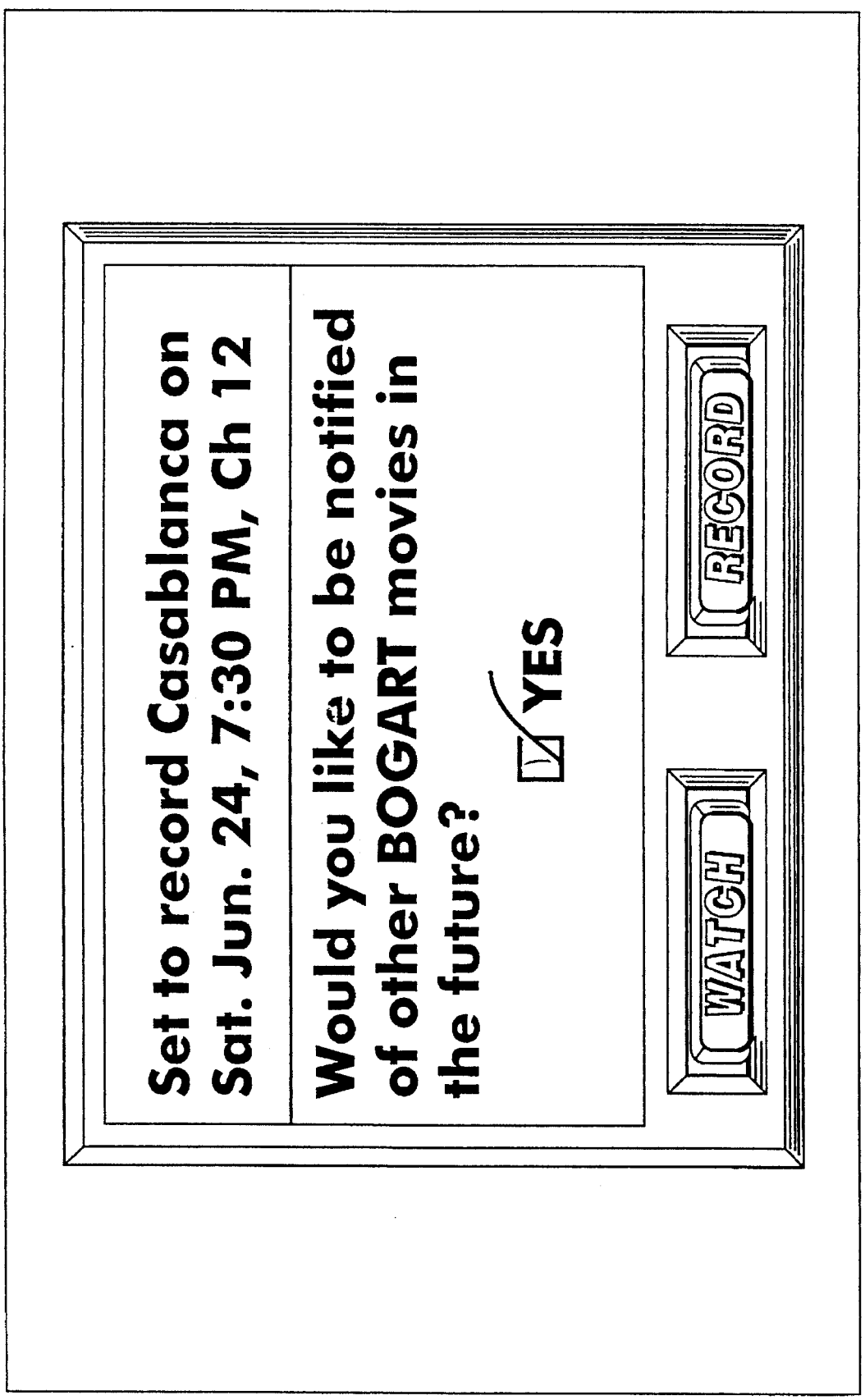

The "Smart TV" selection permits the subscriber to search for programs or other information service offerings in the manner illustrated in subsequent figures. The carousel choices indicated in FIG. 37 permit the subscriber to find programs and movies by subject, by show, or by actor. Other choices permit the subscriber to program his favorite channels and find offerings on those channels, or to identify offerings on a pay per view basis, or to return to the grid of FIG. 36. If the "by actor" selection is made, the alphabetical menu of FIG. 38 is presented. To find listings for "Bogart", the top button "ABCDE" would be selected, producing the display of FIG. 39. Thereafter, the "B" button would be selected, and from the list of actors whose names beginning with "B" are displayed, one could select "Bogart" and eventually produce the listing and choices shown in FIG. 40. One could, for example, chose to record Casablanca on Jun. 24, producing the display of FIG. 41, including the choice of being notified of other Bogart movies in the future.

What is claimed is:

1. An interactive television information system, for providing interactive cable television service over a cable television system distribution network, the interactive television system comprising:

an information source means for supplying a plurality of information services;

a plurality of home interface controller means, each such home interface controller means providing an output in communication with an associated subscriber television and having (i) a cable television system distribution network signal input for television information signals and input selection means for selecting a given one of the television information signals at the signal input and (ii) a data transceiver operative through the cable television system distribution network signal input for conducting data communications over the cable television system distribution network;

node means, in television communication with the information source means and in television communication and data communication with a group of the home interface controller means over the cable television system distribution network, for selecting and providing information services obtained from the information source means to each home interface controller means in the group based on data obtained over the cable television system distribution network from each such home interface controller means;

wherein the node means includes (a) activity detection means for determining whether a given home interface controller means is to be placed in an interactive mode and (b) signal assignment means for causing, on an affirmative determination by the activity detection means, the input selection means of the given home interface controller means to select a given television information signal present at the signal input, so that signal assignment is accomplished on a demand basis for those home interface controllers determined to be placed in an interactive mode.

2. A system according to claim 1, wherein each of the television information signals provided to the signal input of the home interface controller means has a different carrier frequency, the signal input of the home interface controller means is an rf input, the input selection means includes means for tuning to a desired information signal carrier frequency, and the signal assignment means includes means for causing the input selection means to select a television information signal of a given carrier frequency.

3. A system according to claim 1, wherein each of the television information signals is provided to the signal input of the home interface controller means on a time-shared basis, the input selection means includes means for selecting the time slice assigned to a desired television information signal, and the signal assignment means includes means for causing the input selection means to select a television information signal of a given time slice.

4. A system according to claim 1, wherein the node means is disposed in a headend of the cable television distribution network.

5. A system according to claim 2, wherein the node means is disposed in a headend of the cable television distribution network.

6. A system according to claim 4, wherein the information source means includes means for obtaining information services from a regional processing center.

7. A system according to claim 1, wherein the cable television system distribution network includes a plurality of feeders and the system includes a plurality of nodes, each node being disposed as a feeder server connected to a feeder.

8. A system according to claim 1, wherein the node means includes:

a plurality of multimedia processing means, each such multimedia processing means being an assignable module for providing an information service to at least one home interface controller means;

network manager means for assigning an available one of the multimedia processing means to furnish an information service, over the cable television system distribution network, to one of the home interface controller means based on data obtained from the one of the home interface controller means over the cable television system distribution network, so that assignment of multimedia processing means is accomplished on a demand basis.

9. A system according to claim 2, wherein the node means includes:

a plurality of multimedia processing means, each such processing means being an assignable module for providing an information service to at least one home interface controller means;

network manager means for assigning an available one of the multimedia processing means to furnish an information service, over the cable television system distribution network, to one of the home interface controller means based on data obtained from the one of the home interface controller means over the cable television system distribution network, so that assignment of multimedia processing means is accomplished on a demand basis.

10. A system according to claim 5, wherein the node means includes:

a plurality of multimedia processing means, each such processing means being an assignable module for providing an information service to at least one home interface controller means;

network manager means for assigning an available one of the multimedia processing means to furnish an information service, over the cable television system distribution network, to one of the home interface controller means based on data obtained from the one of the home interface controller means over the cable television system distribution network, so that assignment of multimedia processing means is accomplished on a demand basis.

11. A system according to claim 8, wherein each multimedia processing means is removably installable in the node means.

12. A system according to claim 9, wherein each multimedia processing means is removably installable in the node means.

13. A system according to claim 10, wherein each multimedia processing means is removably installable in the node means.

14. A system according to claim 1, wherein with each home interface controller means there is associated a remote unit having controls for moving a cursor displayed on the associated subscriber television and for making a selection; and each node means further includes interactive means (i) for providing, based on information received over the cable television system distribution network from one of the home interface controller means, content of the given television information signal to cause a display, on the subscriber television associated with the one of the home interface controller means, to permit the associated remote unit to move the cursor thereon and to make a selection and (ii) for processing the information constituting the selection to give effect thereto, thereby providing interactive television service to the subscriber television associated with the one of the home interface controller means.

15. A system according to claim 5, wherein with each home interface controller means there is associated a remote unit having controls for moving a cursor displayed on the associated subscriber television and for making a selection; and each node means further includes interactive means (i) for providing, based on information received over the cable television system distribution network from one of the home interface controller means, content of the given television information signal to cause a display, on the subscriber television associated with the one of the home interface controller means, to permit the associated remote unit to move the cursor thereon and to make a selection and (ii) for processing the information constituting the selection to give effect thereto, thereby providing interactive television service to the subscriber television associated with the one of the home interface controller means.

16. A system according to claim 7, wherein with each home interface controller means there is associated a remote unit having controls for moving a cursor displayed on the associated subscriber television and for making a selection;

and each node means further includes interactive means (i) for providing, based on information received over the cable television system distribution network from one of the home interface controller means, content of the given television information signal to cause a display, on the subscriber television associated with the one of the home interface controller means, to permit the associated remote unit to move the cursor thereon and to make a selection and (ii) for processing the information constituting the selection to give effect thereto, thereby providing interactive television service to the subscriber television associated with the one of the home interface controller means.

17. An interactive television information system, for providing interactive cable television service over a cable television system distribution network, the interactive television system comprising:

an information source means for supplying a plurality of information services;

a plurality of home interface controller means, each such home interface controller means providing an output in communication with an associated subscriber television and having (i) an rf signal input for a plurality of television information signals, each of the television information signals having a different carrier frequency, (ii) input selection means for tuning to a given one of the television information signals at the rf signal input and (iii) a data transceiver operative over a data communications link;

node means, in television communication with the information source means and in television communication with a group of the home interface controller means over the cable television system distribution network, and in data communications with the group of home interface controller means over the data communications link, for selecting and providing information services obtained from the information source means to each home interface controller means in the group based on data obtained over the data communications link from each such home interface controller means;

wherein the node means includes (a) activity detection means for determining whether a given home interface controller means is to be placed in an interactive mode and (b) signal assignment means for causing, on an affirmative determination by the activity detection means, the input selection means of the given home interface controller means to tune to a television information signal of a given carrier frequency present at the rf signal input, so that signal assignment is accomplished on a demand basis for those home interface controllers determined to be placed in an interactive mode.

18. A system according to claim 17, wherein the node means is disposed in a headend of the cable television system distribution network.

19. A system according to claim 17, wherein the information source means includes means for obtaining information services from a regional processing center.

20. A system according to claim 17, wherein the cable television system distribution network includes a plurality of feeders and the system includes a plurality of nodes, each node being disposed as a feeder server connected to a feeder.

21. A system according to claim 17, wherein the node means includes:

a plurality of multimedia processing means, each such processing means being an assignable module for providing an information service to at least one home interface controller means;

network manager means for assigning an available one of the multimedia processing means to furnish an information service, over the cable television system distribution network, to one of the home interface controller means based on data obtained from the data communications link, so that assignment of multimedia processing means is accomplished on a demand basis.

22. A system according to claim 21, wherein each multimedia processing means is removably installable in the node means.

23. A system according to claim 17, wherein with each home interface controller means there is associated a remote unit having controls for moving a cursor displayed on the associated subscriber television and for making a selection; and each node means further includes interactive means (i) for providing, based on information received over the data communications link from one of the home interface controller means, content of the given television information signal to cause a display, on the subscriber television associated with the one of the home interface controller means, to permit the associated remote unit to move the cursor thereon and to make a selection and (ii) for processing the information constituting the selection to give effect thereto, thereby providing interactive television service to the subscriber television associated with the one of the home interface controller means.

24. An interactive television information system, for providing interactive cable television service over a cable television system distribution network, the interactive television system comprising:

an information source means for supplying a plurality of information services;

a plurality of home interface controller means, each such home interface controller means providing an output in communication with an associated subscriber television and having (i) a signal input for a plurality of television information signals wherein each of the television information signals is provided to the signal input on a time-shared basis, (ii) input selection means for selecting a given one of the television information signals at the signal input, the input selection means including means for selecting a time slice assigned to the given television information signal, and (iii) a data transceiver operative over a data communications link;

node means, in television communication with the information source means and in television communication with a group of the home interface controller means over the cable television system distribution network, and in data communications with the group of home interface controller means over the data communications link, for selecting and providing information services obtained from the information source means to each home interface controller means in the group based on data obtained over the data communications link from each such home interface controller means;

wherein the node means includes (a) activity detection means for determining whether a given home interface controller means is to be placed in an interactive mode and (b) signal assignment means for causing, on an affirmative determination by the activity detection means, the input selection means of the given home interface controller means to select a given television information signal of a given time slice present at the signal input, so that signal assignment is accomplished on a demand basis for those home interface controllers determined to be placed in an interactive mode.

25. A system according to claim 24, wherein the node means is disposed in a headend of the cable television system distribution network.

26. A system according to claim 24, wherein the information source means includes means for obtaining information services from a regional processing center.

27. A system according to claim 24, wherein the cable television system distribution network includes a plurality of feeders and the system includes a plurality of nodes, each node being disposed as a feeder server connected to a feeder.

28. A system according to claim 24, wherein the node means includes:

a plurality of multimedia processing means, each such processing means being an assignable module for providing an information service to at least one home interface controller means;

network manager means for assigning an available one of the multimedia processing means to furnish an information service, over the cable television system distribution network, to one of the home interface controller means based on data obtained from the data communications link, so that assignment of multimedia processing means is accomplished on a demand basis.

29. A system according to claim 28, wherein each multimedia processing means is removably installable in the node means.

30. A system according to claim 24, wherein with each home interface controller means there is associated a remote unit having controls for moving a cursor displayed on the associated subscriber television and for making a selection; and each node means further includes interactive means (i) for providing, based on information received over the data communications link from one of the home interface controller means, content of the given television information signal to cause a display, on the subscriber television associated with the one of the home interface controller means, to permit the associated remote unit to move the cursor thereon and to make a selection and (ii) for processing the information constituting the selection to give effect thereto, thereby providing interactive television service to the subscriber television associated with the one of the home interface controller means.

31. An interactive television information system for use on a cable television system having (i) a source of broadcast television information signals, (ii) a cable television distribution network for delivering television information signals to subscriber televisions, and (iii) a plurality of settop controllers connected to the cable television distribution network, each settop controller providing an associated subscriber television with one of the television information signals in response to an associated channel control means operable by the subscriber, said interactive television information system comprising:

headend means for accessing any of a plurality of information services;

a plurality of home interface control means, each in connection with one of said settop controllers and including (i) a data transceiver operative over a data communications link and (ii) means, responsive to signal assignment data received from the data communications link, for causing the respective settop controller to provide the associated subscriber television with the television information signal determined by the signal assignment data when the channel control means makes an interactive mode selection;

node means, in television communication with the headend means and in television communication with a group of the home interface control means over the cable television distribution network, and in data communication with the group of home interface control means over the data communications link, for selecting information services obtained through the headend means based on data obtained over the data communications link from home interface control means in the group and for providing selected information services to said cable distribution network on assigned television information signals;

wherein said node means includes (a) activity detection means responsive to data received over the data communications link from one of the home interface control means for determining whether the channel control means in communication with the settop controller associated with said one of the home interface control means has made an interactive mode selection and (b) signal assignment means for, on an affirmative determination by the activity detection means, assigning a television information signal to said one of the home interface control means and communicating signal assignment data over the data communications link to said one of the home interface control means so that signal assignment is accomplished on a demand basis for those home interface control means associated with a settop controller in communication with a channel control means that has made an interactive mode selection.

32. A system according to claim 31, wherein each of the television information signals delivered by the cable television distribution network has a different carrier frequency, each settop controller includes means for tuning to a desired information signal carrier frequency, and the signal assignment data identifies a television information signal of a given carrier frequency.

33. A system according to claim 31, wherein each of the television information signals is delivered by the cable television distribution network on a time-shared basis, each settop controller includes means for selecting the time slice assigned to a desired television information signal, and the signal assignment data identifies a television information signal of a given time slice.

34. A system according to claim 31, wherein the node means is disposed in a headend of the cable television distribution network.

35. A system according to claim 31, wherein the cable television distribution network includes a plurality of feeders and the system includes a plurality of nodes, each node being disposed as a feeder server connected to a feeder.

36. A system according to claim 31 further comprising information source means in a headend of the cable television distribution network for supplying a plurality of information sources.

37. A system according to claim 36 wherein the information source means includes means for obtaining information services from a regional processing center.

38. A system according to claim 36, wherein the node means includes:

a plurality of multimedia processing means, each such processing means being an assignable module for providing an information service to at least one subscriber television;

network manager means for assigning an available one of the multimedia processing means to furnish an information service, over the cable television distribution network, to one of the subscriber televisions based on data obtained from the data communications link, so that assignment of multimedia processing means is accomplished on a demand basis.

39. A system according to claim 38, wherein each multimedia processing means is removably installable in the node means.

40. A system according to claim 31, wherein with each home interface controller means there is associated a remote unit having controls for moving a cursor displayed on the associated subscriber television and for making a selection; and each node means further includes interactive means (i) for providing, based on information received over the data communications link from one of the home interface controller means, content of the given television information signal to cause a display, on the subscriber television associated with the one of the home interface controller means, to permit the associated remote unit to move the cursor thereon and to make a selection and (ii) for processing the information constituting the selection to give effect thereto, thereby providing interactive television service to the subscriber television associated with the one of the home interface controller means.

\* \* \* \* \*

UNITED STATES PATENT AND TRADEMARK OFFICE
Certificate

Patent No. 5,526,034                                                            Patented: June 11, 1996

On petition requesting issuance of a certificate for correction of inventorship pursuant to 35 U.S.C. § 256, it has been found that the above-identified patent, through error and without any deceptive intent, improperly sets forth the inventorship.

Accordingly, it is hereby certified that the correct inventorship of this patent is: W. Leo Hoarty, Santa Clara, Calif. and Joshua W. Soske, Sunnyvale, Calif.

Signed and Sealed this Twenty-second Day of April, 1997.

JOHN K. PENG
*Supervisory Patent Examiner*
Art Unit 2602